US012791660B2

(12) United States Patent
Rao et al.

(10) Patent No.: US 12,791,660 B2
(45) Date of Patent: Nov. 10, 2026

(54) METHOD AND APPARATUS FOR ACTIVITY DETECTION AND RECOGNITION BASED ON RADAR MEASUREMENTS

(71) Applicant: Samsung Electronics Co., Ltd., Suwon-si (KR)

(72) Inventors: Raghunandan M. Rao, Allen, TX (US); Yuming Zhu, Plano, TX (US); Neha Dawar, Plano, TX (US); Songwei Li, McKinney, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 750 days.

(21) Appl. No.: 17/664,017

(22) Filed: May 18, 2022

(65) Prior Publication Data

US 2023/0039849 A1 Feb. 9, 2023

Related U.S. Application Data

(60) Provisional application No. 63/294,817, filed on Dec. 29, 2021, provisional application No. 63/191,888, filed on May 21, 2021.

(51) Int. Cl.

| | |
|---|---|
| ***G01S 7/35*** | (2006.01) |
| ***G01S 7/02*** | (2006.01) |
| ***G01S 13/58*** | (2006.01) |

(52) U.S. Cl.
CPC .............. *G01S 7/354* (2013.01); *G01S 7/023* (2013.01); *G01S 13/581* (2013.01)

(58) Field of Classification Search
CPC ........ G01S 7/354; G01S 7/023; G01S 13/581; G06F 3/0346; G06F 3/017; G06N 20/00
See application file for complete search history.

(56) References Cited

U.S. PATENT DOCUMENTS

| | | | |
|---|---|---|---|
| 10,374,863 | B2 | 8/2019 | Xu et al. |
| 10,856,746 | B2 | 12/2020 | Regev |

(Continued)

FOREIGN PATENT DOCUMENTS

| | | | |
|---|---|---|---|
| CN | 113469110 | A | 10/2021 |
| EP | 3879298 | A2 | 9/2021 |

(Continued)

OTHER PUBLICATIONS

International Search Report and Written Opinion issued Aug. 22, 2022 regarding International Application No. PCT/KR2022/007231, 7 pages.

*Primary Examiner* — Vladimir Magloire
*Assistant Examiner* — Ismaaeel A. Siddiquee

(57) ABSTRACT

An electronic device includes a transceiver and a processor. The processor is operably connected to the transceiver. The processor is configured to transmit, via the transceiver, radar signals for activity recognition. The processor is also configured to identify a first set of features and a second set of features from received reflections of the radar signals, the first set of features indicating whether an activity is detected based on power of the received reflections. Based on the first set of features indicating that the activity is detected, the processor is configured to compare one or more of the second set of features to respective thresholds to determine whether a condition is satisfied. After a determination that the condition is satisfied, the processor is configured to perform an action based on a cropped portion of the second set of features.

20 Claims, 31 Drawing Sheets

(56) References Cited

U.S. PATENT DOCUMENTS

| | | | | |
|---|---|---|---|---|
| 11,277,166 | B2 | 3/2022 | Zeng et al. | |
| 11,435,443 | B2 * | 9/2022 | Santra | G01S 13/723 |
| 2008/0291158 | A1 | 11/2008 | Park et al. | |
| 2010/0249633 | A1 * | 9/2010 | Droitcour | A61B 5/05<br>600/534 |
| 2013/0041640 | A1 * | 2/2013 | Miller | G06F 18/2415<br>703/2 |
| 2013/0093616 | A1 * | 4/2013 | Jeon | G01S 7/414<br>342/118 |
| 2018/0018965 | A1 * | 1/2018 | Daley | G10L 15/30 |
| 2018/0329050 | A1 | 11/2018 | Amihood et al. | |
| 2020/0064456 | A1 | 2/2020 | Xu et al. | |
| 2020/0145042 | A1 * | 5/2020 | Kulkarni | G01S 13/867 |
| 2020/0225320 | A1 | 7/2020 | Belskikh et al. | |
| 2020/0285926 | A1 * | 9/2020 | Bush | G06N 3/0442 |
| 2021/0103337 | A1 | 4/2021 | Jeppsson et al. | |
| 2021/0270936 | A1 | 9/2021 | Chen et al. | |
| 2022/0026519 | A1 | 1/2022 | Wu et al. | |
| 2022/0026530 | A1 | 1/2022 | Wu et al. | |
| 2024/0061064 | A1 * | 2/2024 | Chandra | G01S 5/015 |

FOREIGN PATENT DOCUMENTS

| | | | |
|---|---|---|---|
| JP | 6889098 | B2 | 6/2021 |
| KR | 10-2008-0102516 | A | 11/2008 |

* cited by examiner

1026

$$\begin{cases} f_t = \sigma(W_{xf}\, x_t + W_{hf}\, h_{(t-1)} + b_f) \\ i_t = \sigma(W_{xi}\, x_t + W_{hi}\, h_{t-1} + b_i) \\ \tilde{C}_t = tanh(W_{xc}\, x_t + W_{hc}\, h_{t-1} + b_c) \\ C_t = f_t \cdot C_{t-1} + i_t \cdot \tilde{C}_t \\ h_t = o_t \cdot tanh\,(C_t) \end{cases}$$

METHOD AND APPARATUS FOR ACTIVITY DETECTION AND RECOGNITION BASED ON RADAR MEASUREMENTS

CROSS-REFERENCE TO RELATED APPLICATION AND CLAIM OF PRIORITY

This application claims priority under 35 U.S.C. § 119(e) to U.S. Provisional Patent Application No. 63/191,888 filed on May 21, 2021 and U.S. Provisional Patent Application No. 63/294,817 filed on Dec. 29, 2021. The above-identified provisional patent applications are hereby incorporated by reference in their entirety.

TECHNICAL FIELD

This disclosure relates generally to electronic devices. More specifically, this disclosure relates to method and apparatus for activity detection and recognition based on radar measurements.

BACKGROUND

The use of mobile computing technology such as a portable electronic device has greatly expanded largely due to usability, convenience, computing power, and the like. One result of the recent technological development is that electronic devices are becoming more compact, while the number of functions and features that a given device can perform is increasing.

Methods for interacting with and controlling computing devices are continually improving in order to conform to more natural approaches. Various types of computing devices utilize graphical user interfaces (GUI) on a display screen to facilitate control by a user. Objects such as text, images, and video are displayed on a screen and the user can employ various instruments to control the computing device such as, a keyboard, a mouse, a touchpad. Many such methods for interacting with and controlling a computing device generally require a user to physically touch the screen or utilizing an instrument such as a keyboard or mouse to provide a quick and precise input. Touching the screen or using particular instrument to interact with an electronic device can be cumbersome.

SUMMARY

This disclosure provides methods and an apparatus for activity detection and recognition based on radar measurements.

In one embodiment, electronic device is provided. The electronic device includes a transceiver and a processor. The processor is operably connected to the transceiver. The processor is configured to transmit, via the transceiver, radar signals for activity recognition. The processor is also configured to identify a first set of features and a second set of features from received reflections of the radar signals, the first set of features indicating whether an activity is detected based on power of the received reflections. Based on the first set of features indicating that the activity is detected, the processor is configured to compare one or more of the second set of features to respective thresholds to determine whether a condition is satisfied. After a determination that the condition is satisfied, the processor is configured to perform an action based on a cropped portion of the second set of features.

In another embodiment, a method is provided. The method includes transmitting, via a transceiver, radar signals for activity recognition. The method also includes identifying a first set of features and a second set of features from received reflections of the radar signals, the first set of features indicating whether an activity is detected based on power of the received reflections. Based on the first set of features indicating that the activity is detected, the method includes comparing one or more of the second set of features to respective thresholds to determine whether a condition is satisfied. After a determination that the condition is satisfied, the method includes performing an action based on a cropped portion of the second set of features.

In yet another embodiment a non-transitory computer-readable medium embodying a computer program, the computer program comprising computer readable program code that, when executed by a processor of an electronic device, causes the processor to: transmit, via a transceiver, radar signals for activity recognition; identify a first set of features and a second set of features from received reflections of the radar signals, the first set of features indicating whether an activity is detected based on power of the received reflections; based on the first set of features indicating that the activity is detected, compare one or more of the second set of features to respective thresholds to determine whether a condition is satisfied; and after a determination that the condition is satisfied, perform an action based on a cropped portion of the second set of features.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
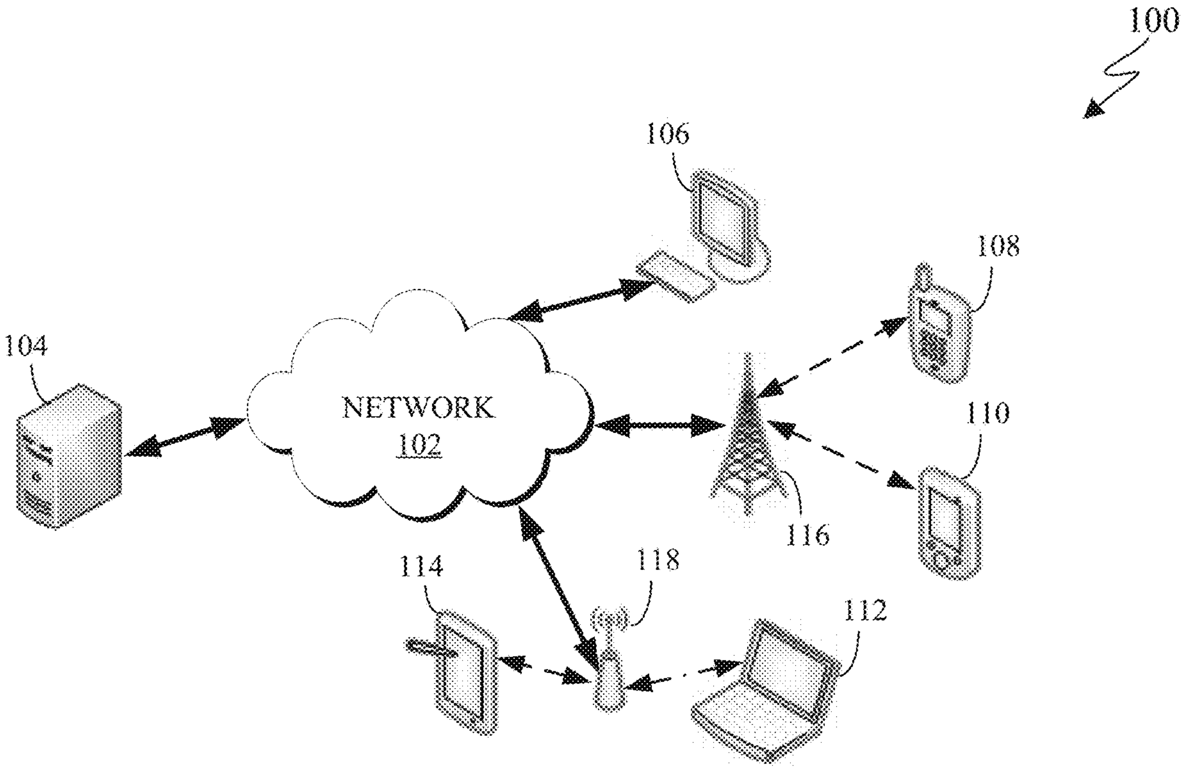
FIG. 1 illustrates an example communication system in accordance with an embodiment of this disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

An electronic device, according to embodiments of the present disclosure can include a user equipment (UE) such as a 5G terminal. The electronic device can also refer to any component such as mobile station, subscriber station, remote terminal, wireless terminal, receive point, vehicle, or user device. The electronic device could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. Additionally, the electronic device can include a personal computer (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), a portable multimedia player (PMP), an MP3 player, a mobile medical device, a virtual reality headset, a portable game console, a camera, and a wearable device, among others. Additionally, the electronic device can be at least one of a part of a piece of furniture or building/structure, an electronic board, an electronic signature receiving device, a projector, or a measurement device. The electronic device is one or a combination of the above-listed devices. Additionally, the electronic device as disclosed herein is not limited to the above-listed devices and can include new electronic devices depending on the development of technology. It is noted that as used herein, the term "user" may denote a human or another device (such as an artificial intelligent electronic device) using the electronic device.

Certain electronic devices include a graphical user interface (GUI) such as a display that allows a user to view information displayed on the display in order to interact with the electronic device. Electronic devices can also include a user input device, such as keyboard, a mouse, a touchpad, a camera, a microphone, among others. The various types of input devices allow a user to interact with the electronic device. The input devices can be operably connected to the electronic device via a wired or wireless connection. Certain electronic devices can also include a combination of a user input device and a GUI, such as a touch screen. Touch screens allow a user to interact with the electronic device via touching the display screen itself.

Embodiments of the present disclosure recognize and take into consideration that input devices can be cumbersome to use on portable electronic devices since the input devices would need to be carried along with the portable electronic device. Additionally, embodiments of the present disclosure recognize and take into consideration that, the user may be unable to directly touch the input device or a touch screen when the user is unable to reach the electronic device, or uncleaned hands. For example, when the user is wearing gloves, the touch screen may have difficulty detecting the touch input. Similarly, the user may not desire to touch the display of the electronic such as when the hands of the user are dirty or wet. Moreover, embodiments of the present disclosure recognize and take into consideration that, the user may be unable to verbally command an electronic device (such as a virtual assistant) to perform a task.

Accordingly, embodiments of the present disclosure provide user interface mechanisms and methods in which the user can interact with the electronic device while not necessarily verbally commanding the electronic device, or physically touching either the electronic device or a user input device that is operably connected to the electronic device. For example, embodiments of the present disclosure provide system and methods for activity detection and recognition. An activity can include a gesture such as detected movements of an external object that is used to control the electronic device. For example, a gesture can be the detected movement of a body part of the user, such as the hand or fingers of a user, which is used to control the electronic device (without the user touching the device or an input device).

Embodiments of the present disclosure recognize and take into consideration that gestures can be used to control an electronic device. However, gesture control, using a camera (such as a red-green-blue (RGB) camera or an RGB-depth (RGB-D) camera) can lead to privacy concerns, since the camera would effectively by monitoring the users constantly in order to identify a gesture. Additionally. camera-based gesture recognition solutions do not work well in all lighting condition, such as when there is insufficient ambient light.

Embodiments of the present disclosure recognize and take into consideration that radar technology is used in areas of commerce, defense and security. More recently, small, low cost and solid-state radar technologies have enabled civilian applications such as medical and automotive, enhanced human-machine interface, and smart interaction with environments. In certain embodiments, a radar system can transmit radar signals towards and one or more passive targets (or objects), which scatters signals incident on them. The radar monitors a region of interest (ROI) by transmitting signals and measures the environment's response to perform functions including but not limited to proximity sensing, vital sign detection, gesture detection, and target detection and tracking. An intermediate step in this process is activity detection, in which the radar detects the presence of activity (such as a gesture) in the region of interest. Ultra-wideband (UWB) radar can be used for activity detection and gesture identification in the ROI.

In certain embodiments, such as those described in FIG. 3 below, UWB radar includes a transceiver (or at least one radar transmitter and receiver). The transceiver can transmit a high-bandwidth pulse, receives the signal scattered from an object (also denoted as a target). The UWB radar or the electronic device can compute the channel impulse response (CIR), a signature of the target and its surroundings. The radar is equipped with one or more receive antennas ($RX_1$, $RX_2$, . . . , $RX_n$) to enable signal processing in time-frequency-space domains. The radar system can provide the targets' range, Doppler frequency, and spatial spectrum information for the time indices of interest.

Embodiments of the present disclosure take into consideration that activity detection (the ability to detect a gesture) should be in a power-efficient and in real-time. Accordingly, embodiments of the present disclosure describe minimizing the complexity of any signal processing prior to detecting the activity. By minimizing the complexity of any signal processing prior to detecting the activity can reduce power consumption. Additionally, embodiments of the present disclosure describe identifying a start and end times of an activity in real time. The start and end times can be used to crop (segment) a larger CIR. The cropped CIR can be used to identify the detected activity. In certain embodiments, the electric device can use a machine learning (ML) classifier for detecting the activity from the cropped CIR.

Embodiments of the present disclosure also recognize and take into consideration that that in gesture recognition, identifying an unintentional gesture can waist resources attempting to identify the detected activity, and if an activity is identified, the unintentional gesture can inadvertently instruct the electronic device to perform an unintended action as well as. As such, embodiments of the present disclosure provide systems and methods to reduce a detection of false or inadvertent activities.

Embodiments of the present disclosure further describe reducing detection induced latency with parameters to control the detection and false alarm probability. Parameterized latency is a time window that during the activity detection a stop time of the activity is identified. It is noted that short latency can result in a larger number of false alarm rate while a latency that is too long relays the gesture recognition resulting in a degraded user experience.

While the descriptions of the embodiments of the present discloser, describe a UWB radar-based systems for activity detection and recognition, the embodiments can be applied to any other radar based and non-radar based recognition systems. That is, the embodiments of the present disclosure are not restricted to UWB radar and can be applied to other types of sensors that can provide both range measurements, angle measurements, speed measurements or the like. It is noted that when applying the embodiments of the present disclosure using a different type of sensor (a sensor other than a radar transceiver), various components may need to be tuned accordingly.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone (such as a UE), a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100, such as wearable devices. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a measuring (or radar) transceiver.

In this example, some client devices 108-114 communicate indirectly with the network 102. For example, the mobile device 108 and PDA 110 communicate via one or more base stations 116, such as cellular base stations or eNodeBs (eNBs) or gNodeBs (gNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

In certain embodiments, any of the client devices 106-116 can emit and receive UWB signals via a measuring transceiver. For example, the mobile device 108 can transmit a UWB signal for activity detection and gesture recognition. Based on the received signals, the mobile device 108 can identify a start time of the activity, and stop time of the activity, and various features that can be used to identify the gesture. In certain embodiments, a ML classifier can identify the activity. Thereafter, the mobile device 108 can perform an action corresponding to the identified activity.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
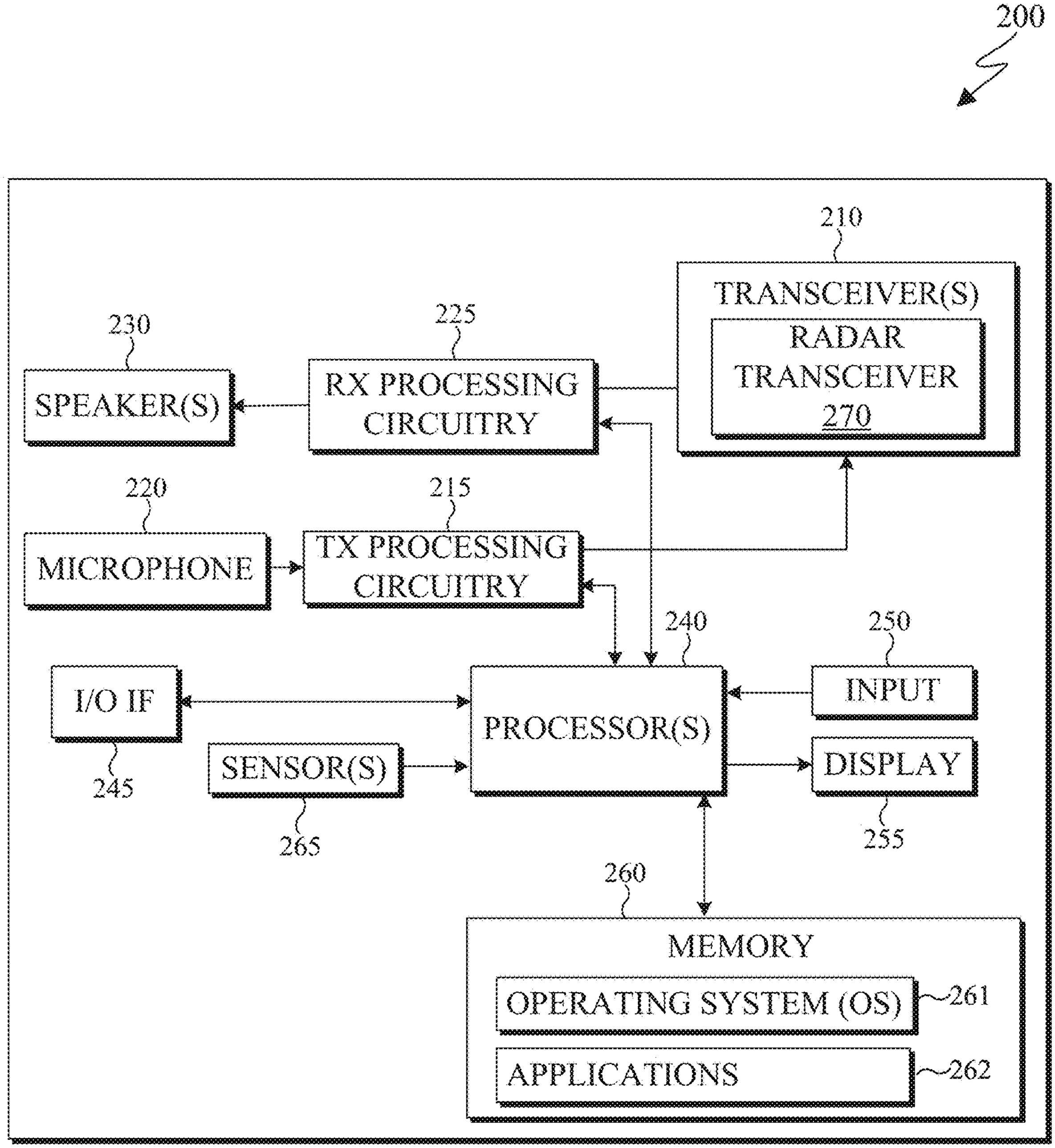
FIG. 2 illustrates an example electronic device in accordance with an embodiment of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a UE, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a radio frequency (RF) transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array including numerous antennas. For example, the transceiver(s) 210 can be equipped with multiple antenna elements. There can also be one or more antenna modules fitted on the terminal where each module can have one or more antenna elements. The antennas of the antenna array can include a radiating element composed of a conductive material or a conductive pattern formed in or on a substrate. As illustrated, the transceiver 210 also includes a radar transceiver 270. The radar transceiver 270 is discussed in greater detail below.

The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, the radar transceiver 270, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active-matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

In this embodiment, one of the one or more transceivers in the transceiver 210 is a radar transceiver 270 that is configured to transmit and receive signals for detecting and ranging purposes. The radar transceiver 270 can transmit and receive signals for measuring range and speed of an object that is external to the electronic device 200. The radar transceiver 270 can also transmit and receive signals for measuring the angle a detected object relative to the electronic device 200. For example, the radar transceiver 270 can transmit one or more signals that when reflected off of a moving object and received by the radar transceiver 270 can be used for determining the range (distance between the object and the electronic device 200), the speed of the object, the angle (angle between the object and the electronic device 200), or any combination thereof. The radar transceiver 270 may be any type of transceiver including, but not limited to a WiFi transceiver, for example, an 802.11ay transceiver, a UWB transceiver, and the like. The radar transceiver 270 can transmit signals at a various frequencies, such as in UWB. The radar transceiver 270 can receive the signals from an external electronic device as well as signals that were originally transmitted by the electronic device 300 and reflected off of an object external to the electronic device.

The radar transceiver 270 may be any type of transceiver including, but not limited to a radar transceiver. The radar transceiver 270 can include a radar sensor. The radar transceiver 270 can receive the signals, which were originally transmitted from the radar transceiver 270, after the signals have bounced or reflected off of target objects in the surrounding environment of the electronic device 200. In certain embodiments, the radar transceiver 270 is a monostatic radar as the transmitter of the radar signal and the receiver, for the delayed echo, are positioned at the same or similar location. For example, the transmitter and the receiver can use the same antenna or nearly co-co-located while using separate, but adjacent antennas. Monostatic radars are assumed coherent, such as when the transmitter and receiver are synchronized via a common time reference.

The processor 240 can analyze the time difference, based on the time stamps of transmitted and received signals, to measure the distance of the target objects from the electronic device 200. Based on the time differences, the processor 240 can generate location information, indicating a distance that the external electronic device is from the electronic device 200. In certain embodiments, the radar transceiver 270 is a sensor that can detect range and AOA of another electronic device. For example, the radar transceiver 270 can identify changes in azimuth and/or elevation of the external object relative to the radar transceiver 270.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

Figure 3:
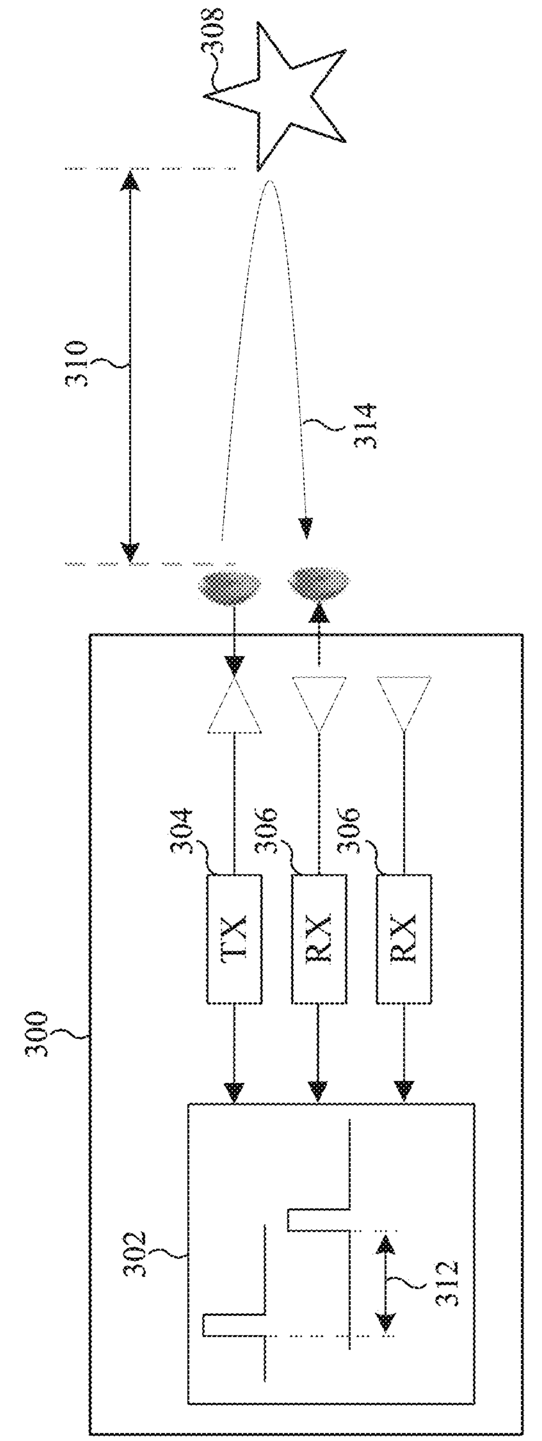
FIG. 3 illustrates an example architecture of a monostatic radar signal according to embodiments of this disclosure.

FIG. 3 illustrates an example architecture of a radar signal according to embodiments of this disclosure. The embodiments of FIG. 3 is for illustration only and other embodiments can be used without departing from the scope of the present disclosure.

FIG. 3 illustrates an electronic device 300 that includes a processor 302, a transmitter 304, and a receivers 306. The electronic device 300 can be similar to any of the client devices 106-114 of FIG. 1, the server 104 of FIG. 1, or the electronic device 200 of FIG. 2. The processor 302 is similar to the processor 240 of FIG. 2. Additionally, the transmitter 304 and the receiver 306 can be included within the radar transceiver 270 of FIG. 2.

The transmitter 304 of the electronic device 300 transmits a signal 314 to the target object 308. The target object 308 is located a distance 310 from the electronic device 300. For example, the transmitter 304 transmits a signal 314 via an antenna. In certain embodiments, the target object 308 corresponds to an external object (such as a human body part or a protective case of the electronic device 300). The signal 314 is reflected off of the target object 308 and received by the receiver 306, via an antenna. The signal 314 represents one or many signals that can be transmitted from the transmitter 304 and reflected off of the target object 308. The processor 302 can identify the information associated with the target object 308, such as the speed the target object 308 is moving and the distance the target object 308 is from the electronic device 300, based on the receiver 306 receiving the multiple reflections of the signals, over a period of time.

Leakage (not shown) represents radar signals that are transmitted from the antenna associated with transmitter 304 and are directly received by the antenna associated with the receiver 306 without being reflected off of the target object 308.

In order to detect the target object 308, the processor 302 analyzes a time difference 312 from when the signal 314 is transmitted by the transmitter 304 and received by the receiver 306. It is noted that the time difference 312 is also referred to as a delay, as it indicates a delay between the transmitter 304 transmitting the signal 314 and the receiver 306 receiving the signal after the signal is reflected or bounced off of the target object 308. Based on the time difference 312, the processor 302 derives the distance 310 between the electronic device 300, and the target object 308. Additionally, based on multiple time differences 312 and changes in the distance 310, the processor 302 derives the speed that the target object 308 is moving. The distance 310 (also referred to as range) is described in Equation (1). In Equation (1), $\tau$ is the round-trip propagation delay of the signal 314, and c is the speed of light (about $3\times10^8$ m/s).

$$r = \frac{c\tau}{2} \tag{1}$$

Although FIG. 3 illustrates electronic device 300 various changes can be made to FIG. 3. For example, different antenna configurations can be activated, different frame timing structures can be used or the like. FIG. 3 does not limit this disclosure to any particular radar system or apparatus.

Figure 4A:
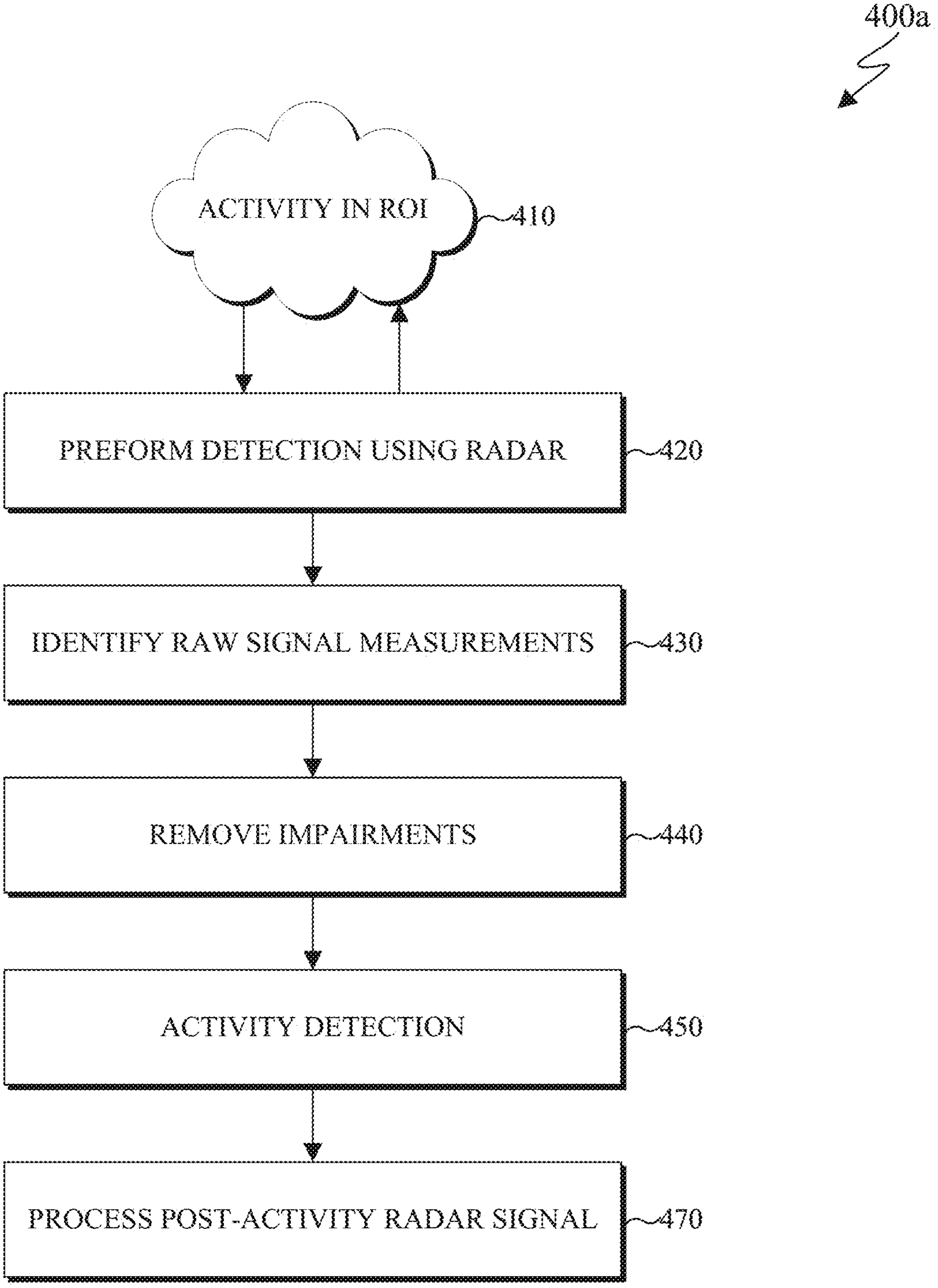
FIG. 4A illustrates an example method for activity detection-based signal processing according to embodiments of this disclosure.
Figure 4B:
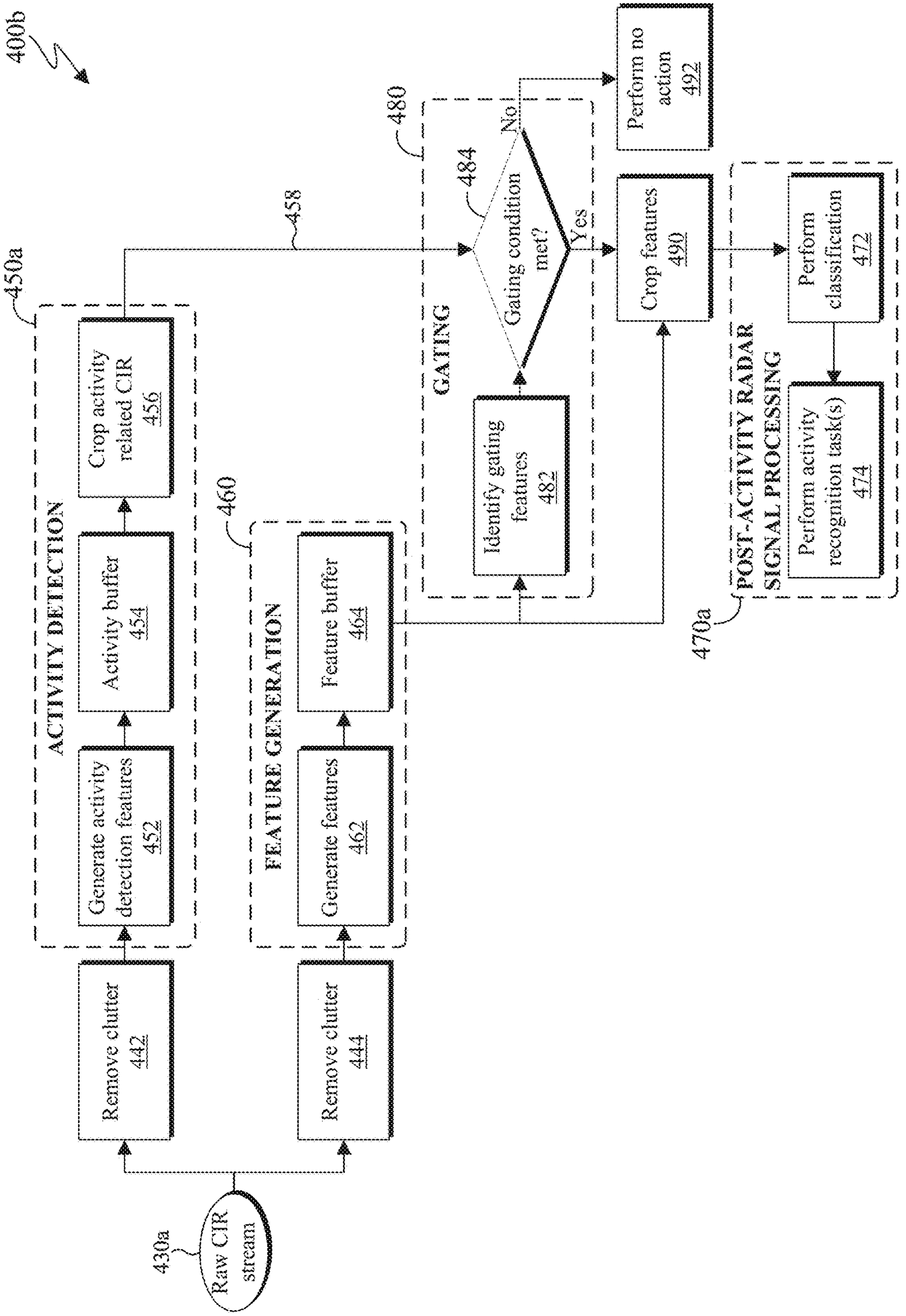
FIG. 4B illustrates an example signal processing pipeline for activity detection according to embodiments of this disclosure.
Figure 5A:
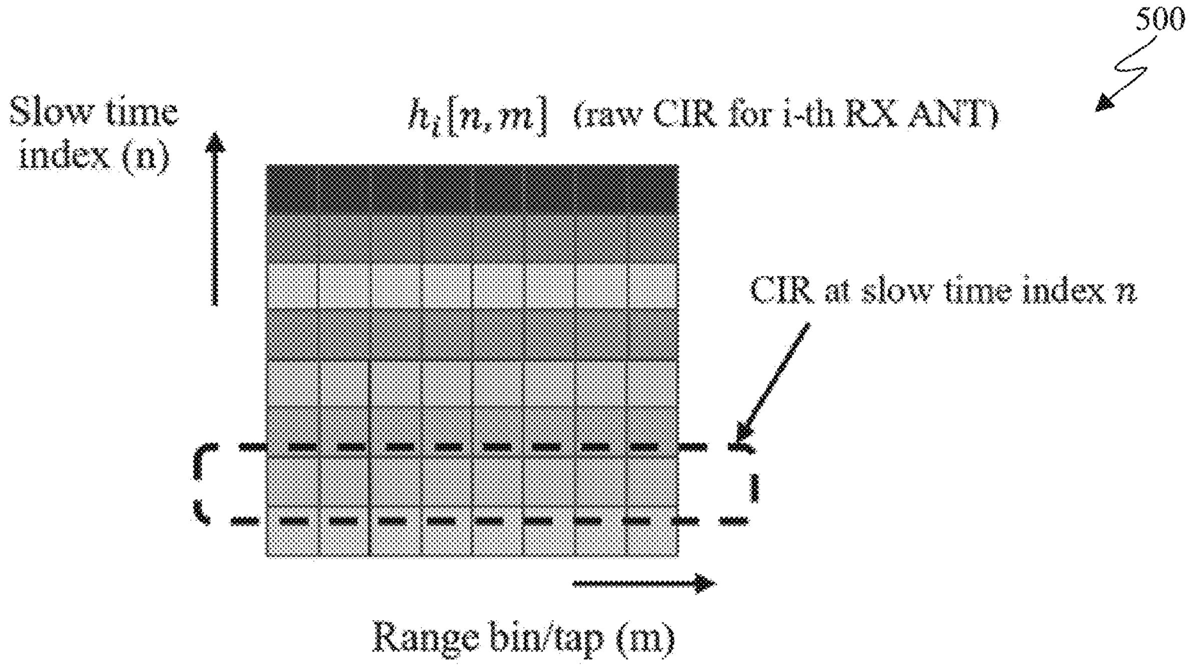
FIG. 5A illustrates an example diagram of a channel impulse response (CIR) according to embodiments of this disclosure.
Figure 5B:
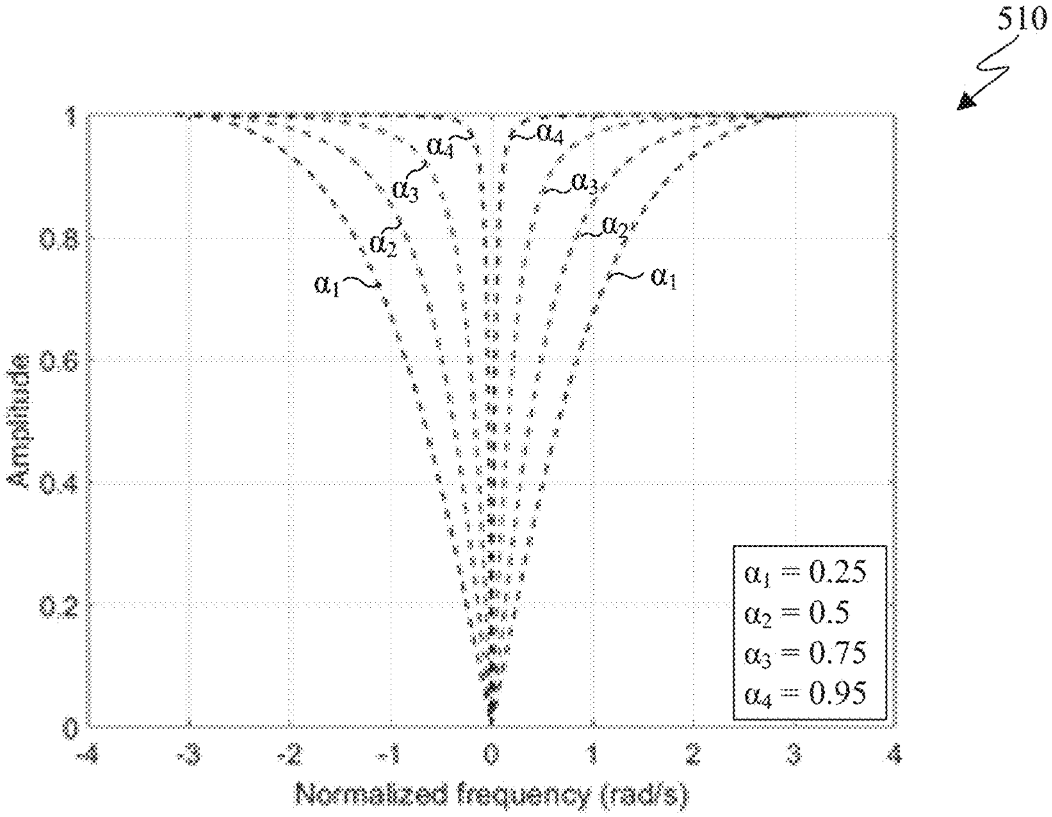
FIG. 5B illustrates an example of graph of a frequency response of a high-pass impulse response filter according to embodiments of this disclosure.
Figure 5C:
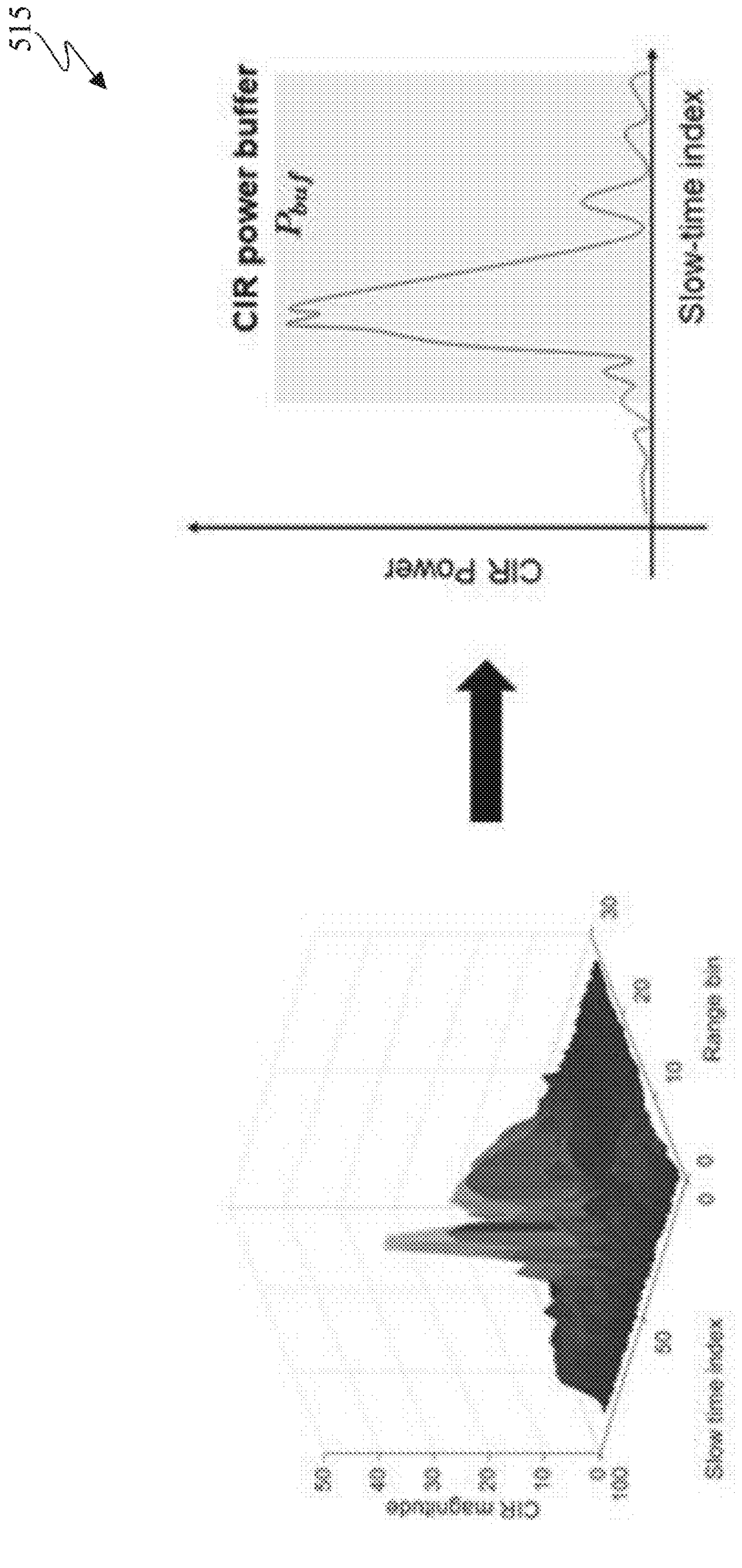
FIGS. 5C and 5D illustrates example diagrams of processing CIR according to embodiments of this disclosure.
Figure 5D:
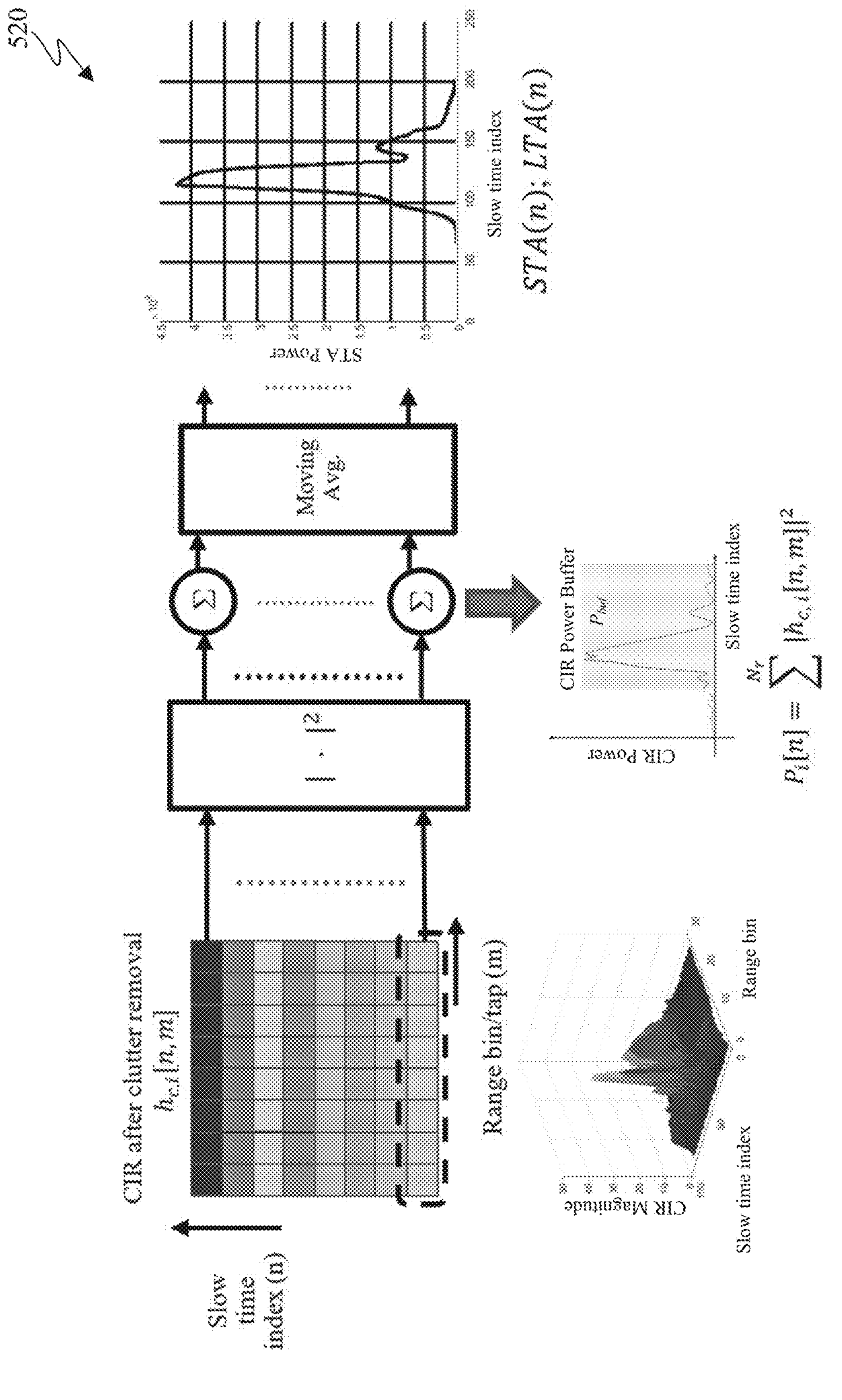

FIG. 4A illustrates an example method 400*a* for activity detection-based signal processing according to embodiments of this disclosure. FIG. 4B illustrates an example signal processing pipeline 400*b* for activity detection according to embodiments of this disclosure. FIG. 5A illustrates an example diagram 500 of a CIR according to embodiments of this disclosure. FIG. 5B illustrates an example of graph 510 of a frequency response of a high-pass impulse response filter according to embodiments of this disclosure. FIGS. 5C and 5D illustrates example diagrams 515 and 520, respectively, of processing CIR according to embodiments of this disclosure.

The method 400*a* and the signal processing pipeline 400*b* are described as implemented by any one of the client device 106-114 of FIG. 1, the server 104 of FIG. 1, the electronic device 300 of FIG. 3, and can include internal components similar to that of electronic device 200 of FIG. 2. However, the method 400*a* as shown in FIG. 4A and the signal processing pipeline 400*b* as shown in FIG. 4B could be used with any other suitable electronic device and in any suitable system, such as when performed by the electronic device 200. For ease of explanation, the method of FIG. 4A and the signal processing pipeline of FIG. 4B, are described as being performed by the electronic device 200 of FIG. 2.

The embodiments of the method 400*a* of FIG. 4A, the signal processing pipeline 400*b* of FIG. 4B, the diagrams 500, 515, and 520 of FIGS. 5A, 5C, and 5D, respectively, as well as the graph of FIG. 5B are for illustration only. Other embodiments can be used without departing from the scope of the present disclosure.

The method 400*a* of FIG. 4A and the signal processing pipeline 400*b* of FIG. 4B describe processing radar frames for identifying a gesture.

In step 420, the electronic device 200 performs activity detection using radar signals. For example, the electronic device 200, transmits an RF signal, which are scattered by one or more objects in the ROI. The activity that is detected can be an activity performed in the ROI (step 410). For example, the activity in the ROI could be a user performing a gesture that instructs the electronic device 200 to perform an action. For another example, the activity in the ROI could be the presence of an object which is used for proximity detection. For yet another example, the activity in the ROI could at least a part of a person for monitoring vitals of the person.

In certain embodiments, the radar signals are UWB signals. For example, a UWB pulse can be transmitted from the TX (such as the transmitter 304 of FIG. 3) is scattered by the target and its environment (such as the object 308 of FIG. 3), and received on antennas RX 1, RX 2, RX N (such as the receiver(s) 306 of FIG. 3). The CIR can be estimated in the UWB radar (such as the radar transceiver 270 of FIG. 2), which is the input to the front-end signal processing modules in this disclosure. The raw CIR at the $n^{th}$ slow time index and $m^{th}$ range bin on the $i^{th}$ RX antenna (i=1, 2, . . . , N) is denoted by $h_i[n, m](m=1, 2, \ldots, N_r)$, where $N_r$ is the number of range bins. This is illustrated the diagram 500 of FIG. 5A.

Specifically, for a given RX antenna, when a pulse is transmitted, the radar receives its echoes reflected from the target. The distance from the antenna to the target can be expressed as described in Equation (2), below. In Equation (2), the expression do is the nominal distance between antenna and the object, and d(t) represents the displacement caused by target activity or motion.

$$s(t)=d_0+d(t) \tag{2}$$

The normalized received pulse is denoted by δ(t), and the total impulse response is described in Equation (3), below. In Equation (3), t is the observation time and τ is the propagation time. The expression '$A_k\delta(\tau-\tau_k(t))$' denotes the response due to target activity or motion with propagation time $\tau_k(t)$ and amplitude $A_k$. The expression $\Sigma_i A_i\delta(\tau-\tau_i)$ denotes the response from all multipath components, with $A_i$ being the amplitude of the $i^{th}$ multipath component, and $\tau_i$ being the propagation time of the $i^{th}$ multipath component. The propagation time $\tau_k(t)$ is determined by the antenna distance s(t), and described in Equation (4), below. In Equation (4), c is the speed of light (about $3\times10^8$ m/s).

$$r(t, \tau) = A_k\delta(\tau - \tau k(t)) + \sum_i A_i\delta(\tau - \tau_i) \tag{3}$$

$$\tau_k(t) = \frac{2s(t)}{c} \tag{4}$$

In certain embodiments, the firmware of the UWB radar module samples the continuous-time total impulse response r(t,τ) and generates a two-dimensional (2D) n×m matrix, denoted by h[n, m], described in Equation (5), below. In Equation (5), 'n' and 'm' represent the sampling numbers in slow time and fast time, respectively. $T_s$ is the pulse duration in slow time, and $T_f$ is the fast time sampling interval. Hence, as shown in FIG. 5, the row vectors record the received signals at different observation times at each range bin while the column vectors record one pulse reflected from different range bins. Therefore, the raw CIR is denoted by $h[n, m](m=1, 2, \ldots, N_r)$ for the $n^{th}$ slow time index and $m^{th}$ range bin on the given RX antenna, where $N_r$ is the number of range bins. An example representation of the n×m matrix that represents the raw CIR for the ith RX antenna, denoted by $h_i[n, m]$, is shown below.

$$h[n, m] = r(t = nTs, \tau = mTf) \tag{5}$$

In step 430, the electronic device 200 identifies raw signal measurements from the received radar signals. For example, the received signal(s) is processed, in step 430, to obtain the raw CIR. The raw RIC can include contributions from the target of interest, objects that are not or interest (clutter), and time-varying hardware impairments.

In step 440, the electronic device 200 removes impairments. Impairments can include noise and/or leakage. For example, the contributions of clutter and hardware impairments such as leakage are filtered in step 440 from the raw CIR. Removing impairments is described in FIGS. 4B, and 5B, below.

The received signal can include 'clutter,' which are reflections of the TX UWB pulse due to static or very slow-moving objects in the vicinity of the target. In certain embodiments, the electric device 200 uses a high-pass IIR filter to suppress the clutter components. Intuitively, slow moving targets in the environment manifest as low-Doppler/low-frequency components in the CIR, and therefore a high pass IIR filter is effective for filtering out reflections of the TX UWB pulse due to static or very slow-moving objects. In the time domain, the 'clutter-removed CIR' $h_{c,i}[n, m]$ can be described in Equation (6), below.

$$h_{c,i}[n, m] = h_i[n, m] - c_i[n, m] \tag{6}$$

The $c_i[n, m]$ is the estimated clutter for the $i^{th}$ RX antenna. One of the estimation method is described in Equation (7), below. In Equation (7), a is the clutter filter parameter, which controls the high pass filter response. α has to be within the range from 0 to 1.

$$c_i[n, m] = \alpha c_i[n-1, m] + (1-\alpha)h_i[n, m] \tag{7}$$

The z-transform of the clutter removal filter is described in Equation (8), below.

$$H(z) = \frac{Y(z)}{X(z)} = \frac{\alpha(1-z^{-1})}{1-\alpha z^{-1}} \tag{8}$$

The graph 510 as illustrated in FIG. 5B describes the frequency response of the high-pass IIR filter corresponding to different α parameter. The higher α is, the lower cut-off frequency of the high-pass filter is. In certain embodiments, the parameter α could be set between 0.5 to 0.85. It is noted that the parameter α is not limited thereto and can be other values as well.

In step 450, the electronic device 200 detects whether an activity occurred within the ROI of the radar. The electronic device 200 utilizes the CIR peak and/or average power signatures and Doppler-based features to detect an activity for activity detection.

In certain embodiments, the electronic device 200 can perform three separate tasks for detecting an activity, including (i) identifying features (step 452 of FIG. 4B), (ii) storing the features in a memory buffer (step 454 of FIG. 4B), and (iii) cropping the features (step 456 of FIG. 4B). To detect whether an activity occurred within the ROI, the electronic device 200 can convert the filtered CIR into low-complexity features including but not limited to instantaneous power, Range-slow-time power map and the like. These low-complexity features are discussed in further detail below. The electronic device 200 can then store these values, in a memory buffer (such as the memory 260 of FIG. 2). In certain embodiments, the values can be stored in a one-dimensional (1D) or two-dimensional (2D) array. The electronic device 200 can also processes a time-series of one or more of these features stored in the memory buffer to determine whether there is target activity in the radar's ROI. In addition to detecting an activity (in step 450), the electronic device 200 can identify a start and stop times of the activity in the ROI. The electronic device 200 can also crop (segment) the filtered CIR using the 'start' and 'stop' times of the activity in the ROI. FIG. 4B and FIGS. 6A-7 describes the step 450 in greater details.

In certain embodiments, the electronic device 200 continually detects for an activity within the ROI. In other embodiments, the electronic device 200 detects for an activity following a schedule or a triggering event.

During the activity detection operation, the electronic device 200 can reject unwanted movements to avoid triggering the computationally demanding gesture recognition. For example, if the electronic device 200 performs gesture recognition for any activity, would use a significant amount of processing power. As such, the activity detection of step 450 simply determines whether the detected activity could correspond to a gesture.

Using the cropped CIR, the electronic device 200, in step 470, performs post activity radar signal processing. The post activity radar signal processing extracts activity-specific features and executes an appreciate function. For example, the electronic device 200, can perform a ML classification to identify the activity. The electronic device 200 can then perform a task (function) corresponding to the identified activity. In certain embodiments, the electronic device 200 can perform three separate tasks for detecting an activity, including (i) identifying features, (ii) performing a ML based inference to recognize the detected activity, and (iii) performing a task corresponding to the activity-based recognition. FIGS. 11A-11G describe the post activity radar signal processing of step 470 in greater detail.

It is noted that by detected an activity before identifying the gesture associated with the activity minimize the latency induced by the activity detection, control the detect ion rate and reduce the false alarm rate.

The signal processing pipeline 400*b* as illustrated in FIG. 4B describes the method 400*a* of FIG. 4A in greater detail.

As illustrated in the signal processing pipeline 400*b*, raw CIR stream 430*a* is obtained. The raw CIR stream 430*a* can be similar to the raw signal measurements identified in step 430 of FIG. 4A. The raw CIR stream 430*a* is provided to two separate branches, that of (i) the activity detection branch 450*a* and (ii) the feature generation branch 460. The activity detection branch 450*a* is similar to the step 450 of FIG. 4A. For example, the activity detection branch 450*a* of FIG. 4B and the step 450 of FIG. 4B (also denoted as an activity detection operation) detect whether an activity occurred within the ROI of the radar.

In certain embodiments, the activity detection branch 450*a* is configured to detect larger and faster movements (gestures) with low latency as compared to the feature generation branch 460. That is, Doppler information is heavily attenuated during the clutter removal of step 442. In contrast, the feature generation branch 460 preserves low-Doppler information as long as the frequency content is will separated from the clutter during the clutter removal of step 444.

The clutter removal of steps 442 and 444 are similar to the step 440 of FIG. 4A. In certain embodiments, the value of the α parameter in step 442 is smaller than the value of the α parameter in step 444. For example, using a small α parameter in step 442, the cut off frequency of the CIR of the activity detection branch 450*a* is smaller for the activity detection branch 450*a*. In contrast, using a larger α parameter in step 444, the cut off frequency is larger for the feature generation branch 460.

The activity detection branch 450*a* converts the filtered CIR into low-complexity features including but not limited to instantaneous power, range-slow-time power map, and the like. Second, the activity detection branch 450*a* uses a memory buffer to store these values, typically in a 1D or 2D array. The activity detection branch 450*a* processes a time-series of one or more of these features to determine whether there is target activity in the ROI of the radar and crops the filtered CIR based on a determined 'start' and 'stop' times of the activity in the ROI. Finally, the activity detection branch 450*a* forwards the segmented CIR to post-activity radar processing 470, which extract activity-specific features and execute the appropriate functionality.

In step 452, the electronic device 200 identifies activity detection features. The identified features are then stored in a buffer (step 454).

In certain embodiments, the electronic device 200 identifies features including a 1D feature CIR (instantaneous) power. The 1D feature CIR (instantaneous) power is described in Equation (9), below. For example, as described in Equation (9), the 1D feature CIR is identified by taking a sum along the range (or fast time) domain.

$$P_i[n] = \sum_{m=1}^{N_r} |h_{c,i}[n, m]|^2 \tag{9}$$

The time series of CIR powers are stored in an activity buffer (step 454). In certain embodiments, the buffer of step 454 can be similar to the memory 260 of FIG. 2.

In certain embodiments, the time series of CIR powers are in an activity buffer, $P_{buf}[n]$, and described in Equation (10), below. For example, FIG. 5C describes processing the CIR along a range domain to generate the CIR power buffer. Additionally, the diagram 520 of FIG. 5D illustrates pipeline for obtaining the CIR power buffer.

$$P_{buf,i}[n] = [P_i[n - N_{buf} + 1], P_i[n - N_{buf} + 2], \ldots P_i[n - 1], P_i[n]]^T \tag{10}$$

In certain embodiments, in addition to (or in alterative of) identifying the 1D feature CIR (instantaneous) power, the electronic device 200 can identify another feature in step 452. For example, the other feature generated in step 452 is the range-slow-time power map for the $i^{th}$ RX antenna, which can be expressed as $|h_i[n, m]|^2$. The range-slow-time power map for all the RX antennas can also be stored in a buffer, such as the activity buffer, (step 454). As described in further detail below, short-term average power (STA(n)) and the long-term average power (LTA(n)) for each slow-time index n can be obtained.

The features (such as one or more of the low-complexity features identified in step 452), which are stored in the buffer (step 454), can be used by the electronic device 200 to (i) determine whether there is target activity in the ROI of the radar, (ii) determine the 'start' and 'stop' times of the activity of interest, (iii) crop (segment) the CIR acquired in the time duration defined by the 'start' and 'stop' times, and (iv) trigger the post-processing blocks of the radar system to achieve the desired functionality.

In step 456, the electronic device crops (also referred to as segments) the low-complexity features stored in the buffer. For example, the electronic device 200 can remove portions of the identified features that occur before the identified start time of the activity. Similarly, the electronic device 200 can remove portions of the identified features that occur after the identified end time of the activity. The activity-related CIR segmentation is discussed in greater detail below, such as in reference to FIGS. 6A-9C.

In certain embodiments, a time series of both short-term average power-based features and long-term average power-based features (collectively referred to as "time series of features") are obtained from filtered CIRs of the activity detection branch 450*a*. A start time and a stop time of the target activity in the radar's ROI are obtained based on tracking statistical properties of the time series of features. By tracking the statistical properties of both short-term average power-based features and long-term average power-based features can provide accurate and timely determination of the start time and the stop time of the detected activity.

In certain embodiments, when the electronic device 200 determines that an activity is detected in the activity detection branch 450*a*, a trigger signal 458 is generated. In certain embodiments, the trigger signal 458 can include an indication that an activity was detected. In certain embodiments, the trigger signal 458 can include an indication of the start time and end time of the activity.

After the clutter is removed (step 444) in the feature generation branch 460, the electronic device 200 generates features (step 462). In step 462, the electronic device 200 generates features that preserve low-Doppler information. The generated features (of step 496) are stored in a buffer (step 464). The buffer of step 464 can be similar to the memory 260. In certain embodiments, the buffer of step 464 is a separate buffer than the buffer of step 454.

In certain embodiments, the electronic device 200 tracks statistical properties of the time series of features that occurs after: (i) a timeout interval (also denoted as a time-out condition) has expired; and (ii) when the maximum CIR power is greater than the maximum CIR power recorded during a previously-detected activity. The electronic device 200 utilizes a time-out condition ensure that extraneous activity detected in the immediate aftermath of target activity in the radar's ROI do not trigger the trigger signal 458 during the timeout interval, thereby mitigate false alarms that can occur during the timeout interval. The timeout condition is described in greater detail in FIGS. 9A-9C.

In certain embodiments, a gating condition check 480 is performed based on the activity detection branch 450*a* and the feature generation branch 460. For example, after obtaining the start and stop times, the filtered CIRs and/or the time series of features are segmented based on the start and stop times. However, the segmenting occurs only when certain gating conditions are met, and the gating conditions can be based on (i) power-weighted Doppler features; and/or (ii) short-term average power features. The gating condition check 480 (which are post-activity condition checks that are executed after the activity detection branch 450*a* detects an activity) mitigates false alarms that can occur during other time durations (i.e., durations other than the timeout interval).

In step 482, the electronic device 200 identifies one or more gating features from the features stored in the buffer of step 464. The identification of the one or more gating features is described in FIGS. 10A-10I, below.

In response to receiving the trigger signal 458, the electronic device 200, in step 484, determines whether one or more of the gating features satisfies a condition. When the trigger signal 458 is not received (such as when the activity detection branch 450*a* does not detect an activity) or when one or more of the gating features does not satisfies a condition, no action is performed (step 492).

Alternatively, when (i) the trigger signal 458 is received and (ii) one or more of the gating features satisfies a condition, the electronic device 200 in step 490 crops the features stored in the buffer of step 464. The electronic device can crop the features stored in the buffer of 464 based on the identified start and stop times of the activity (as identified in the activity detection branch 450*a*). The features are cropped such that a post-activity radar signal processing 470*a* receives information corresponding to an activity (gesture) over a certain time.

In step 472, the electronic device 200 performs a classification to classify an activity based on the cropped features. In certain embodiments, a ML classifier classifies the activity based on the cropped features. For example, the electronic device 200 can recognize the gesture. After the activity is classified, the electronic device 200, in step 474, performs an activity corresponding to the recognized task. The post-activity radar signal processing 470*a* can be similar to the step 470 of FIG. 4A and described in greater detail in FIGS. 11A-11G, below.

Although FIGS. 4A and 4B illustrate examples for activity detection, FIG. 5A illustrates an example CIR, FIG. 5B illustrate example graph for clutter removal, and FIGS. 5A and 5B illustrate example processes for identifying features, various changes may be made to FIGS. 4A, 4B, 5A, 5B, 5C, and 5D. For example, while shown as a series of steps, various steps in FIGS. 4A and 4B could overlap, occur in parallel, or occur any number of times. For another Example, the clutter filter parameter α, can be set to other values.

Figure 6A:
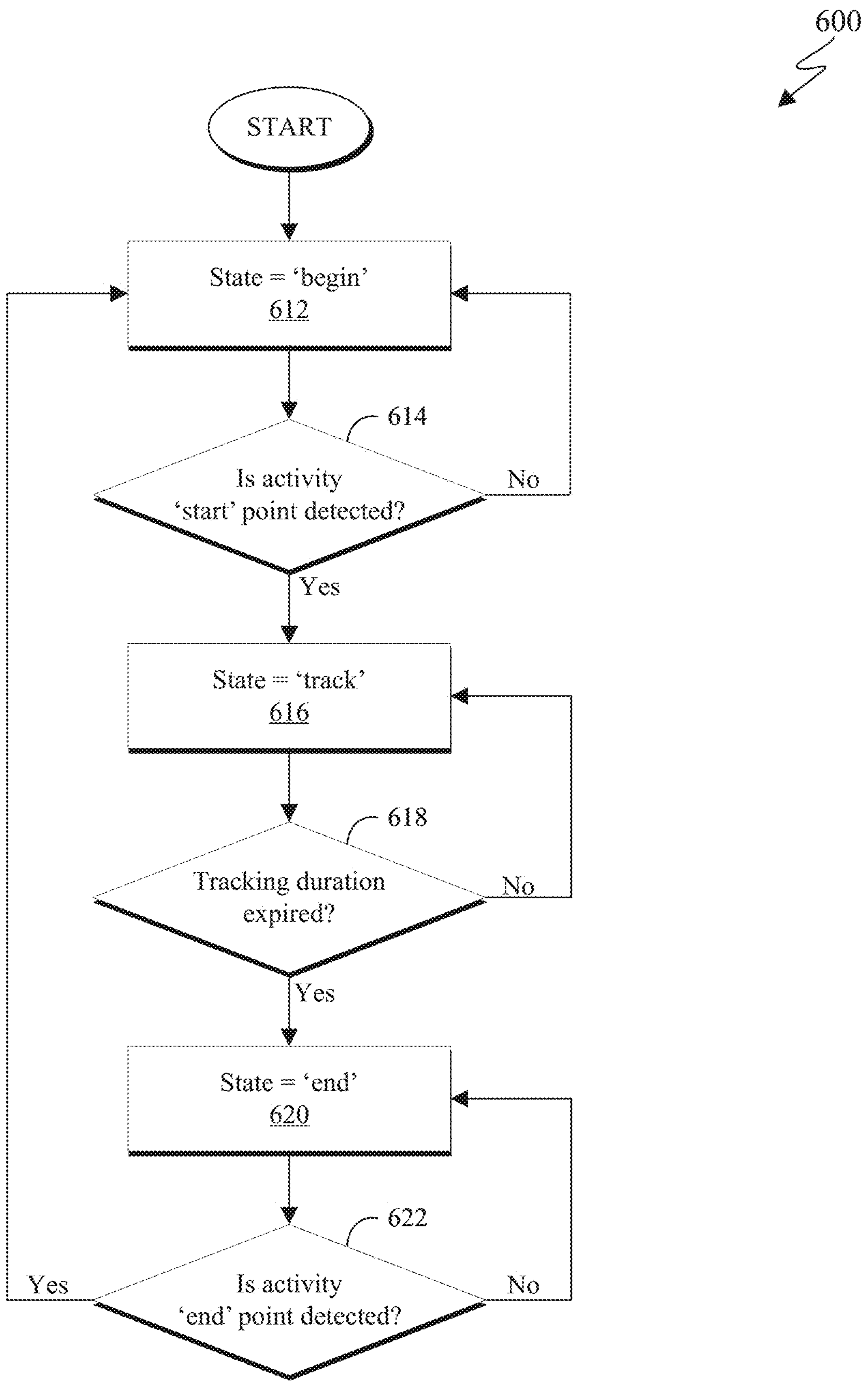
FIG. 6A illustrates an example method describing the various states for activity detection according to embodiments of this disclosure.
Figure 6B:
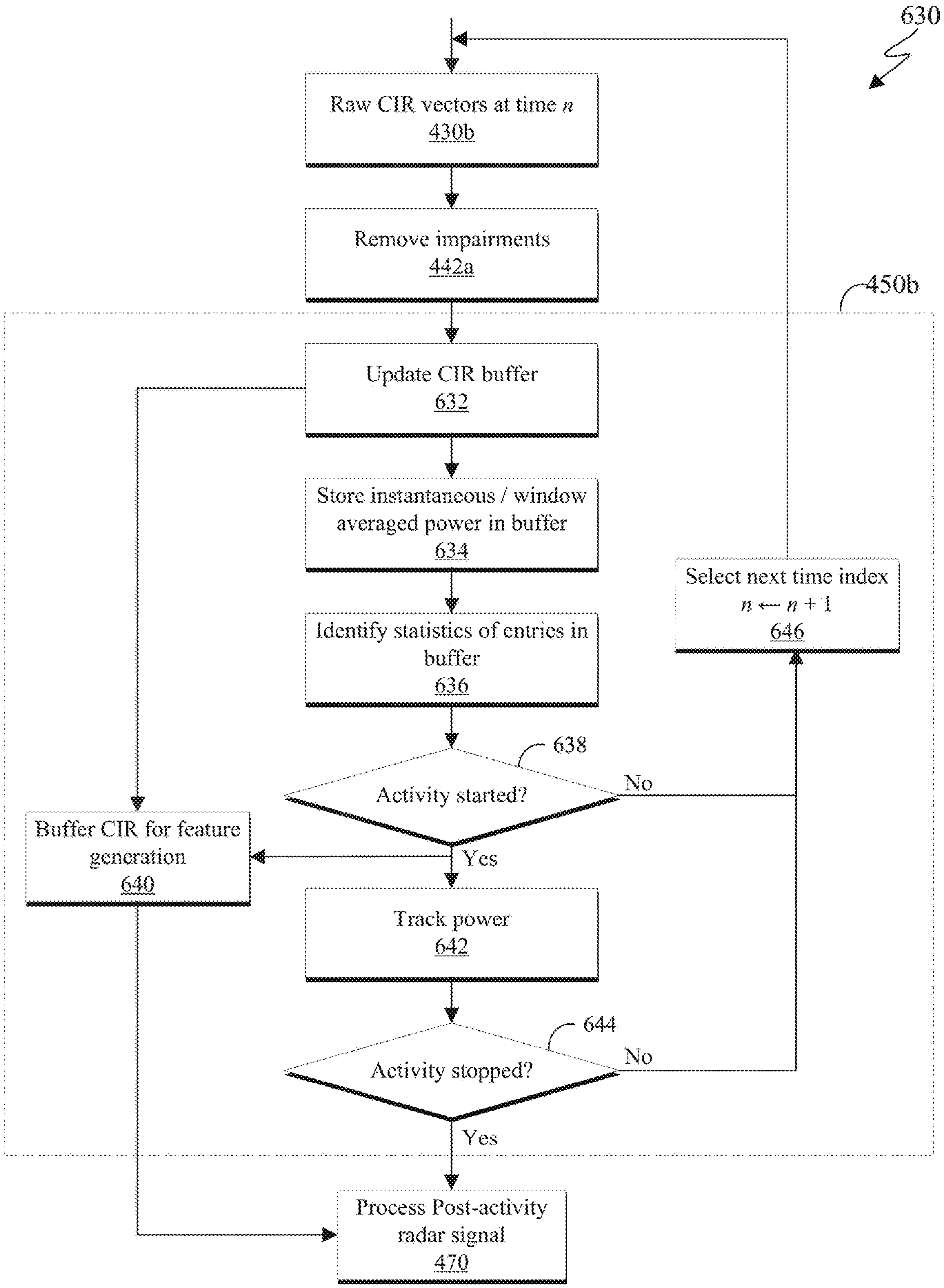
FIG. 6B illustrates an example method for power-based activity detection according to embodiments of this disclosure.
Figure 7:
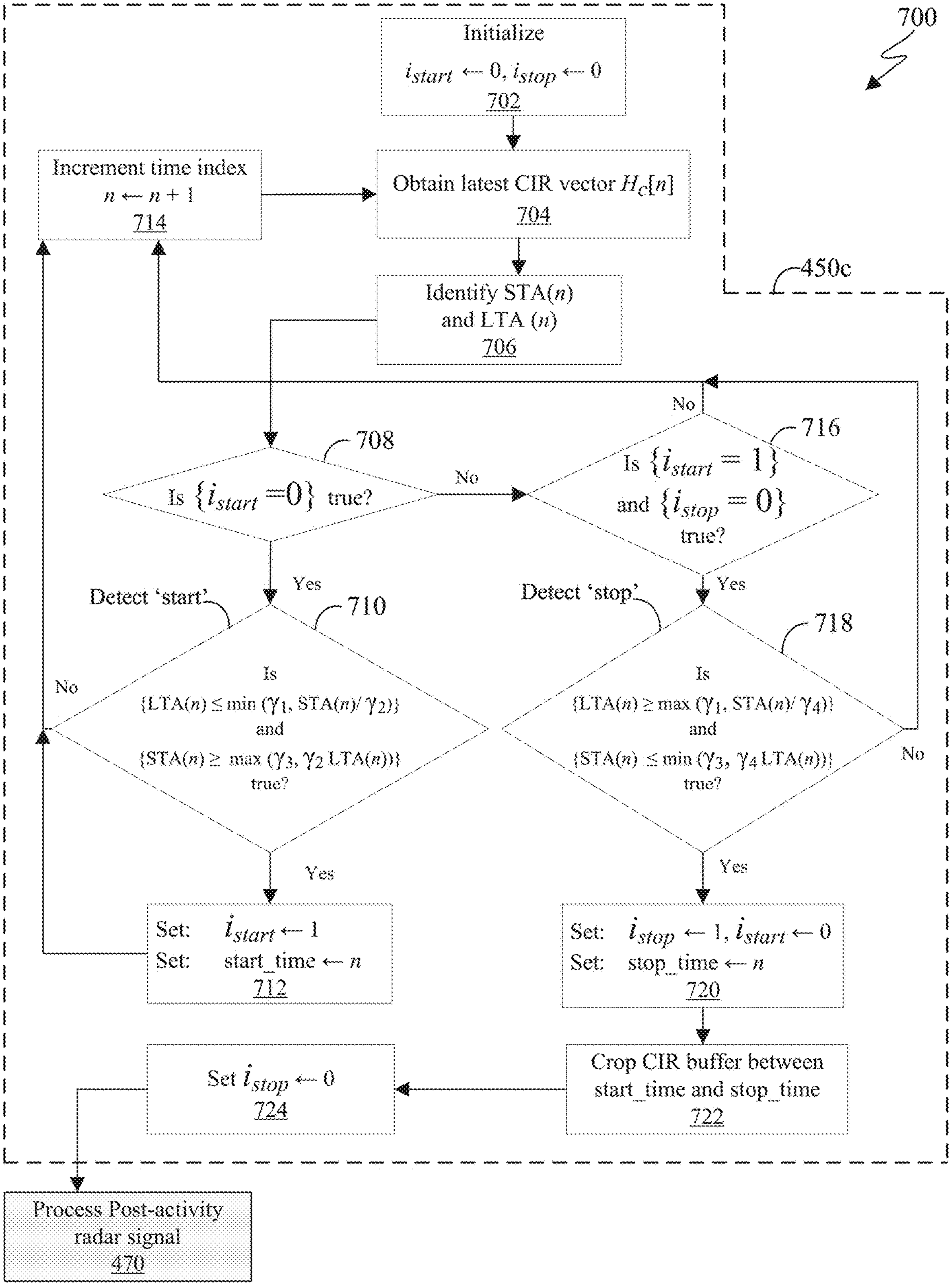
FIG. 7 illustrates an example method for moving average power-based activity detection according to embodiments of this disclosure.
Figure 8A:
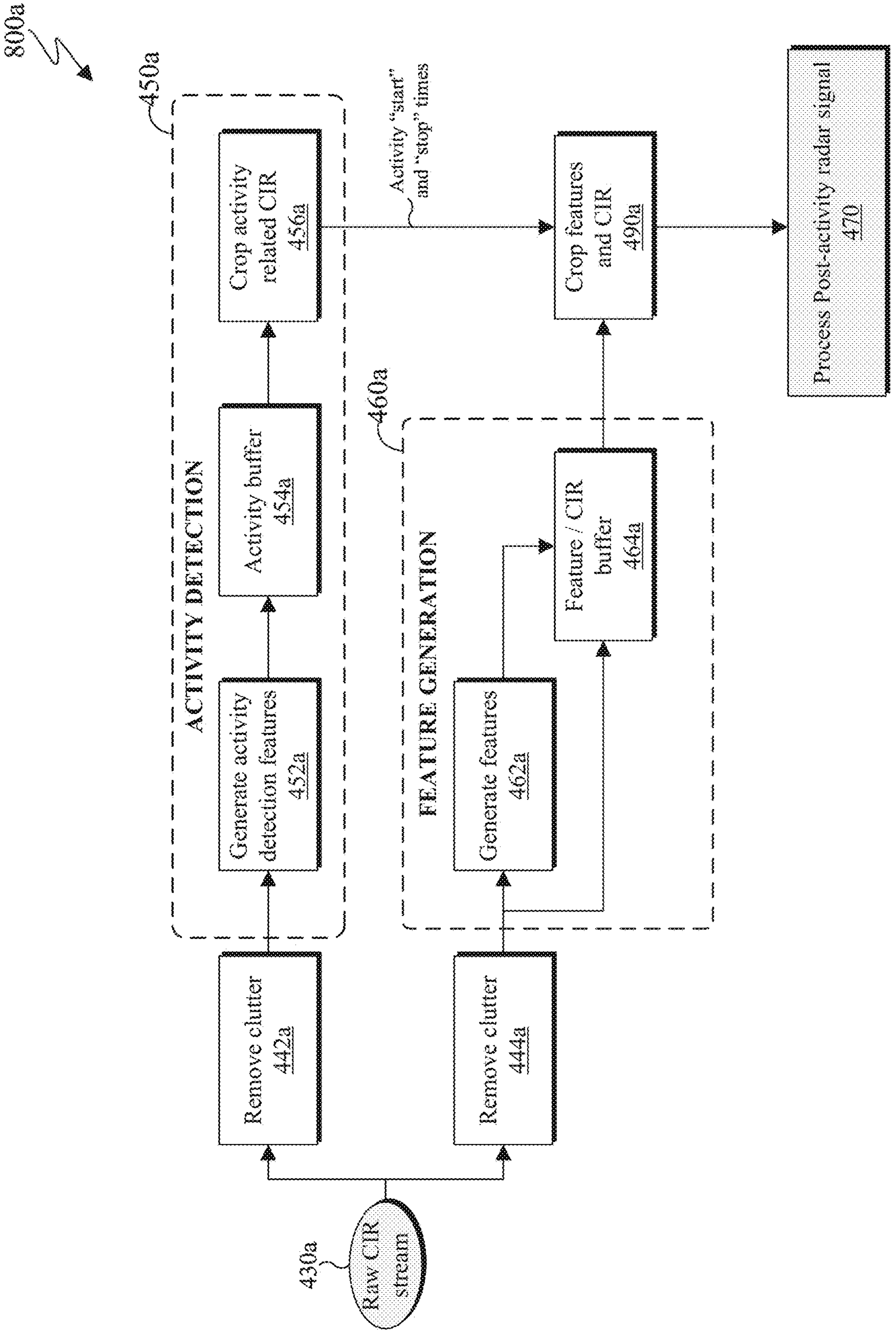
FIG. 8A illustrates an example signal processing pipeline for power ratio-based activity detection according to embodiments of this disclosure.
Figure 8B:
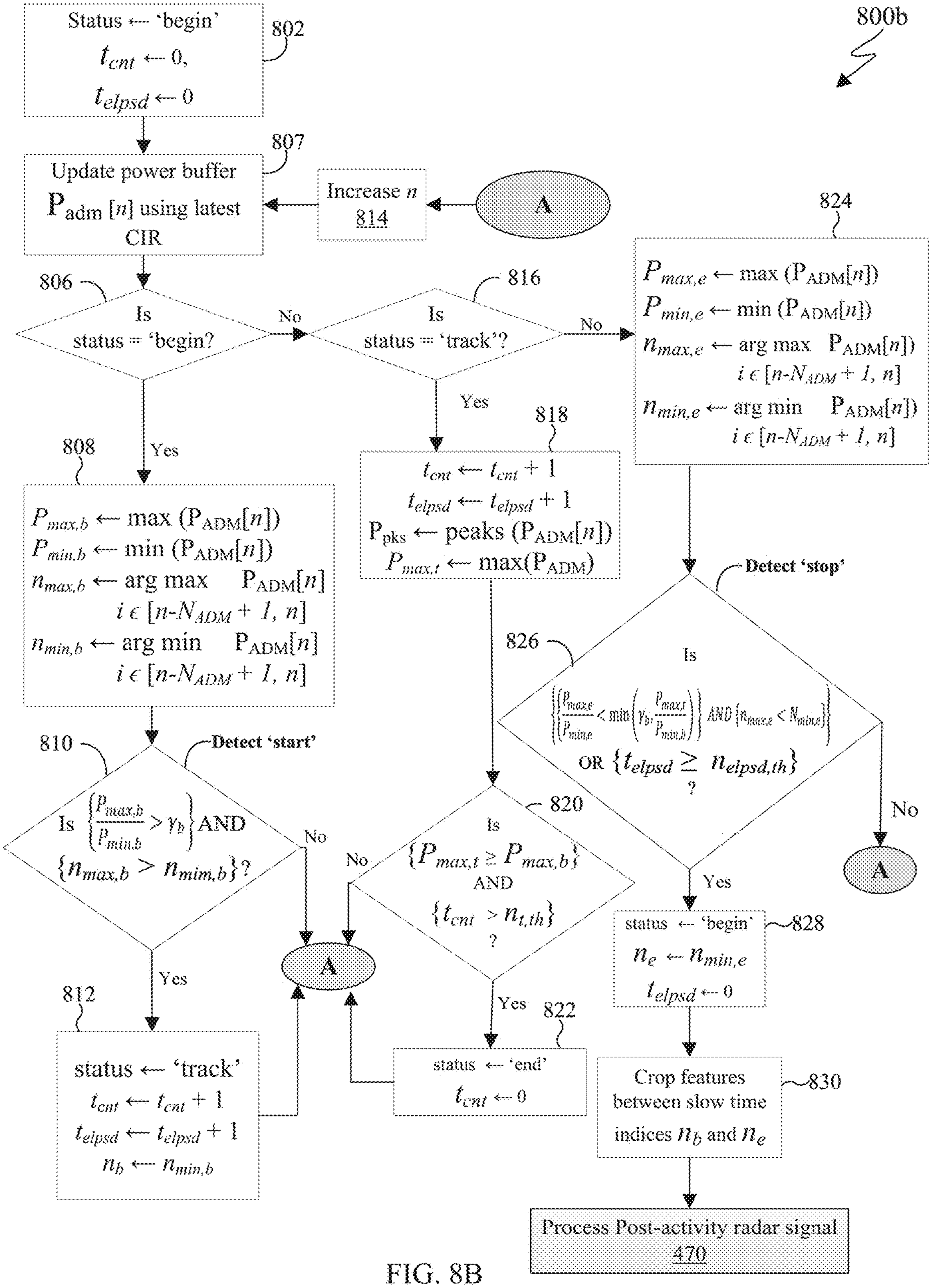
FIG. 8B illustrates an example method for power ratio-based activity detection according to embodiments of this disclosure.

FIG. 6A illustrates an example method 600 describing the various states for activity detection according to embodiments of this disclosure. FIG. 6B illustrates an example method 630 for power-based activity detection according to embodiments of this disclosure. FIG. 7 illustrates an example method 700 for moving average power-based activity detection according to embodiments of this disclosure. FIG. 8A illustrates an example signal processing pipeline 800*a* for power ratio-based activity detection according to embodiments of this disclosure. FIG. 8B illustrates an example method 800*b* for power ratio-based activity detection according to embodiments of this disclosure.

The method 600 of FIG. 6A, the method 630 of FIG. 6B, the method 700 of FIG. 7, the signal processing pipeline 800*a* of FIG. 8A, and the method 800*b* of FIG. 8B are described as implemented by any one of the client device 106-114 of FIG. 1, the server 104 of FIG. 1, the electronic device 300 of FIG. 3, and can include internal components similar to that of electronic device 200 of FIG. 2. However, the method 600 as shown in FIG. 6A, the method 630 as shown in FIG. 6B, the method 700 as shown in FIG. 7, the signal processing pipeline 800*a* as shown in FIG. 8A, and the method 800*b* as shown in FIG. 8B could be used with any other suitable electronic device and in any suitable system, such as when performed by the electronic device 200. For ease of explanation, the methods and signal processing pipeline of FIGS. 6A, 6B, 7, 8A and 8B, are described as being performed by the electronic device 200 of FIG. 2.

The embodiments of the method 600 of FIG. 6A, the method 630 of FIG. 6B, the method 700 of FIG. 7, the signal processing pipeline 800*a* of FIG. 8A, and the method 800*b* of FIG. 8B are for illustration only. Other embodiments can be used without departing from the scope of the present disclosure.

As described above, the activity detection operation of the step 450 of FIG. 4A and the activity detection branch 450*a* of FIG. 4B, converts the filtered CIR into low-complexity features including but not limited to instantaneous power, range-slow-time power map, and the like. Second, these features are stored typically in a 1D or 2D array in a memory buffer. Third, a time-series of one or more of these features are processed to determine whether there is target activity in the ROI of the radar and crops the filtered CIR by determining the 'start' and 'stop' times of the activity in the ROI. Finally, the cropped features are forwarded the segmented CIR to post-activity radar processing 470, which extracts activity-specific features and executes the appropriate functionality. The flowing embodiments describe methods for minimizing latency induced by activity detection and controlling a detection rate and false alarm rate of the activity detection.

In certain embodiments, there can be multiple states during an activity detection operation, based on whether an activity-related CIR is performed. The states can include a begin state (also referred to as a start state), a track state, and an end state.

The begin state is the default state of the activity detection. In this state, the activity detection operation checks if the starting point of the activity is detected, and transitions to the track state if the starting point of the activity is detected (e.g., when appropriate conditions are satisfied). Otherwise, the activity detection operation remains in the 'begin' state.

In the track state, the activity detection operation tracks the feature(s) of interest as the user activity progresses. This state is used to update the operation of the activity detection based on the of the activity's progress, such as by, by updating the conditions based on the current feature(s), which will be used to detect the stopping point reliably. This tracking is performed for a configurable duration of time, which is based on the anticipated duration of the underlying activity of interest. Once this interval has elapsed, the activity detection operation transitions into the end state.

In the end state the activity detection operation checks if the stopping point of the activity is detected. If true, the activity detection operation transitions into the begin state, and starts searching for the starting point of the subsequent activity. Otherwise, the activity detection operation remains in the 'end' state.

The method 600 of FIG. 6A describes the process of switching between the multiple activity detection states.

In step 612 the electronic device 200, while performing activity detection starts in the being state. In step 614, the electronic device 200 determines whether an activity is detected. The activity can be detected based on a predefined criteria such as described in step 638 of FIG. 6B, step 710 of FIG. 7, and step 810 of FIG. 8B. When an activity is not detected, the electronic device 200 returns to step 612. Alternatively, when an activity is detected, the electronic device 200 changes is state from the begin state to a track state (step 616).

In step 618, the electronic device 200 determines whether a tracking duration expired. The tracking duration can be a predefined time for tracking. When the tracking duration has not expired, the electronic device 200 continues to track the activity (gesture). Alternatively, when the tracking duration expired, the electronic device 200 changes from the track state to the end state (step 620).

In step 622, the electronic device 200 determines whether a stopping activity is detected. The stopping activity can be based on predefined criteria such as described in step 644 of FIG. 6B, step 718 of FIG. 7, and step 826 of FIG. 8B. When the activity is not detected, the electronic device 200 returns to step 620. Alternatively, when an activity is detected, the electronic device 200 changes its state from the end state to the begin state (step 612).

The method 630 as illustrated in FIG. 6B, describes radar-based activity detection using CIR statistics, window-averaged power, or both to detect activity. The method 630 includes the block 450*b* describing the overall process for activity detection including the start, track, and end states of the activity (as described in FIG. 6A). The block 450*b* describes the activity detection operation of step 450 of FIG. 4A and the activity detection branch 450*a* of FIG. 4B, in greater detail.

In step 430*b*, the electronic device 200 obtains raw CIR vectors at time n. The raw CIR vectors at time n can correspond to a single raw radar measurement of step 430 of FIG. 4A at a particular time as well as a CIR vector from the raw CIR stream 430*a* of FIG. 4B.

In step 442*a*, the electronic device 200 removes impairments such as clutter and leakage. The step 442*a* is similar to the step 430 of FIG. 4A and the step 442 of FIG. 4B. The raw CIR vector at time n, which has impairments removed, is stored in the buffer (step 632). The step 632 is similar to the step 454 of FIG. 4B.

In certain embodiments, the electronic device 200 converts the buffered CIR (stored in step 632) to one or more values by computing the instantaneous or window-averaged power. It is noted that the buffer of step 442*a*, the buffer of step 634, or both buffers (the buffer of step 442*a* and the buffer of step 634) can be part of the activity detection branch 450*a*. For example, the electronic device 200, in step 634 could store $P_{buf,i}[n]$, as described in Equation (9), above in a buffer.

In step 636, the electronic device 200 identifies statistics of the features within the buffers. These statistics are used to check if all the conditions for 'activity start' (step 638) and 'activity stop' (step 644) have been met.

In certain embodiments, the statistics are a ratio of STA to LTA. Statistics based on a ratio of STA to LTA as described in FIG. 7. In certain embodiments, the statistics are a ratio of $STA_{max}$ to $STA_{min}$ as described in FIG. 8B.

Upon detecting the start of an activity, the buffer for feature generation is triggered (step 640) and accumulation of the most up-to-date CIRs are initiated (step 642). Upon detecting the stop of activity, the buffer accumulation is terminated, and the buffered CIRs are post-processed (step 470) to execute the appropriate functionality. Upon determining that no activity started (step 638) or after a determination that the activity is not stopped (step 644), the electronic device 200 increases the value of n, in order to obtain a new CIR vector corresponding to a subsequent time, n.

The method 700, as illustrated in FIG. 7, describes the STA and LTA of a moving average power-based activity detection. The method 700 includes the block 450*c* describing the overall activity detection operation including the start, track, and end states of the activity (as described in FIG. 6A. The block 450*c* describes the activity detection operation of step 450 of FIG. 4A, the activity detection branch 450*a* of FIG. 4B, the block 450*b*, in greater detail.

In certain embodiments, activity detection operation (of step 450 of FIG. 4A, the activity detection branch 450*a* of FIG. 4B, the block 450*b* of FIG. 6B) uses window averaged power-based activity detection as described in FIG. 7. In step 702, the electronic device 200 initializes the expression $i_{start}$ to zero and initializes the expression $i_{stop}$ to zero.

In step 704, the electronic device 200 obtains at the most recent CIR vector $H_c[n]$. the vector can be obtained from the buffer of step 632 of FIG. 6B. In step 706, the electronic device identifies the STA(n) and LTA(n). It is noted that the step 706 is a specific example of the values for power that are stored in the buffer of step 634 of FIG. 6B. Here, in step 706, the electronic device 200 identifies low-complexity features from the clutter removed CIR, as described in Equation (11) and Equation (12). Equation (11) descries the short-term average power and Equation (12) describes the long-term average power for each slow-time index n.

$$STA(n) = \frac{1}{L_1}\sum_{l=0}^{L_1-1}\sum_{m=1}^{N_r}|h_c[n-1, m]|^2 = \frac{1}{L_1}\sum_{l=0}^{L_1-1}P_i[n-1] \tag{11}$$

$$LTA(n) = \frac{1}{L_2}\sum_{l=0}^{L_2-1}\sum_{m=1}^{N_r}|h_c[n-1, m]|^2 = \frac{1}{L_2}\sum_{l=0}^{L_2-1}P_i[n-1] \tag{12}$$

Here, in Equations (11) and (12), the LTA window $L_2$ is larger than STA window $L_1$. For example, STA reflects power changes due to an activity faster than LTA For example, the short-term average power STA(n) and the long-term average power LTA(n) can be obtained using the processing pipeline described in the diagram 520 of FIG. 5D. It is noted that the window size parameters $L_1$ (of Equation (11)) and $L_2$ (of Equation (12)) are selected such that $L_2>L_1$·L2 correspond to long term average, and L1 correspond to short term average.

As illustrated in FIG. 7, the method 700 includes a 'start' detection branch (formed by steps 708 and 710) and the 'stop' detection branch (formed by steps 716 and 718), both of which compare the STA and LTA to 'coupled' threshold values. The ratio between STA and LTA provides good signal for detecting "start" and "stop" of activity, which corresponding to increase and decrease of STA/LTA ratio, as illustrated in steps 710 and 718. Additional fixed parameters are added for robustness purpose. The coupled threshold values correspond to the statistics that are identified (computed) in step 636 of FIG. 6B. The parameters $\gamma_1$, $\gamma_2$, $\gamma_3$ and $\gamma_4$ may be empirically determined. In certain embodiments, $\gamma_2$ and $\gamma_4$ can be in the range between 5 to 15. Upon detection of the 'activity stop' event (e.g., in step 720), the CIR vectors between the start and stop times are segmented (e.g., in step 722) and forwarded to the post-activity detection signal processing blocks to implement the appropriate functionality.

In step 708, the electronic device 200 determines whether the expression $i_{start}$ is set to zero. Upon a determination that $i_{start}$ is set to zero (as determined in step 708), the electronic device 200 in step 710 determines whether a start of an activity is detected, based on a comparison of the STA and LTA to predefined thresholds. For example, the electronic device 200 determines whether Equations (13) and (14) are satisfied.

$$LTA(n) \le \min\left(\gamma_1, \frac{STA(n)}{\gamma_2}\right) \tag{13}$$

$$STA(n) \ge \max(\gamma_3, \gamma_4 LTA(n)) \tag{14}$$

Upon a determination that Equation (13) and/or equation (14) is not true, the electronic device 200, in step 714, goes to a subsequent time index. Alternatively, upon a determination that both Equations (13) and (14) are true the electronic device 200 changes the value of $i_{start}$ from zero (step 702) to one. In addition to changing the value of $i_{start}$, the electronic device 200 identifies the start time as corresponding to the current value of n (step 712). After the value of $i_{start}$ is modified and the start time is identified, the electronic device 200, in step 714, goes to a subsequent time index and obtains a new CIR vector corresponding to the updated time index (step 704). A new STA value and LTA value are identified based on the new CIR value (step 706).

Upon a determination that $i_{start}$ is not set to zero (as described in step 708), the electronic device 200 in step 716 determines whether $i_{start}$ is set to one (as described in step 712) and whether $i_{stop}$ is set to zero (as described in step 702). When $i_{start}$ is not set to zero, $i_{stop}$ is not set to zero, or both, then the electronic device 200, in step 714, goes to a subsequent time index.

Alternatively, when both $i_{start}$ is set to one (as set in step 712) and $i_{stop}$ is set to zero (as described in step 702), the electronic device 200, in step 718, determines whether the activity stopped, based on a comparison of the STA and LTA to predefined thresholds. For example, the electronic device 200 determines whether Equations (15) and (16) are satisfied.

$$LTA(n) \ge \max\left(\gamma_1, \frac{STA(n)}{\gamma_4}\right) \tag{15}$$

$$STA(n) \le \min(\gamma_3, \gamma_4 LTA(n)) \tag{16}$$

Upon a determination that Equation (15) and/or equation (16) are not true, the electronic device 200, in step 714, goes to a subsequent time index. Alternatively, upon a determination that both Equations (15) and (16) are true the electronic device 200 changes the value of $i_{stop}$ to one, changes the value of $i_{start}$ to zero, and identifies the stop time as corresponding to the current value of n (step 720).

After the value of $i_{stop}$ and $i_{start}$ are modified and the stop time is identified, the electronic device 200, in step 722, crops the CIR buffer between the identified start time (as identified in step 712) and the identified stop time (as identified in step 720). In step 724, the electronic device 200 sets the expression $i_{stop}$ to zero. Finally, the cropped features are forwarded the post-activity radar processing 470, which extracts activity-specific features and executes the appropriate functionality.

As an alternative embodiment, the STA and LTA can also be identified using an exponential moving average filter (EMA) similar to the CIR clutter removal process. Here, the expression $\alpha_{STA}<\alpha_{LTA}$ and initialized with STA(0)=LTA(0) =0 or STA(0)=LTA(0)=$P_i(0)$.

$$STA(n) = \alpha_{STA}\cdot STA(n-1) + (1-\alpha_{STA})\cdot P_i(n) \tag{17}$$

$$LTA(n) = \alpha_{LTA}\cdot LTA(n-1) + (1-\alpha_{LTA})\cdot P_i(n) \tag{18}$$

In certain embodiments, during the activity detection operation can use max to min CIR power ratio-for detecting an activity, in addition to (or in alternative of) using a ratio of LTA and STA the electronic device. FIGS. 8A and 8B describe activity detection using the ratio of max to min power ratio.

The signal processing pipeline 800*a* as illustrated in FIG. 8A is similar to the signal processing pipeline 400*b* of FIG. 4A, as such, steps with similar reference numbers are not described here. Additionally, it is noted that the RX antenna index 'i' is dropped, but it is to be understood that one or more CIR buffers can be used and combined in the activity detection module.

As described above, clutter is removed from the raw CIR vectors using Equation (6) and Equation (7). For the feature generation branch 460*a*, it is noted that in step 444*a*, the filter parameter is denoted as $\alpha_{feat}$. As such, if clutter removed CIR is denoted as $h_{c,feat}[n, m]$, then the short-term power CIR identified in step 462*a*, which is described in Equation (19), below:

$$P_{feat}[n] = \frac{1}{L_1}\sum_{l=0}^{L_1-1}\sum_{m=1}^{N_r}|h_{c,feat}[n-1, m]|^2 \quad (19)$$

In step 464*a*, a vector of these moving-averaged power values is then used to create a feature buffer $P_{feat}[n]$ of length $N_{feat}$. The feature buffer, $P_{feat}[n]$, is described in Equation (20), below.

$$P_{feat}[n] = [P_{feat}[n-N_{feat}+1], [P_{feat}[n-N_{feat}+2], \ldots, P_{feat}[n-1], P_{feat}[n]]^T \quad (20)$$

For the activity detection branch 450*a*, clutter is removed from the raw CIR vectors using Equation (6) and Equation (7). For the activity detection branch 450*a* of FIG. 8A, it is noted that in step 424*a*, the filter parameter is denoted as $\alpha_{ADM}$. The value filter parameter is denoted as $\alpha_{ADM}$ is less than value of the filter parameter $\alpha_{feat}$, such that $\alpha_{ADM}<\alpha_{feat}$. As described above, the higher $\alpha$ is, the lower cut-off frequency of the high-pass filter is. Therefore, the high-pass filter for feature generation has a lower cut-off frequency compared to the high-pass filter for activity detection. Accordingly, the high-pass filter for activity detection is designed to reject user activity that is too slow since it is more effective than the feature generation's high-pass filter in filtering out low-Doppler (i.e., slow moving) targets in the environment.

If the output of the step 442*a* is denoted as $h_{c,ADM}[n, m]$, then in step 452*a*, the STA CIR power denoted by $P_{ADM}[n]$ is described in Equation (21), below.

$$P_{ADM}[n] = \frac{1}{L_1}\sum_{l=0}^{L_1-1}\sum_{m=1}^{N_r}|h_{c,ADM}[n-1, m]|^2 \quad (21)$$

In step 454*a*, a vector of these moving-averaged power values is then used to create an activity detection operation buffer $P_{ADM}[n]$ of length $N_{ADM}$, as described in Equation (22), below.

$$P_{ADM}[n] = [P_{ADM}[n-N_{ADM}+1], P_{ADM}[n-N_{ADM}+2], \ldots, P_{ADM}[n-1], P_{ADM}[n]]^T \quad (22)$$

The vector $P_{ADM}[n]$ can be the input to the step 456*a*, which crops the activity related CIR based on the identified start time of the activity and the stop time of the activity. As described above, in processing the vector $P_{ADM}[n]$, the activity detection branch 450*a* operates in one out of three states at any given point of time. For example, in a begin state (where the activity detection operation is searching for a start of an activity in the ROI of the radar), a track state (where the activity detection operation found the starting point and is idle while acquiring statistics of the most recent CIR power), and the end state (where the activity detection operation checks to determine if the activity stopped).

In step 490*a*, when the activity detection branch 450*a* indicates that an activity is detected (including a start time and an end time of the activity), the features generated from the feature generation branch 460*a* are cropped based on the identified start and end time. In step 470, the electronic device 200 processes the radar signal corresponding to the cropped features to identify the activity (gesture) performed.

The method 800*b* as illustrated in FIG. 8B is similar to the method 600 of FIG. 6A. That is, the method 800*b* describes the various conditions that are used to transition between states, such as the begin state, the track state, and the end state. For example, the activity detection operation is initialized in the begin state (step 802), and the 'begin' detection branch (formed by steps 806, 808, and 810) and enters the 'track' state (step 812) only if a rising peak is detected, where the ratio of the maximum ($P_{max,b}$) to minimum ($P_{min,b}$) CIR power of the ADM buffer is above a threshold $\gamma_b$ and the $n_{max,b}>n_{min,b}$ (810). In the 'track' state (formed by steps 816, 818, and 820), the activity detection operation updates the maximum CIR power value and enters the 'end' state (block 822) when the 'tracking' counter $t_{cnt}$ exceeds a threshold parameter $n_{t,th}$ (step 820). In the 'end' state (formed by steps 824, and 826), the endpoint of the activity is detected (step 828) when both of the following conditions are satisfied. The first condition specifies that the maximum to minimum CIR power ratio $$\left(\frac{P_{max,e}}{P_{min,e}}\right)$$

falls below an adaptive threshold that is calculated using the parameter $\gamma_e$ and the highest max-to-min CIR power ratio during the 'track' state, which is given by $$\left(\frac{P_{max,t}}{P_{min,b}}\right)$$

The second condition specifies that the index corresponding to the maximum CIR power in $P_{ADM}[n]$ is smaller than that of the minimum CIR power. Once this end point is detected, the features from the feature buffer $P_{feat}[n]$ are segmented between the estimated start and stop points and forwarded to the ML classifier of step 470. On the other hand, if the activity endpoint is still not detected after a time $t_{elpsd}$ has elapsed since the start point of the activity was detected, the activity is deemed to be finished, the features from the feature buffer $P_{feat}[n]$ are segmented (step 830) and fed to the ML classifier. It is noted that steps 808, 818, and 824 can correspond to the statistics that are identified in step 636 of FIG. 6B. As an example, step 824 assigns the min and max values.

In step 802, the electronic device 200 initializes the expression $t_{cnt}$ to zero and $t_{elpsd}$ to zero. The electronic device 200 also sets the status to the begin state. In step 804, the electronic device 200 updates the power buffer $P_{adm}[n]$ using the latest CIR. That is, during the activity detection operation (such as step 450 of FIG. 4A and the activity detection branch 450*a* of FIGS. 4B and 8A) the electronic device 200 updates the power buffer $P_{adm}$[n] with the latest CIR.

In step 806, the electronic device 200 determines whether the status is set to the begin state. When the status of the electronic device 200 is set to begin state (as determined in step 806), the electronic device 200 sets various parameters based on the $P_{adm}$[n] (step 808). One of the parameters the electronic device 200 sets is $P_{max,b}$ to max($P_{AMD}$[n]). Another one of the parameters the electronic device 200 sets is $P_{min,b}$ to min($P_{AMD}$[n]). Another one of the parameters the electronic device 200 sets is $n_{max,b}$ to $$\underset{i \in [n - N_{AMD} + 1,\ n]}{\arg\max} P_{ADM}[n].$$

Yet another one of the parameters the electronic device 200 sets is $n_{min,b}$ to $$\underset{i \in [n - N_{AMD} + 1,\ n]}{\arg\max} P_{ADM}[n].$$

It is noted that the suffix 'b' corresponds to the begin state. Similarly, the suffix ADM corresponds to activity detection operation.

In step 810, the electronic device 200 determine whether two conditions are satisfied. For the first condition, the electronic device 200 determines whether the ratio of $P_{max,b}$ to $P_{min,b}$ is greater than a predefined threshold, $\gamma_b$. For the second condition, the electronic device 200 determines whether $n_{max,b}$ is greater than $n_{min,b}$. The first condition is denoted in Equation (23), below, and the second condition is described in Equation (24), below.

$$\left\{\frac{P_{max,b}}{P_{min,b}} > \gamma_b\right\} \tag{23}$$

$$\{n_{max,b} > n_{min,b}\} \tag{24}$$

Upon a determination that Equation (23), Equation (24), or both Equations (23) and (24) are not true, the electronic device 200 in step 814, goes to the next time index by increasing the value of n, and step 804 is repeated thereafter. Alternatively, upon a determination that both Equations (23) and (24) are true (as determined in step 810) the electronic device 200 in step 812 changes the status from the begin state (as set in step 802) to track state. The electronic device also modifies the values of various parameters, such that $t_{cnt}$ becomes $t_{cnt}$+1 (as set in step 802), $t_{elpsd}$ becomes $t_{elpsd}$d+1 (as set in step 802), and $n_b$ becomes $n_{min,b}$. After updating the status and the parameters, the electronic device 200 in step 814 goes to the next time index by increasing the value of n, and step 804 is repeated thereafter.

In response to a determination that the status is not set to the begin state (as determined in step 806), the electronic device 200 in step 816 determines whether the status is set to the track state. When the status of the electronic device 200 is set to track state (as determined in step 816), the electronic device 200 modifies and/or sets various parameters (step 818). One of the parameters the electronic device 200 sets is $t_{cnt}$ to $t_{cnt}$+1. Another one of the parameters the electronic device 200 sets is $t_{elpsd}$ to $t_{elpsd}$+1. Another one of the parameters the electronic device 200 sets is $P_{pks}$ to peaks($P_{ADM}$[n]). Yet another one of the parameters the electronic device 200 sets is $P_{max,t}$ to max($P_{pks}$).

In step 820, the electronic device 200 determine whether two conditions are satisfied. The first condition is described in Equation (25) and the second condition is described in Equation (26).

$$\{P_{max,c} \geq P_{max,b}\} \tag{25}$$

$$\{t_{cnt} \geq n_{t,th}\} \tag{26}$$

Upon a determination that Equation (25), Equation (26), or both Equations (25) and (26) are not true (as determined in step 820), the electronic device 200 in step 814, goes to the next time index by increasing the value of n, and step 804 is repeated thereafter. Alternatively, upon a determination that both Equations (25) and (26) are true (as determined in step 820) the electronic device 200 in step 822 changes the status from the track state (as set in step 822) to end state. The electronic device also modifies the values of various parameters, such that $t_{cnt}$ to zero. After updating the status and the parameters, the electronic device 200 in step 814 goes to the next time index by increasing the value of n, and step 804 is repeated thereafter.

In response to a determination that the status is not set to the track state (as determined in step 816), the electronic device 200 in step 824 modifies and/or sets various parameters. One of the parameters the electronic device 200 sets is $P_{max,e}$ to max($P_{AMD}$[n]). Another one of the parameters the electronic device 200 sets is $P_{min,e}$ to min($P_{AMD}$[n]). Another one of the parameters the electronic device 200 sets is $n_{max,e}$ to $$\underset{i \in [n - N_{AMD} + 1,\ n]}{\arg\max} P_{ADM}[n].$$

Yet another one of the parameters the electronic device 200 sets is $n_{min,e}$ to $$\underset{i \in [n - N_{AMD} + 1,\ n]}{\arg\max} P_{ADM}[n].$$

It is noted that the suffix 'e' corresponds to the end state.

In step 826, the electronic device 200 determine whether one of the two conditions are satisfied. The first condition is described in Equation (27) and the second condition is described in Equation (28).

$$\{t_{elpsd} \geq n_{elpsd,th}\} \tag{27}$$

$$\left\{\left\{\frac{P_{max,e}}{P_{min,e}} < \min\left(\gamma_e, \frac{P_{max,t}}{P_{min,b}}\right)\right\} \text{ AND } \{n_{max,e} < n_{min,e}\}\right\} \tag{28}$$

Upon a determination that both Equation (27) and Equation (28) are not true (as determined in step 826), the electronic device 200 in step 814, goes to the next time index by increasing the value of n, and step 804 is repeated thereafter. Alternatively, upon a determination either Equations (27) or (28) are true (as determined in step 826) the electronic device 200 in step 828 changes the status from the end state (as set in step 822) to begin state. The electronic device also modifies the values of various parameters, such that $n_e$ becomes $n_{min,e}$ and $t_{elpsd}$ becomes zero. After updating the status and the parameters, the electronic device 200 performs the post activity radar signal processing of step 470.

Although FIGS. 6A through 8B illustrate examples for activity detection various changes may be made to FIGS. 6A through 8B. For example, while shown as a series of steps, various steps in FIGS. 6A, 6B, 7, 8A and 8B could overlap, occur in parallel, or occur any number of times.

Figure 9A:
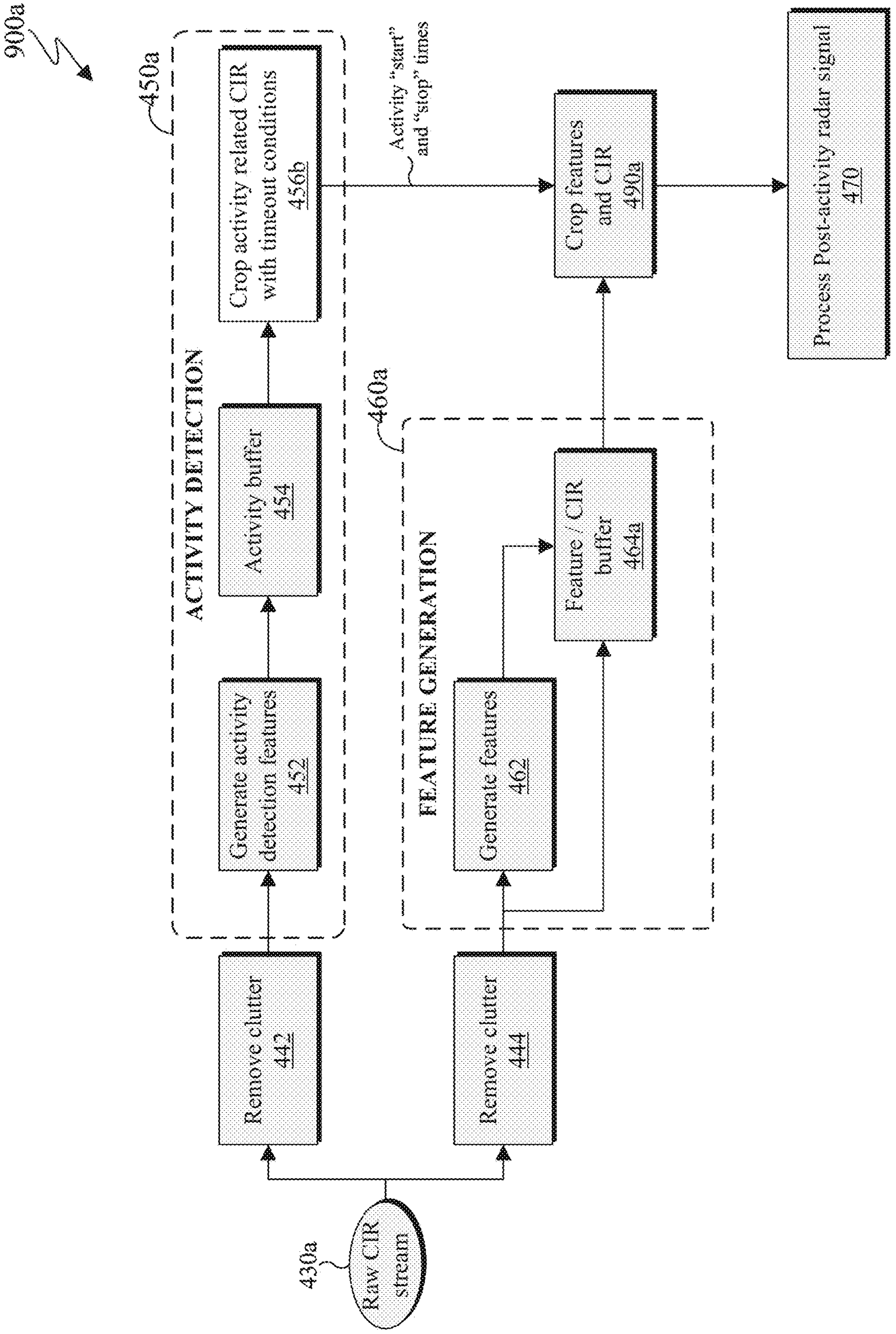
FIG. 9A illustrates an example signal processing pipeline for activity detection with a time-out condition according to embodiments of this disclosure.
Figure 9B:
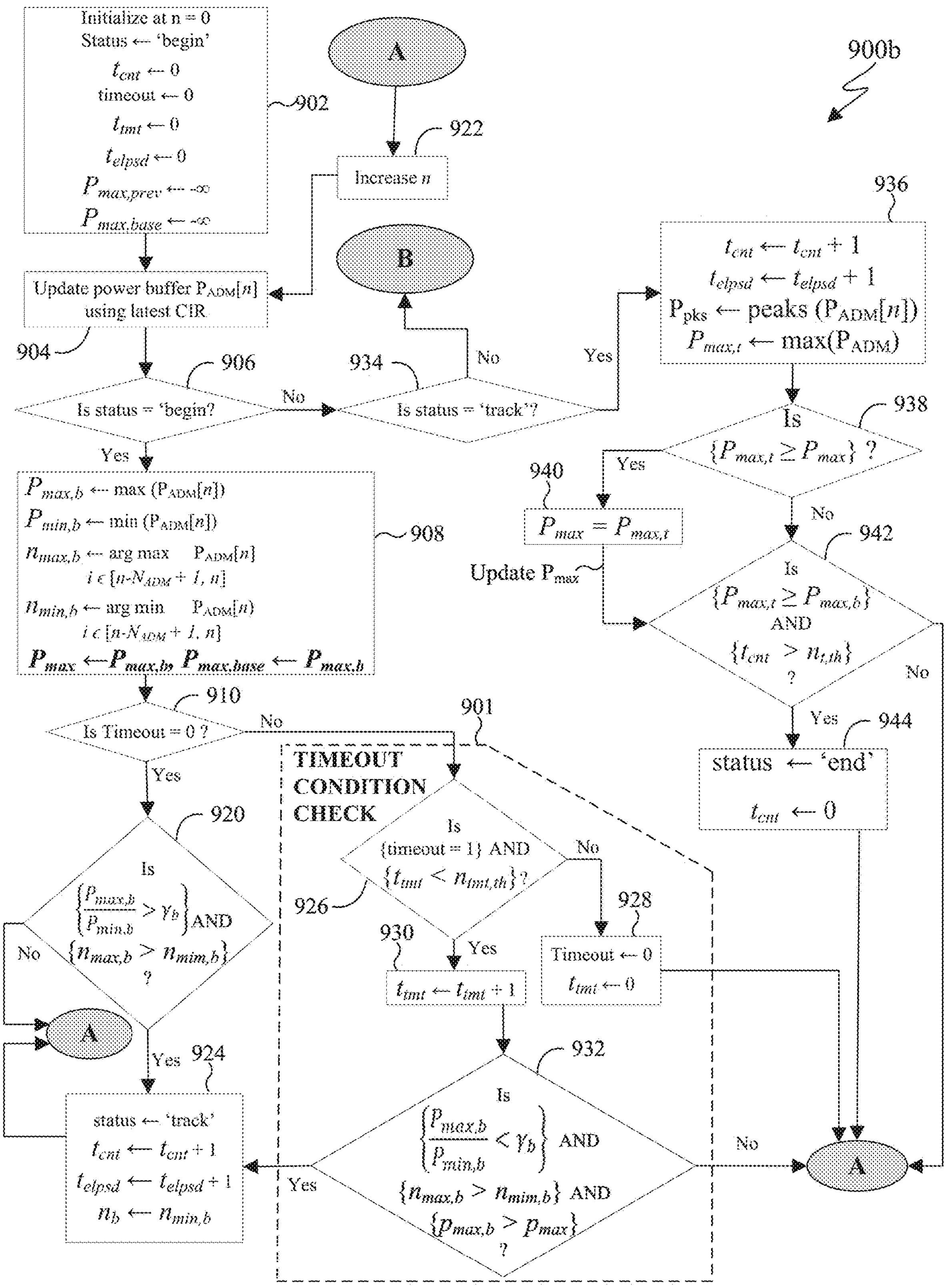
FIGS. 9B and 9C illustrate an example method for power ratio-based activity detection with a time-out condition according to embodiments of this disclosure.
Figure 9C:
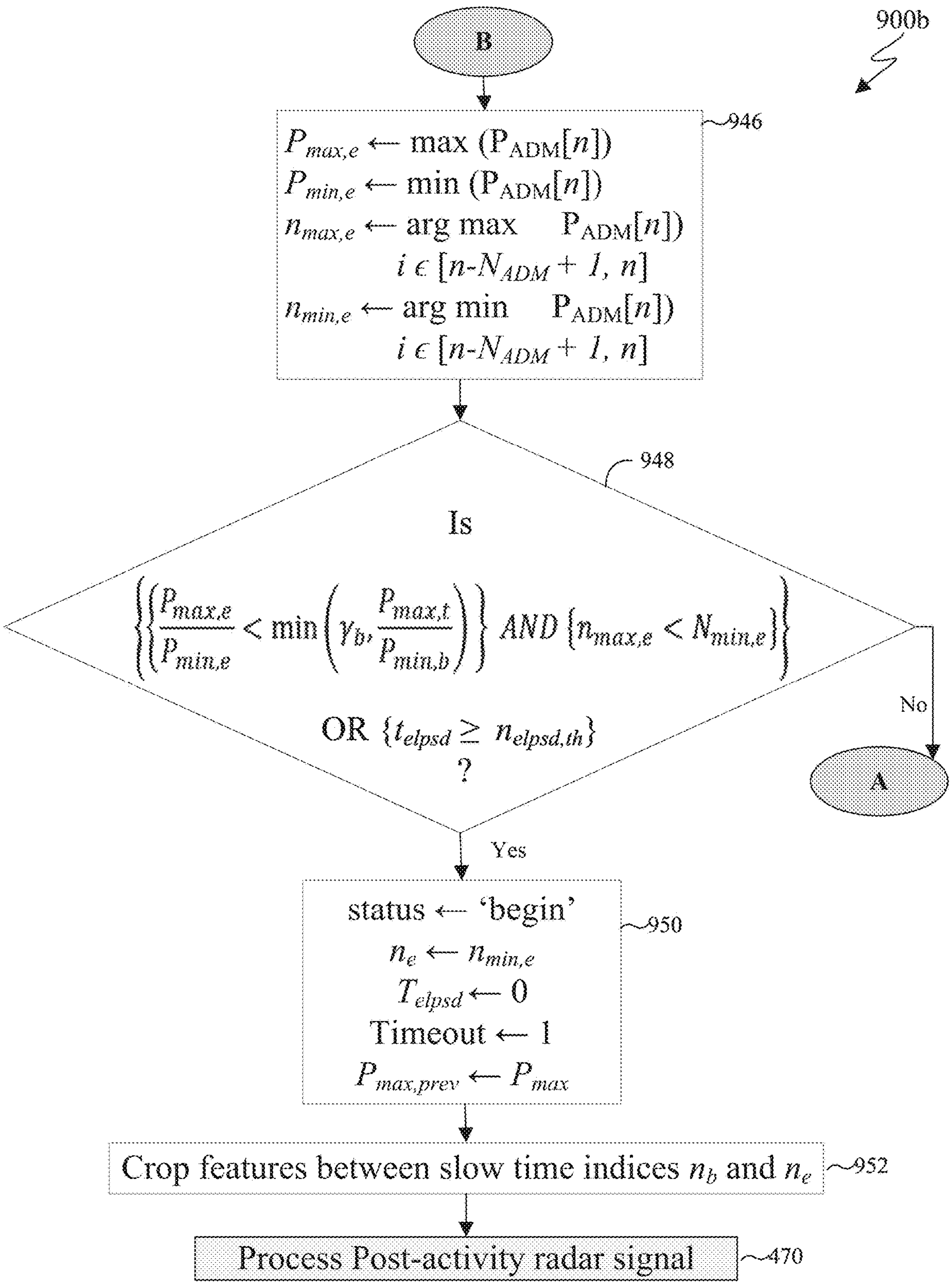

FIG. 9A illustrates an example signal processing pipeline 900*a* for activity detection with a time-out condition according to embodiments of this disclosure. FIGS. 9B and 9C illustrate an example method 900*b* for power ratio-based activity detection with a time-out condition according to embodiments of this disclosure.

The signal processing pipeline 900*a* of FIG. 9A and the method 900*b* of FIGS. 9B and 9C are described as implemented by any one of the client device 106-114 of FIG. 1, the server 104 of FIG. 1, the electronic device 300 of FIG. 3, and can include internal components similar to that of electronic device 200 of FIG. 2. However, the signal processing pipeline 900*a* as shown in FIG. 9A and the method 900 as shown in FIGS. 9B and 9C could be used with any other suitable electronic device and in any suitable system, such as when performed by the electronic device 200. For ease of explanation, the methods of FIGS. 9A, 9B, and 9C, are described as being performed by the electronic device 200 of FIG. 2.

The embodiments of the signal processing pipeline 900*a* of FIG. 9A and the method 900*b* of FIGS. 9B and 9C are for illustration only. Other embodiments can be used without departing from the scope of the present disclosure.

Embodiments of the present disclosure take into consideration that for instantaneous activity detection use-cases such as gesture recognition, the post-activity user motion can trigger the activity detection operation (via the activity detection branch 450*a* of FIG. 4B) since these motions often result in CIR and power signatures that are similar to the actual activity of interest. FIGS. 9A, 9B, and 9C, describe a timeout condition that prevents such motion from resulting in a false triggering of the activity detection operation. Stated differently, the timeout conditions as illustrated in FIGS. 9A, 9B, and 9C, ensures that activity detected in the immediate aftermath of the activity do not trigger the activity detection operation. It is noted that certain steps in FIGS. 9A, 9B, and 9C, correspond to the various steps with similar reference numbers of FIGS. 8A and 8B.

The STA and LTA ratio (as described in FIG. 7) is one of the parameters that determines the detection and false alarm performance of the activity detection operation. Similarly, the max-to-min CIR power ratio is also one of the key parameters that determines the detection and false alarm performance of the activity detection operation. However, a single threshold (γ) may not be capable of differentiating the activity and the post-activity movement due to similar power signatures. False alarms corresponding to the post-activity movements can be mitigated by setting a higher threshold for the activity detection operation to enter the 'track' state (see branch formed by steps 906, 930, 932 of the timeout condition check 901). This higher threshold is used in step 932) only when the timeout counter $t_{tmt}$ is smaller than the threshold $n_{tmt,th}$ (see step 926). In this timeout interval, the activity detection operation is allowed to enter the 'track' state only if the max CIR power $P_{max,b}$ is greater than the max CIR power recorded during the previous activity detected ($P_{max,prev}$) (see step 926). The rest of the ADM functionality is similar to the max/min power ratio-based ADM shown in FIG. 8B.

The 456*b*, of FIG. 9A is similar to the step 456*a* of FIG. 8A. In step 456*b*, in addition to cropping the activity related CIR based on the identified start time of the activity and the stop time of the activity the electronic device 200 performs the timeout condition to mitigate false alarms corresponding to the post-activity movements.

The method 900*b* as illustrated in FIGS. 9B and 9C is similar to the method 600 of FIG. 6A and the method 800*b* of FIG. 8B. That is, the method 900*b* describes the various conditions that are used to transition between states, such as the start begin state, the track state, and the end state.

In step 902, the electronic device 200 initializes the expression n to zero, $t_{cnt}$ to zero, timeout to zero, $t_{tmt}$ to zero, $t_{elpsd}$ to zero, $P_{max,prev}$ to negative infinity, and $P_{max,prev}$ to base infinity. The electronic device 200 also sets the status to the begin state. In step 904, the electronic device 200 updates the power buffer $P_{adm}[n]$ using the latest CIR. That is, during the activity detection operation (such as step 450 of FIG. 4A and the activity detection branch 450*a* of FIGS. 4B and 8A) the electronic device 200 updates the power buffer $P_{adm}[n]$ with the latest CIR.

In step 906, the electronic device 200 determines whether the status is set to the begin state. When the status of the electronic device 200 is set to begin state (as determined in step 906), the electronic device 200 sets various parameters based on the $P_{adm}[n]$ (step 908). One of the parameters the electronic device 200 sets is $P_{max,b}$ to $\max(P_{AMD}[n])$. Another one of the parameters the electronic device 200 sets is $P_{min,b}$ to $\min(P_{AMD}[n])$. Another one of the parameters the electronic device 200 sets is $n_{max,b}$ to $$\underset{i \in [n - N_{AMD} + 1,\ n]}{\arg\max} P_{ADM}[n].$$

Another one of the parameters the electronic device 200 sets is $n_{min,b}$ to $$\underset{i \in [n - N_{AMD} + 1,\ n]}{\arg\max} P_{ADM}[n].$$

Yet another one of the parameters the electronic device 200 sets is $P_{max}$ to $P_{max,b}$, as well as $P_{max,base}$ to $P_{max,b}$. It is noted that the suffix 'b' corresponds to the begin state. Similarly, the suffix ADM corresponds to activity detection operation.

In step, 910 the electronic device 200 determines whether the value of the expression, timeout, is equal to zero. In response a determination that the value of the expression, timeout, is zero, the electronic device in step 920 determines whether two conditions are satisfied. The first condition is denoted in Equation (23), above, and the second condition is described in Equation (24), above.

Upon a determination that Equation (23), Equation (24), or both Equations (23) and (24) are not true, the electronic device 200 in step 922, goes to the next time index by increasing the value of n, and step 904 is repeated thereafter. Alternatively, upon a determination that both Equations (23) and (24) are true (as determined in step 920) the electronic device 200 in step 924 changes the status from the begin state (as set in step 902) to track state. The electronic device also modifies the values of various parameters, such that $t_{cnt}$ becomes $t_{cnt}+1$ (as set in step 902), $t_{elpsd}$ becomes $t_{elpsd}\alpha 1$ (as set in step 902), and $n_b$ becomes $n_{min,b}$. After updating the status and the parameters, the electronic device 200 in step 922 goes to the next time index by increasing the value of n, and step 904 is repeated thereafter.

In response to a determination that the expression timeout is not zero (as determined in step 910), the timeout condition check 901 is initiated. In step 926, the electronic device 200 determines whether the two conditions are satisfied. For the first condition, the electronic device 200 determines whether the value of the expression timeout is equal to one. For the second condition, the electronic device 200 determines whether the expression $t_{tmt}$ is less than $n_{tmt,th}$.

Upon determining that one or both of the conditions are not true (as determined in step 926), the electronic device 200 in step 928 sets the expression timeout to zero and sets the expression $t_{tmt}$ to zero. Then in step 922, the electronic device 200 goes to the next time index by increasing the value of n, and step 904 is repeated thereafter. Alternatively, upon a determination that both of the conditions are true (as determined in step 926), the electronic device 200 in step 928 sets the expression $t_{tmt}$ to $t_{tmt}+1$.

In step 932, the electronic device 200 determine whether the following three conditions are satisfied. The first condition is described in Equation (29), the second condition is described in Equation (30), and the third condition is described in Equation (31).

$$\left\{\frac{P_{max,b}}{P_{min,b}} < \gamma_b\right\} \tag{29}$$

$$\{n_{max,b} > n_{min,b}\} \tag{30}$$

$$\{P_{max,b} > P_{max}\} \tag{31}$$

Upon a determination that at least one of the three conditions as described in Equation (29), Equation (30), and Equation (31) is not true (as determined in step 932), the electronic device 200 in step 922, goes to the next time index by increasing the value of n, and step 904 is repeated thereafter. Alternatively, upon a determination that all three conditions are true (as determined in step 932), the electronic device 200 in step 924 changes the status from the begin state (as set in step 902) to track state. The electronic device also modifies the values of various parameters, such that $t_{cnt}$ becomes $t_{cnt}+1$ (as set in step 902), $t_{elpsd}$ becomes $t_{elpsd}+1$ (as set in step 902), and $n_b$ becomes $n_{min,b}$. After updating the status and the parameters, the electronic device 200 in step 922 goes to the next time index by increasing the value of n, and step 904 is repeated thereafter.

In response to a determination that the status is not set to the begin state (as determined in step 906), the electronic device 200 in step 934 determines whether the status is set to the track state. When the status of the electronic device 200 is set to track state (as determined in step 934), the electronic device 200 modifies and/or sets various parameters (step 936). One of the parameters the electronic device 200 sets is $t_{cnt}$ to $t_{cnt}+1$. Another one of the parameters the electronic device 200 sets is $t_{elpsd}$ to $t_{elpsd}+1$. Another one of the parameters the electronic device 200 sets is $P_{pks}$ to peaks($P_{ADM}$[n]). Yet another one of the parameters the electronic device 200 sets is $P_{max,t}$ to max($P_{pks}$).

In step 938, the electronic device 200 determines whether the condition as described in Equation (32) is satisfied.

$$\{P_{max,t} \geq P_{max}\} \tag{32}$$

Upon a determination that Equation (32) is satisfied (as determined in step 938), the electronic device 200 sets $P_{max}$ to $P_{max,t}$ (step 940). After the electronic device 200 sets $P_{max}$ to $P_{max,t}$ (step 940) or in response to a determination that Equation (32) is not satisfied (as determined in step 938), the electronic device 200 determines whether two conditions are satisfied (step 942). The first condition is described in Equation (25) above, and the second condition is described in Equation (26) above.

Upon a determination that at least one of the Equations (25) and (26), are not true (as determined in step 942), the electronic device 200 in step 922, goes to the next time index by increasing the value of n, and step 804 is repeated thereafter. Alternatively, upon a determination that both Equations (25) and (26) are true (as determined in step 942) the electronic device 200 in step 944 changes the status from the track state (as set in step 924) to end state. The electronic device also modifies the values of various parameters, such that $t_{cnt}$ to zero. After updating the status and the parameters, the electronic device 200 in step 922 goes to the next time index by increasing the value of n, and step 904 is repeated thereafter.

In response to a determination that the status is not set to the track state (as determined in step 934), the electronic device 200 in step 946 modifies and/or sets various parameters. One of the parameters the electronic device 200 sets is $P_{max,e}$ to max($P_{AMD}$[n]). Another one of the parameters the electronic device 200 sets is $P_{min,e}$ to min($P_{AMD}$[n]). Another one of the parameters the electronic device 200 sets is $n_{max,e}$ to $$\underset{i \in [n-N_{AMD}+1,\ n]}{\arg\max} P_{ADM}[n].$$

Yet another one of the parameters the electronic device 200 sets is $n_{min,e}$ to $$\underset{i \in [n-N_{AMD}+1,\ n]}{\arg\max} P_{ADM}[n].$$

It is noted that the suffix 'e' corresponds to the end state.

In step 948, the electronic device 200 determine whether one of the two conditions are satisfied. The first condition is described in Equation (27), above, and the second condition is described in Equation (28), above.

Upon a determination that both Equation (27) and Equation (28) are not true (as determined in step 948), the electronic device 200 in step 922, goes to the next time index by increasing the value of n, and step 904 is repeated thereafter. Alternatively, upon a determination either Equations (27) or (28) are true (as determined in step 948) the electronic device 200 in step 950 changes the status from the end state (as set in step 822) to begin state. The electronic device also modifies the values of various parameters, such that $n_e$ becomes $n_{min,e}$ and $t_{elpsd}$ becomes zero, the expression timeout is set to the value of one, and the expression $P_{max,prev}$ is set to $P_{max}$. After updating the status and the parameters, the electronic device 200 crops the features between the slow time indices $n_b$ and $N_e$ (step 952). The electronic device 200 then performs the post activity radar signal processing of step 470.

Although FIGS. 9A, 9B and 9C illustrate examples for a time out condition for activity detection various changes may be made to FIGS. 9A-9C. For example, while shown as a series of steps, various steps in FIGS. 9A, 9B, and 9C could overlap, occur in parallel, or occur any number of times. Additionally, the timeout condition, as described in FIGS. 9A, 9B, and 9C can also be applied to the method 700 of FIG. 7.

Figure 10A:
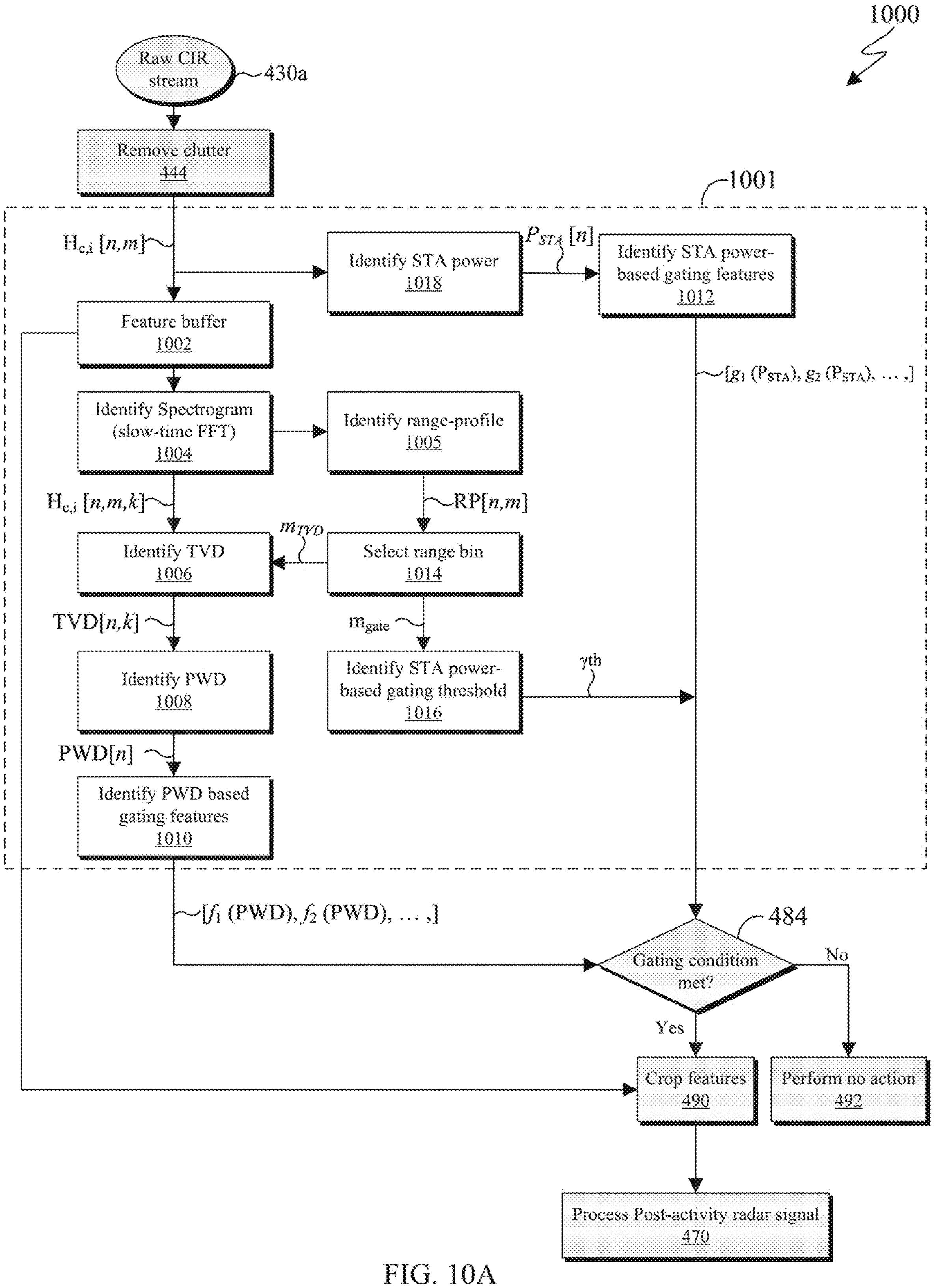
FIG. 10A illustrates an example method for identifying features for gating according to embodiments of this disclosure.
Figure 10B:
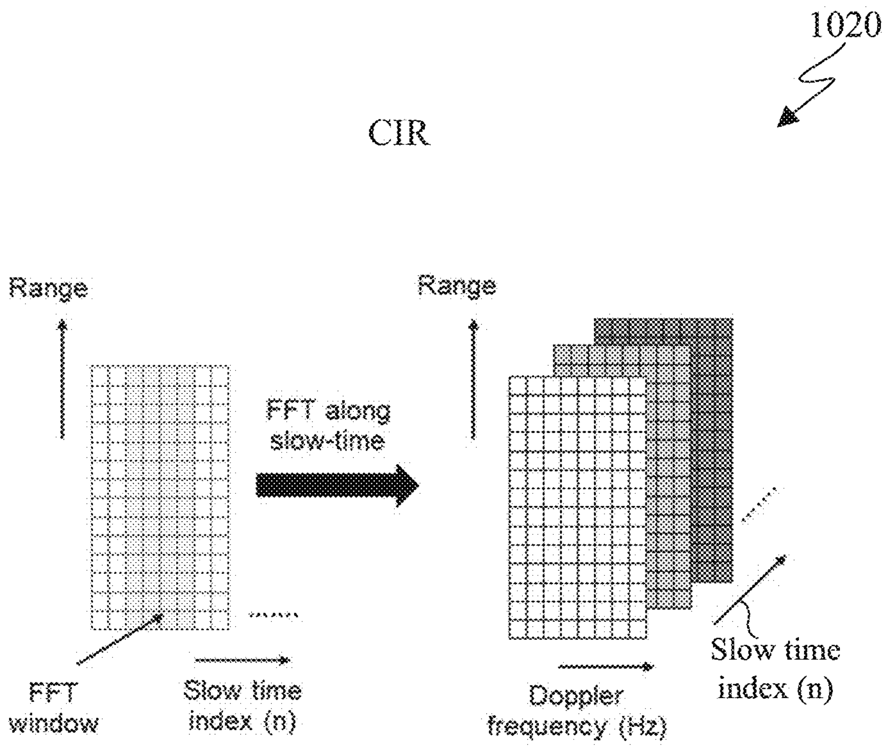
FIGS. 10B, 10C, 10D, 10E, and 10F illustrate diagrams of features according to embodiments of this disclosure.

FIG. 10A illustrates an example method 1000 for identifying features for gating according to embodiments of this disclosure. FIGS. 10B, 10C, 10D, 10E, and 10F illustrate diagrams 1020, 1022, 1024, 1026, and 1028 of features according to embodiments of this disclosure. FIGS. 10G, 10H, and 10I illustrate example methods 1040, 1050, and 1060, respectably, for gating according to embodiments of this disclosure.

The method 1000 of FIG. 10A, the method 1040 of FIG. 10G, the method 1050 of FIG. 10H, and the method 1060 of FIG. 10I are described as implemented by any one of the client device 106-114 of FIG. 1, the server 104 of FIG. 1, the electronic device 300 of FIG. 3, and can include internal components similar to that of electronic device 200 of FIG. 2. However, the method 1000 as shown in FIG. 10A, the method 1040 as shown in FIG. 10G, the method 1050 as shown in FIG. 10H, and the method 1060 as shown in FIG. 10I could be used with any other suitable electronic device and in any suitable system, such as when performed by the electronic device 200. For ease of explanation, the methods of FIGS. 10A, 10G, 10H, and 10I are described as being performed by the electronic device 200 of FIG. 2.

The embodiments of the methods 1000, 1040, 1050, and 1060 of FIGS. 10A, 10G, 10H, and 10I, respectively, as well as the diagrams 1020, 1022, 1024, 1026, and 1028 of FIGS. 10B, 10C, 10D, 10E, and 10F, respectively, are for illustration only. Other embodiments can be used without departing from the scope of the present disclosure.

The timeout conditions as described with reference to FIGS. 9A, 9B, and 9C ensure that activity detected in the immediate aftermath of the activity do not trigger another activity detection operation. While false alarm reduction is ensured in the timeout interval, motion that are not of interest can still trigger the activity detection operation during other time durations. FIGS. 10A-10I describe gating mechanisms, which are post-activity condition checks that are performed after the activity detection operation detects activity. This mechanism can include condition checks based on features including but not limited to CIR power, Doppler spectrograms, angle-of-arrival and the like.

FIG. 4B illustrates the signal processing pipeline of the activity recognition, including the gating condition check 480. As described above, the raw CIR stream 430*a* is processed by two parallel blocks simultaneously: the activity detection branch 450*a* and the feature generation branch 460. As discussed in Equations (19), (20), (21), and (22), in each path, a different clutter removal filter parameter (a) is used, that of $\alpha_{ADM}$ in the ADM path (also referred to as the activity detection branch 450*a*) and $\alpha_{feat}$ in the feature generation path (also referred to as the feature generation branch 460), such that $\alpha_{ADM}<\alpha_{feat}$. A lower $\alpha$ in the ADM path results in a higher cutoff frequency of the IIR high pass filter in Equation (12) and Equation (19), which in turn filters out low-Doppler (i.e., slow moving) targets in the environment. Therefore, the activity detection branch 450*a* path is designed to reject user activity that is too slow. After the activity detection branch 450*a* detects the end of the activity, the gating features identified in step 482 using the features from the feature generation branch 460 are used for gating of the gating condition check 480. The features are segmented only if the gating conditions are met (as determined in step 484), and the forwarded to the post-activity radar signal processing 470*a*. Otherwise, if the gating conditions are not met (as determined in step 484), no action is taken in step 492. That is, if the gating conditions are not met (as determined in step 484), then the detected action of the activity detection branch 450*a* is ignored by the post activity radar signal processing 470*a*, and no ML classification is performed to identity the detected activity.

The method 1000 as illustrated in FIG. 10A describes a process for identifying features used in the gating of the of the gating condition check 480. Various steps of the method 1000 correspond to the steps of the signal processing pipeline 400*b* of FIG. 4B. For example, the block 1001 of FIG. 10A corresponds to the steps 432, 464 and 482 of FIG. 4B.

After the clutter is removed in step 444, the block 1001 obtains $h_{c,i}[n,m]$. In step 1002, the electronic device 200 stores the features in a buffer. In step 1004, the electronic device 200 identifies a spectrogram. The spectrogram can be based on a slow-time fast Fourier transform (FFT), as illustrated in the diagram 1020 of FIG. 10B. For example, the spectrogram $h_{c,i}[n,m,k]$ is obtained using the clutter-removed CIR $h_{c,feat}[n,m]$ in the feature buffer. For the purposes of ignoring the statistic clutter, the zero-Doppler component is nulled as described in Equation (33), below.

$$h_c[n,m,k] = \begin{cases} 0 & \text{if } k=0 \\ h_c[n,m,k] & \text{otherwise} \end{cases} \tag{33}$$

In step 1005, the electronic device 200 identifies the range profile (RP). Analogous to the TVD, the spectrogram information can be quantized into the range-slow time domain to yield the range profile (RP), in Equation (34), below.

$$RP[n,m] = \sum_{k\in\mathcal{K}} |H_c[n,m,k]|^2, \tag{34}$$

where $$\mathcal{K} = \left\{-\frac{N_{FFT}}{2}, -\frac{N_{FFT}}{2}+1, \ldots, \frac{N_{FFT}}{2}-2, \frac{N_{FFT}}{2}-1\right\}$$

In step 1014, the electronic device 200 selects a range bin. In certain embodiments, one way to select the range bin of interest $m_{TVD}$ is by finding the range bin corresponding to peak range profile value.

In step 1006, the electronic device 200 identifies a time velocity diagram (TVD). For example, using the DC-nulled spectrogram, the time velocity diagram, TDV[n,k] is a 2D matrix that is obtained by slicing the 3D spectrogram at the range bin(s) of interest. If the range bins of interest are $m_{TVD}$, then the corresponding TVD is described in Equation (35), below.

$$TVD[n,k] = |H_c[n, m_{TVD}, k]|^2 \tag{35}$$

for all $n$ and $$\left\{-\frac{N_{FFT}}{2}, -\frac{N_{FFT}}{2}+1, \ldots, \frac{N_{FFT}}{2}-2, \frac{N_{FFT}}{2}-1\right\}$$

Figure 10C:
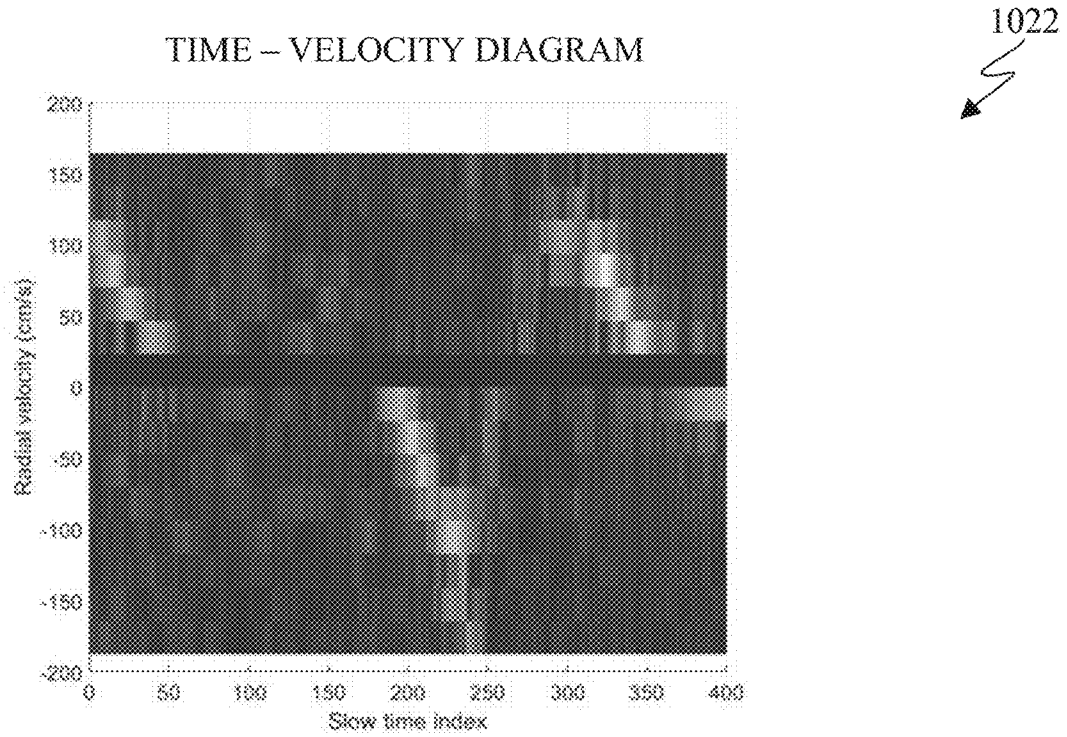

FIG. 10C illustrates an example diagram 1022 of a TVD. The diagram 1022 illustrates a mesh-plot (XY projection) of the TVD identified for a UWB radar with $f_{rep}$=200 Hz, FFT size of $N_{FFT}$=16 at a center frequency of $f_{center}$=8 GHz. The lighter colored regions indicate high concentration of power, and darker colored regions indicate very low power content In step 1008, the electronic device 200 identifies the power-weighted Doppler (PWD). For example, the 2D TVD can be further quantized into a 1-dimensional metric termed as the PWD. It is noted PWD[n], is defined at each slow time index as and described in Equation (36), below.

$$PWD[n] = \frac{\sum_{k\in\mathcal{K}} k \times TVD[n, k]}{\sum_{k\in\mathcal{K}} TVD[n, k]} \quad (36)$$

Figure 10D:
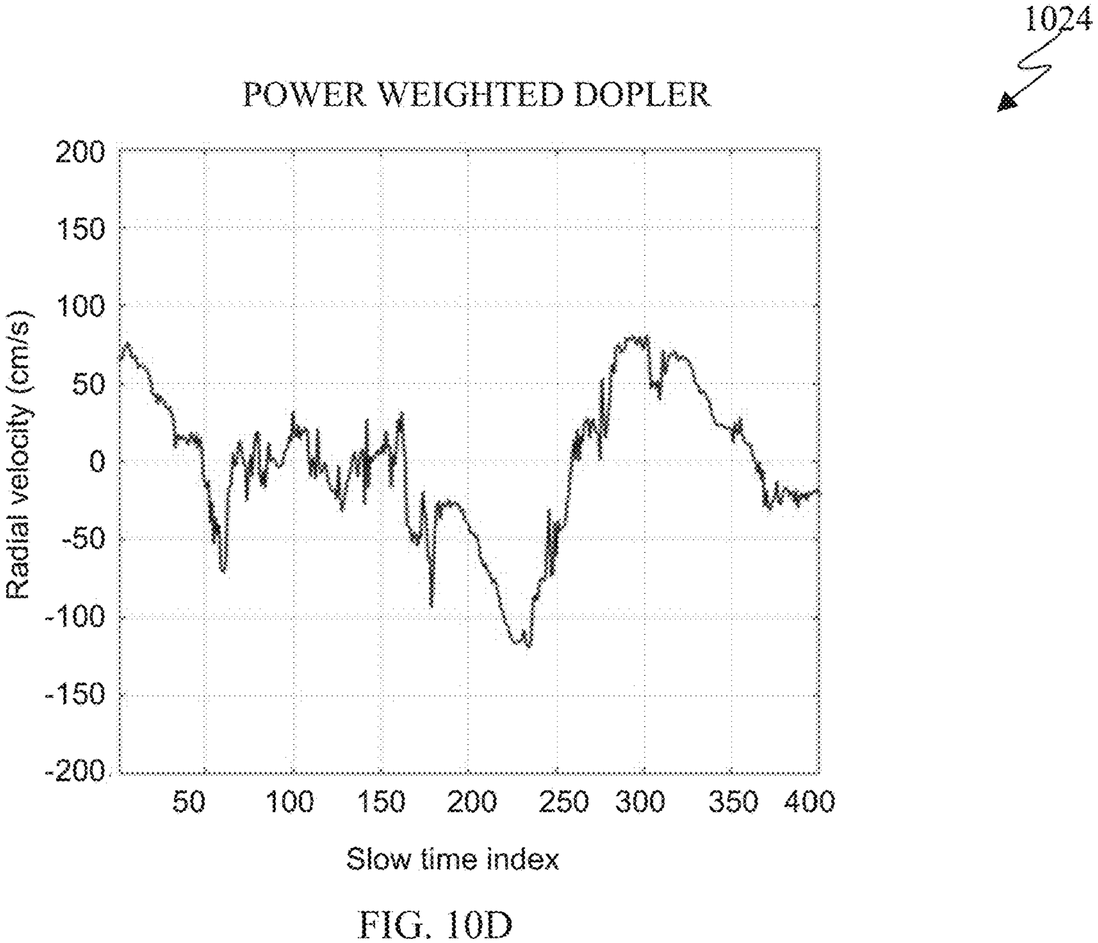

FIG. 10D illustrates an example diagram 1024 of a PWD. The diagram 1024 illustrates a plot of the corresponding PWD, identified using Equation (22). Each Doppler bin corresponds to a radial velocity of $$\frac{cf_{rep}}{N_{FFT} f_{center}} = 23.44 \text{ cm/s}.$$

It is noted that PWD is defined as the centroid of the TVD along the Doppler dimension. However, this definition leads to counterintuitive values when the TVD is symmetric. For instance, PWD [n]≈0 when the TVD is symmetric, indicating the presence of a static target irrespective of the power distribution across the Doppler domain in TVD [n]. To avoid such situations, PWD can also be described by Equation (37), below. In Equation (37), the weightage using Ike (instead of k in Equation (34)) ensures that the second term is always positive. The sign of $PWD_{abs}[n]$ is obtained by computing the sign of PWD [n] in Equation (34).

$$PWD_{abs}[n] = \text{sign}\left(\frac{\sum_{k\in\mathcal{K}} k \times TVD[n, k]}{\sum_{k\in\mathcal{K}} TVD[n, k]}\right) \times \frac{\sum_{k\in\mathcal{K}} |k| \times TVD[n, k]}{\sum_{k\in\mathcal{K}} TVD[n, k]} \quad (37)$$

Figure 10E:
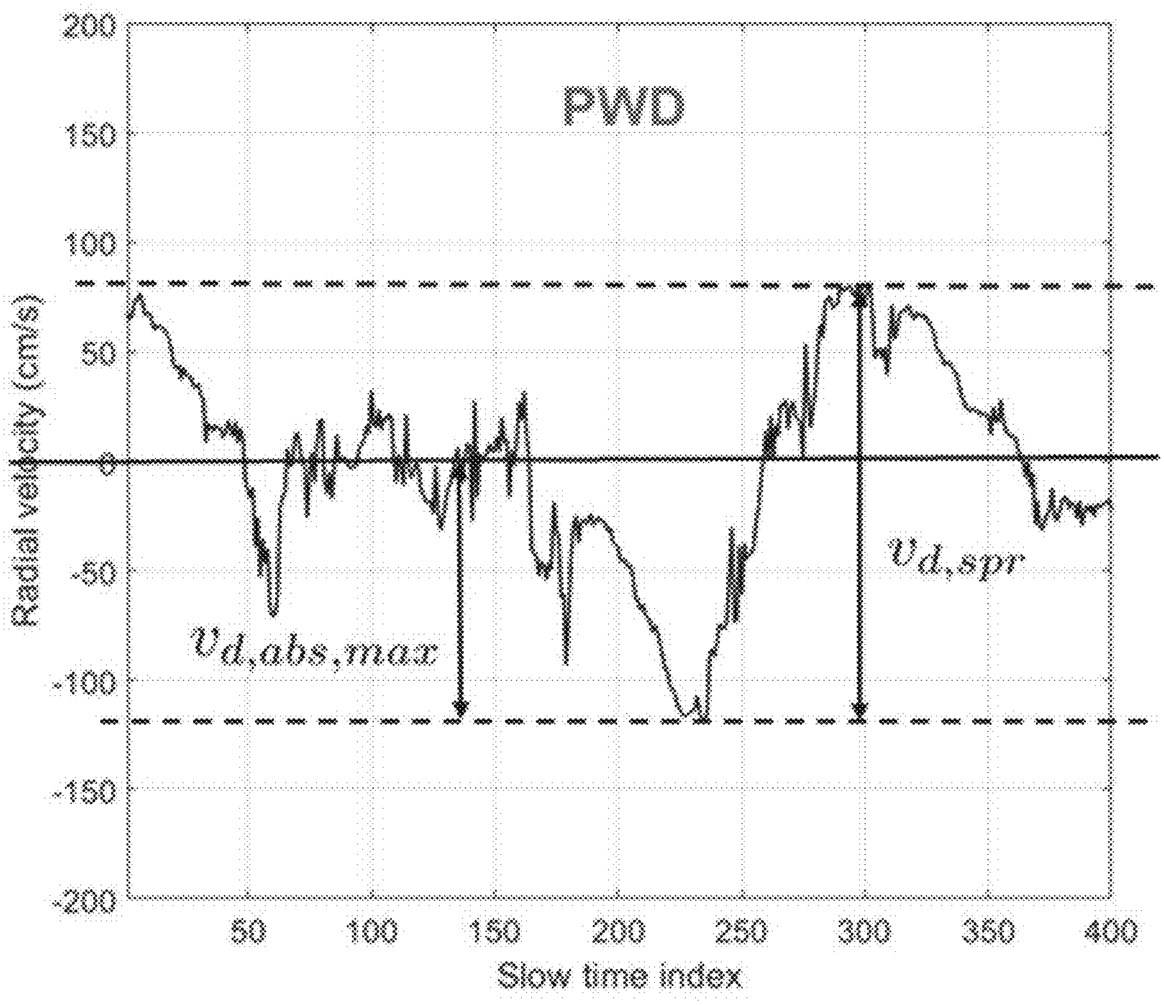

Similar to the CIR power, consecutive PWD values can be stored in a buffer described in Equation (38), below, of size $N_{PWD}$. Using this buffer, a few exemplary statistical metrics described in Equations (39) and (40), below, and illustrated in FIG. 10E can be obtained. For example, Equation (39) describers the absolute max Doppler and Equation (40) describers the Doppler spread. FIG. 10E illustrates an example diagram 1026 of a PWD. The diagram 1026 describes the absolute Max Doppler ($v_{d,abs,max}$) and Doppler spread ($v_{d,spr}$) using the Power-Weighted Doppler metric.

$$PWD[n] = [PWD[n - N_{PWD} + 1], PWD[n - N_{PWD} + 2], \ldots, PWD[n]] \quad (38)$$

$$\text{Absolute Max Doppler } v_{d,abs,max}[n] = \max|PWD[n]| \quad (39)$$

$$\text{Doppler spread } v_{d,spr}[n] = maxPWD[n] - \min PWD[n] \quad (40)$$

In step 1010, the electronic device 200 identifies one or more PWD based gating features based on the output of step 1008.

In step 1016, the electronic device 200 identifies the STA power-based gating threshold. For example, using the feature buffer $P_{feat}[n]$, at time instant n, the contents of the buffer can be mapped to a gating feature. An exemplary feature is given by the maximum to the minimum STA power ratio $\gamma_{feat}[n]$, as described in Equation (41), below.

$$\gamma_{feat}[n] = \frac{\max P_{feat}[n]}{\min P_{feat}[n]} \quad (41)$$

In step 1018, the electronic device 200 identifies the STA power. This can be similar to the step 706 of FIG. 7. In step 1012, the electronic device 200 identifies the STA power-based gating features. It is noted that the electronic device 200 in step 1012 identifies the STA power-based gating features while in step 1016 the STA power-based gating thresholds are identified.

In certain embodiments, the electronic device 200 can identify additional features that are used for gating. For example, a range doppler frame (RDF) can be used. The RDF is described in Equation (42), below and illustrated in the diagram 1028 of FIG. 10F.

$$H_{c,i}[n, m, k] = \sum_{p=0}^{NFFT-1} h_{c,i}[n - p, m] e^{\frac{j2\pi pk}{N_{fft}}} \quad (42)$$

for $$k \in K = \left\{-\frac{N_{FFT}}{2}, -\frac{N_{FFT}}{2} + 1, \ldots, \frac{N_{FFT}}{2} - 2, \frac{N_{FFT}}{2} - 1\right\}$$

FIGS. 10G, 10H, and 10I describe various gating conditions using the identified gating features as described in FIGS. 10A-10F. It is noted that certain steps in FIGS. 10G, 10H, and 10I, correspond to the various steps with similar reference numbers in FIGS. 4A, 4B, and 10A.

In certain embodiments, an STA power-ratio based gating condition is used for gating. For example, when an activity is performed, the STA power buffer $P_{feat}[n]$ includes entries that correspond to the clutter (i.e., before or after the activity is performed), and the signal corresponding to the activity. Thus, the parameter $\gamma_{feat}[n]$ is an estimate of the signal-to-clutter-plus-noise ratio (SCNR) when the activity is ideally detected.

The method 1040 of FIG. 10G describes using a range-dependent adaptive threshold shown in the. In particular, the method 1040 describes an embodiment, in which the $\gamma_{feat}[n]$ (as identified in step 1012*a*) is compared to a predefined threshold (step 484*a*) (which is selected in step 1044) when the activity detection operation detects that the activity ended (step 1042), such as described in 4B, 9B, 9C, and 10A. This can be represented by the gating output $i_{STA,fixed}$, which is an indicator function that can be described in Equation (43).

$$i_{STA,\,fixed} = \begin{cases} 1 & \text{if } \gamma_{feat}[n] \geq \gamma_{th,\,gate} \\ 0 & \text{otherwise.} \end{cases} \quad (43)$$

The above condition as described in Equation (43) is applicable when the SCNR is strong enough in all regions of interest of the radar. On the other hand, if the radar is operating in relatively lower SCNR conditions or has regions of interest that experience different SCNR regimes, a region-based threshold can be applied to obtain a reliable gating mechanism similar to Equation (43).

As illustrated in FIG. 10G, the STA power ratio threshold is range dependent. For a range bin of interest m, the threshold is described in Equation (44), below.

$$\gamma_{th,gate} = \gamma_{th,gate}[m] = \begin{cases} \gamma_{th,1} & \text{if } m = m_1 \\ \vdots & \\ \gamma_{th,M} & \text{if } m = m_M \end{cases} \quad (44)$$

For example, the range bin of interest is the range bin(s) where the target is detected. The range bin of interest $m_{gate}$ can be identified using the range profile RP[n,m]. An example embodiments of range bin/tap selection can be based on a max-based range bin selection. Another example embodiments of range bin/tap selection can be based on a first peak-based range bin selection. In the max-based range bin selection example, the range bin is identified based on Equation (45), below. In the first peak-based range bin selection example, the range bin is identified Equation (46), below. In Equation (46), findpeaks2D(X) operation finds the 2D location of the peak in the matrix X $$m_{gate,\,max} = \arg\max_{n,m} RP[n, m] \quad (45)$$

$$m_{gate,\,first} = \min_{m} \text{find peaks } 2D(RP[n, m]) \quad (46)$$

Once the range-dependent threshold $\gamma_{th,gate}[m]$ is obtained for the target detected at range bin 'm', this threshold is used in the condition as described in Equation (47), below.

$$i_{STA,\,adapt} = \begin{cases} 1 & \text{if } \gamma_{feat}[n] \geq \gamma_{th,\,gate}[m] \\ 0 & \text{otherwise.} \end{cases} \quad (47)$$

In certain embodiments, a doppler based gating condition is used for gating. A doppler based gating condition is used to confirm a detection of certain activities with a low false alarm rate. Such activities are characterized by relatively fast motion of objects that may or may not be the target such as if hand gestures are the activity of interest, typing into a computer, stretching after working at a desk, and the like. These example activities exhibit similar Doppler signatures but are not activities of interest. The method 1050 as illustrated in FIG. 10H describes using a doppler based gating condition.

For example, PWD based thresholding can be used for doppler based gating conditions. For instance, the features $v_{d,abs,max}$[n] and $v_{d,spr}$[n], are identified from the PWD buffer PWD [n] upon the detection of the end of activity, is compared with thresholds in the following manner. In the following, the segmented feature is passed to the activity classifier if $i_{d,fixed}=1$, where $i_{d,fixed}$ is described in Equation (48). In Equation (48), the expression $v_{d,\,abs,\,th,\,0}$ and $v_{d,\,spr,\,th,\,0}$ are the baseline thresholds for the absolute max Doppler and Doppler spread, respectively.

$$i_{d,\,fixed} = \begin{cases} 1 & \text{if } v_{d,abs,\,max}[n] \geq v_{d,abs,th,0} \text{ and } v_{d,spr}[n] \geq v_{d,spr,th,0} \\ 0 & \text{otherwise} \end{cases} \quad (48)$$

For another example, post-activity false alarm reduction using timeout-aided adaptive thresholding can be used for doppler based gating conditions. For instance, some activities have distinct post-activity movements that are often not of interest to the activity classifier, (such as for target putting the hand down after finishing a gesture, target sitting down after finishing an activity, and the like). Such activities often have certain characteristics such as (i) weaker Doppler signature when compared to the main activity (e.g., gesture, intense exercise, etc.) for a single user and (ii) the range of values corresponding to post-activity Doppler activity have a significant overlap with the main activity when compared across multiple users. Therefore, embodiments of the present disclosure take into consideration that it is hard in practice to differentiate the main activity from post-activity Doppler signatures using a single threshold for each Doppler-based feature. Accordingly, embodiments of the present disclosure describe that the misdetection of these post-activities are suppressed by temporarily increasing the Doppler threshold (relative to the baseline threshold value in Equation (47)) within a fixed timeout interval. This is motivated by typical user behavior is activities such as gestures where the user performs the post-activity motion at a relatively slower speed when compared to the immediately preceding main activity. FIG. 10H illustrates a mechanism to adaptively set the PWD-based Doppler threshold.

As described in FIG. 10H, the timeout parameters include the timeout counter ($t_{d,g,tmt}$) and the timeout duration ($t_{d,g,th}$). The block 1052 of FIG. 10H describes the adaptive threshold setting. In block 1052, if the gating condition is satisfied (as determined in step 484*b*), the timeout counter is reset (step 1054), and the PWD-based thresholds ($v_{d,abs,th}$ and $v_{d,spr,th}$) are set to the features obtained from the current PWD buffer ($v_{d,abs,max}$ and $v_{d,spr}$ respectively) (step 1054). Since this assignment is undertaken when $v_{d,abs,max} \geq v_{d,abs,th}$ and $v_{d,spr} \geq v_{d,spr,th}$ are true (as determined in step 484*b*), this mechanism corresponds to an adaptive threshold increase during the timeout period.

Once the timeout duration is completed, the timeout counter ($t_{d,g,th}$) is reset, and the PWD-based thresholds are restored to the baseline values of $v_{d,\,abs,\,th,\,0}$ and $v_{d,\,spr,\,th,\,0}$ respectively.

In certain embodiments, different gating conditions can be combined, as described in the method 1060 as illustrated in FIG. 10I. The STA power ratio-based gating and PWD-based gating methods are described separately in the regarding the STA power-ratio gating conditions (with respect to FIG. 10G) and Doppler based gating conditions (with respect to FIG. 10H). The combinations of these different gating methods can also be applied. In one embodiment, the feature segmentation is executed when both gating conditions are met. In another embodiment, the two conditions form a decision tree to make the gating decision jointly with potentially different sets of threshold for conditions.

Although FIGS. 10A, 10G, 10H, and 10I, illustrate examples for gating conditions and the FIGS. 10B, 10C, 10D, 10E, and 10F illustrate example diagrams of features various changes may be made to FIGS. 10A-10I. For example, while shown as a series of steps, various steps in FIGS. 10A, 10G, 10H, and 10I could overlap, occur in parallel, or occur any number of times.

Figure 11A:
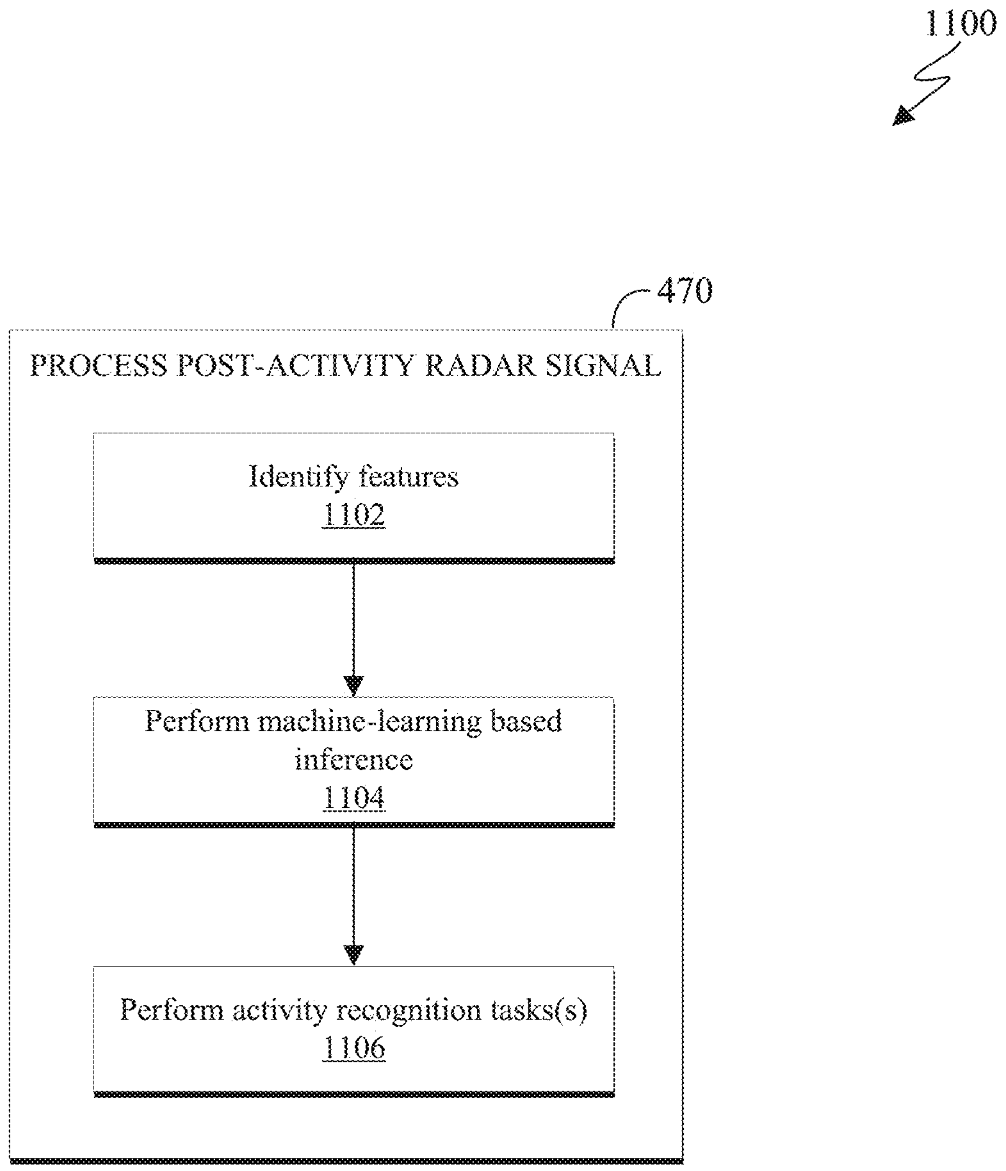
FIG. 11A illustrates an example block diagram for post-processing radar signals according to embodiments of this disclosure.
Figure 11B:
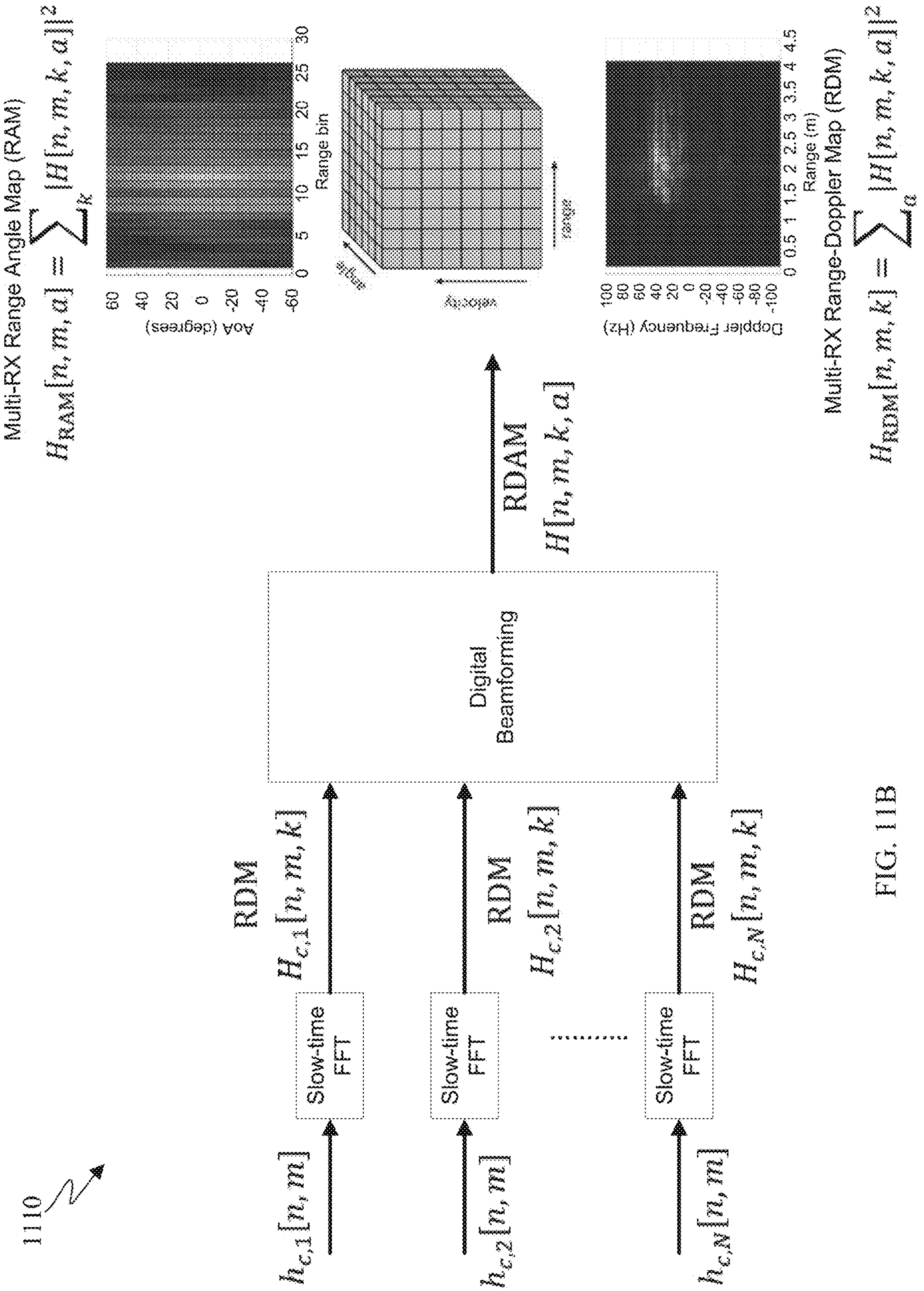
FIG. 11B illustrates an example diagram for processing the CIR to generate a four-dimensional (4D) range-Doppler frame according to embodiments of this disclosure.
Figure 11C:
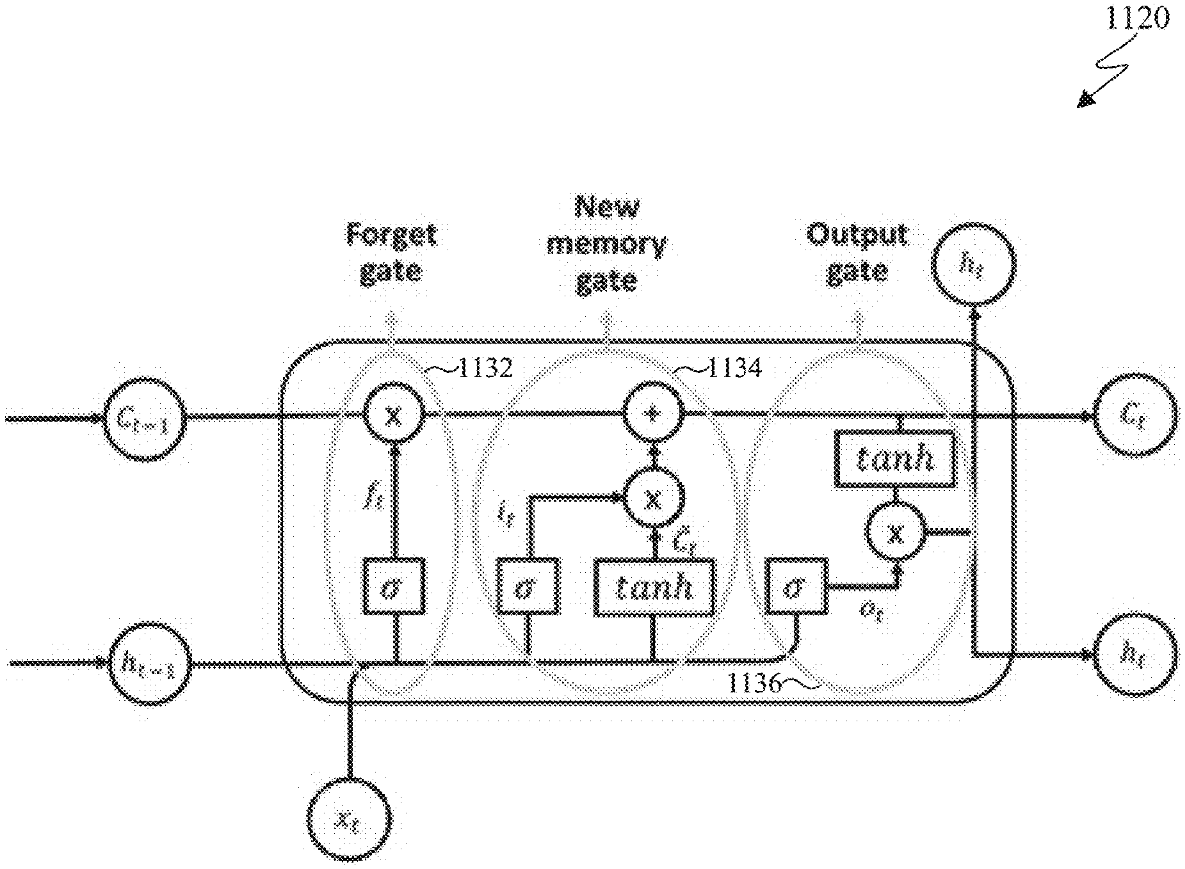
FIG. 11C illustrates an example architecture for a long-short-term memory according to embodiments of this disclosure.
Figure 11D:
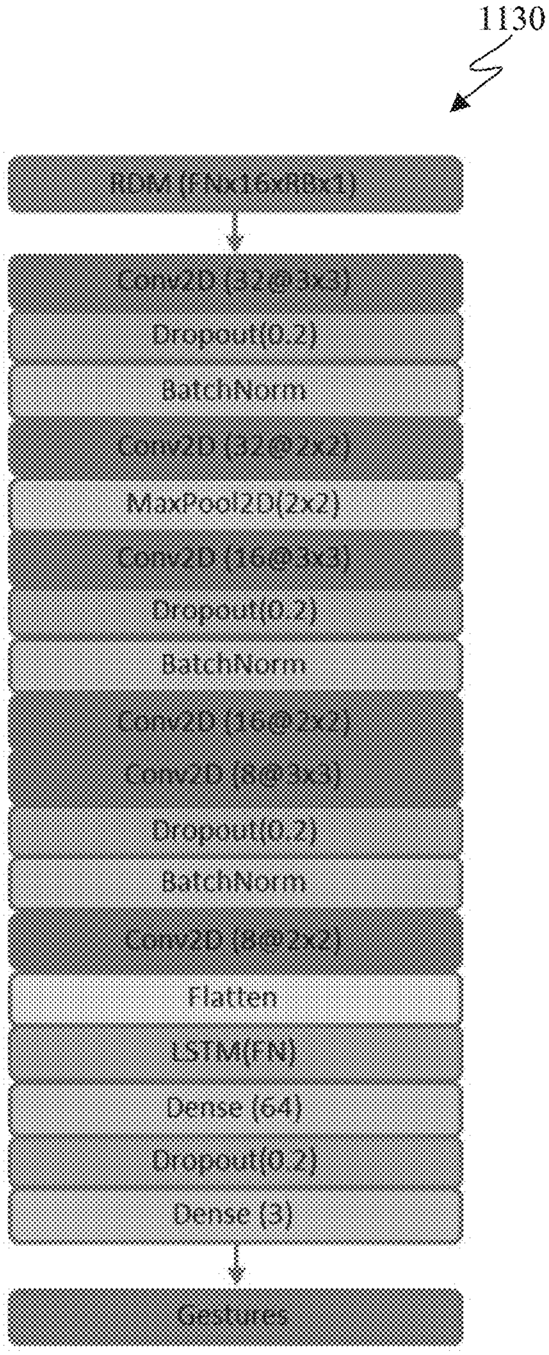
FIGS. 11D and 11E illustrate example diagrams of example convolutional neural networks according to embodiments of this disclosure.
Figure 11E:
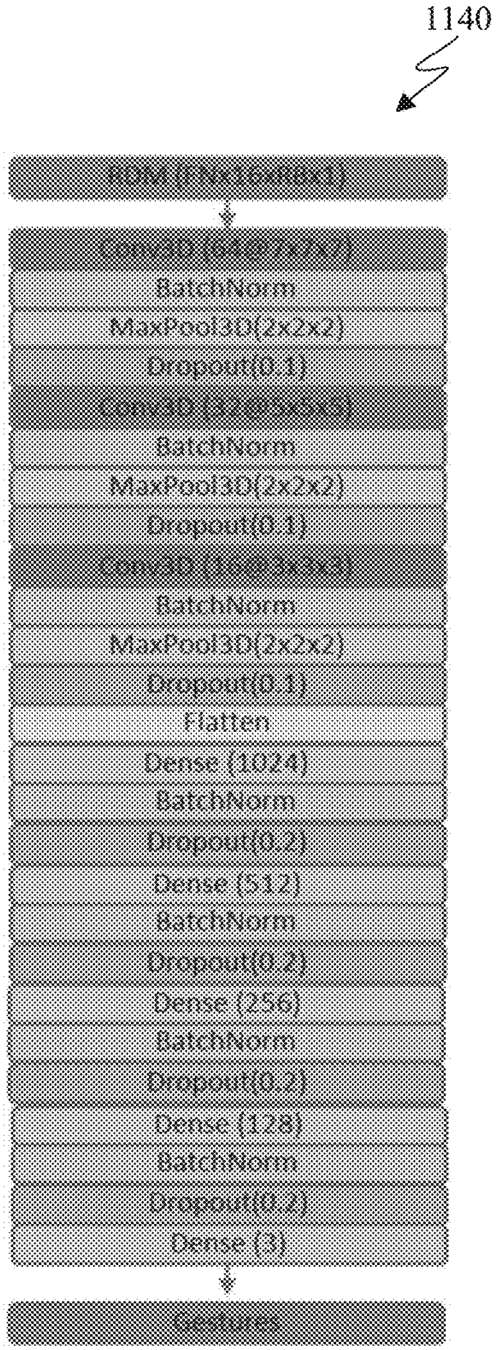
Figure 11F:
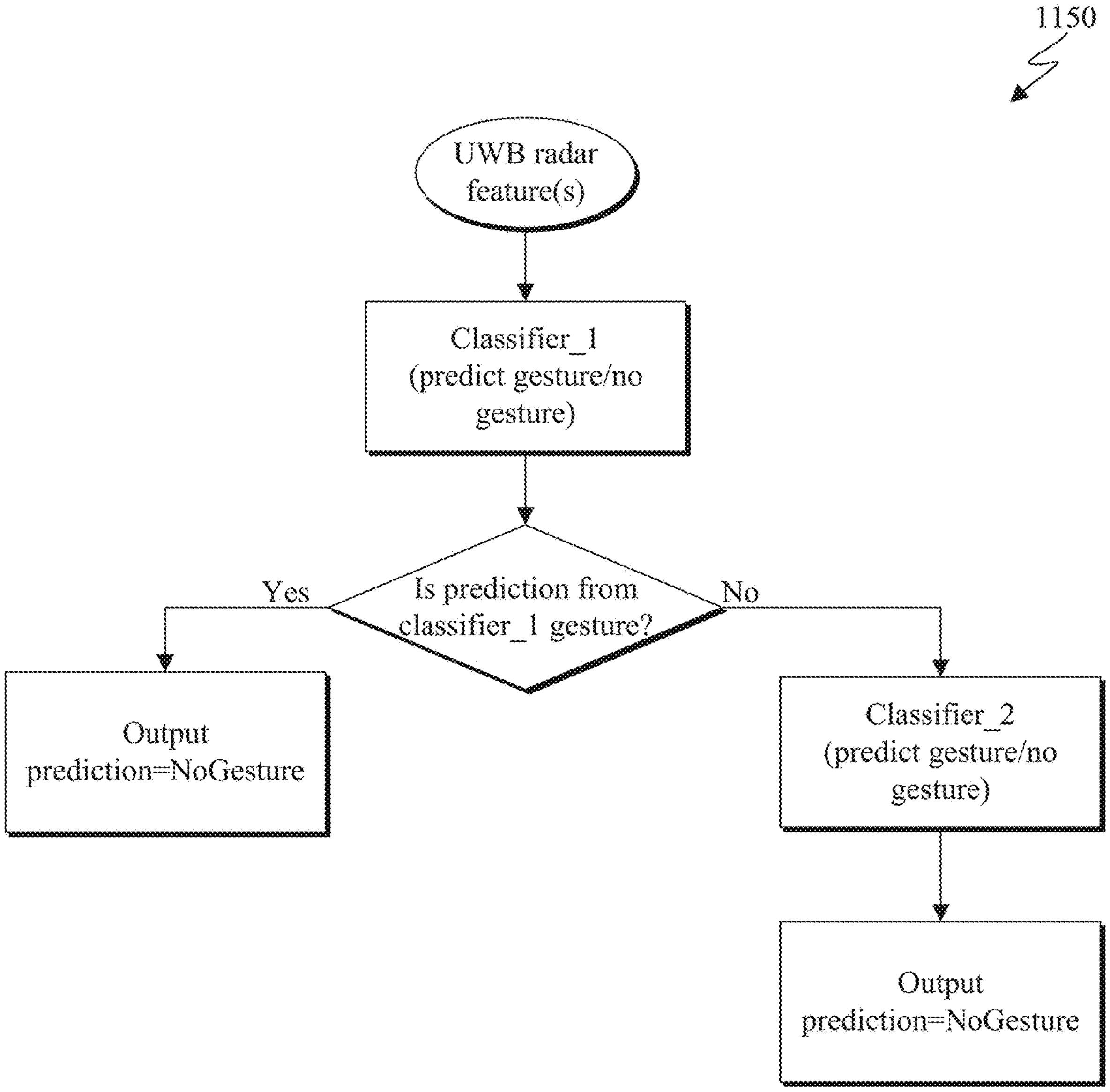
FIG. 11F illustrates an example method of a two-step gesture classification according to embodiments of this disclosure.
Figure 11G:
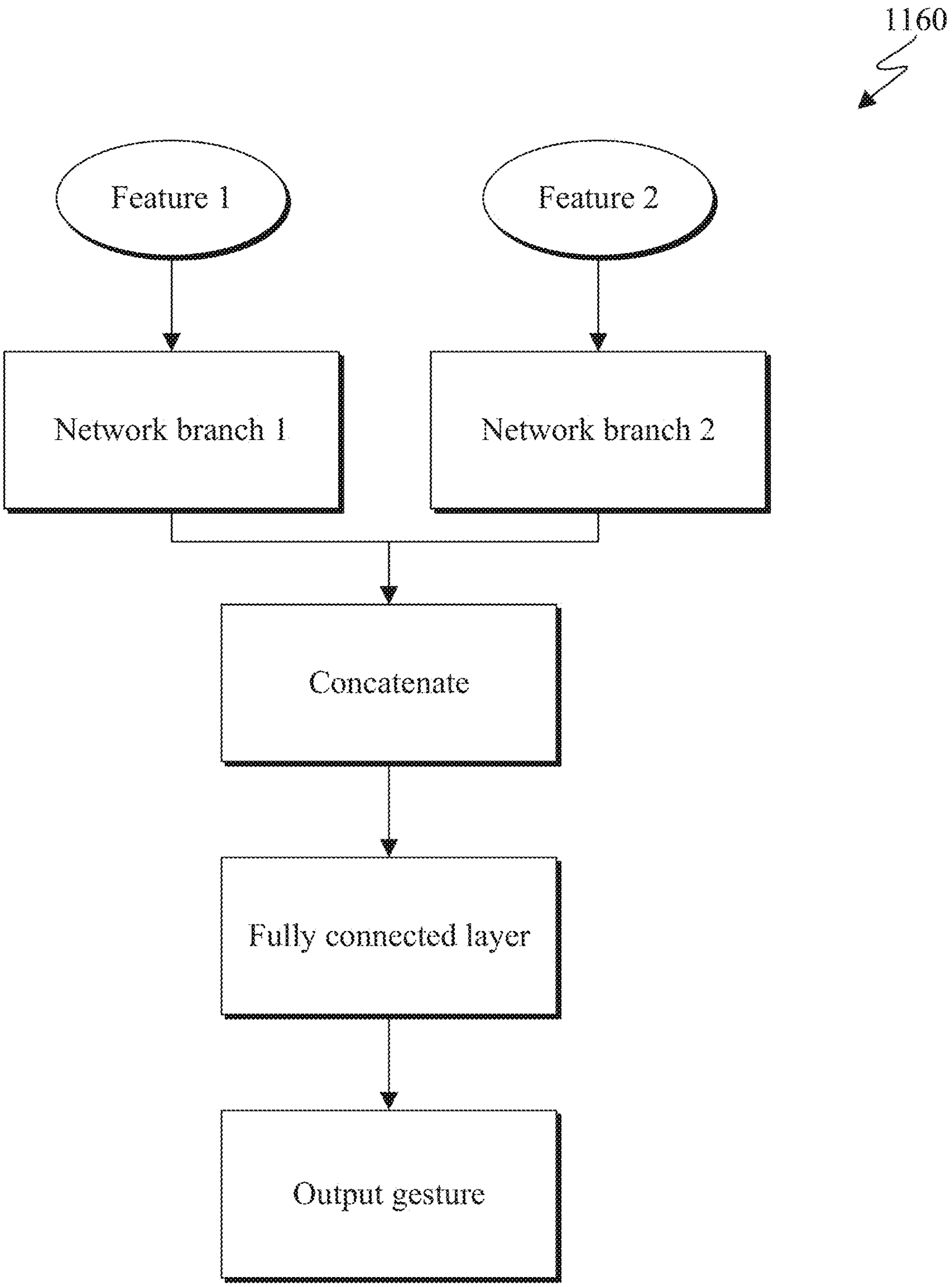
FIG. 11G illustrates an example signal diagram of a two-branch network for gesture classification according to embodiments of this disclosure.

FIG. 11A illustrates an example block diagram 1100 for post-processing radar signals according to embodiments of this disclosure. FIG. 11B illustrates an example diagram 1110 for processing the CIR to generate a four-dimensional (4D) range-Doppler frame according to embodiments of this disclosure. FIG. 11C illustrates an example architecture 1120 for a long-short-term memory according to embodiments of this disclosure. FIGS. 11D and 11E illustrate example architecture 1130 and 1140, respectively, of example convolutional neural networks according to embodiments of this disclosure. FIG. 11F illustrates an example method 1150 of a two-step gesture classification according to embodiments of this disclosure. FIG. 11G illustrates an example signal diagram 1160 of a two-branch network for gesture classification according to embodiments of this disclosure.

The method 1150 of FIG. 11F and the signal diagram 1160 of FIG. 11G are described as implemented by any one of the client device 106-114 of FIG. 1, the server 104 of FIG. 1, the electronic device 300 of FIG. 3, and can include internal components similar to that of electronic device 200 of FIG. 2. However, the method 1150 as shown in FIG. 11F, the signal diagram 1160 as shown in FIG. 11H could be used with any other suitable electronic device and in any suitable system, such as when performed by the electronic device 200. For ease of explanation, the methods of FIGS. 11F and 11G are described as being performed by the electronic device 200 of FIG. 2.

FIGS. 11A-11G describe the post processing the radar signals of step 470A of FIG. 4A and the post activity radar signal processing 470*a* of FIG. 4B in greater detail. The embodiments of the diagram 1100, the diagram 1110, the architecture 1120, the architecture 1130, the architecture 1140, the method 1150, and the signal diagram 1160 of FIGS. 11A-11G, respectively, are for illustration only. Other embodiments can be used without departing from the scope of the present disclosure.

Figure 10F:
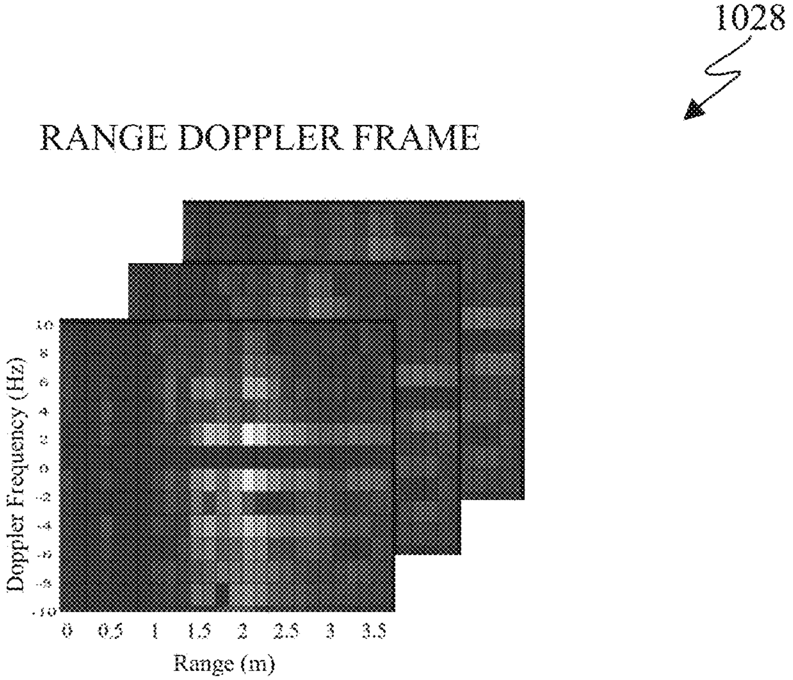
Figure 10G:
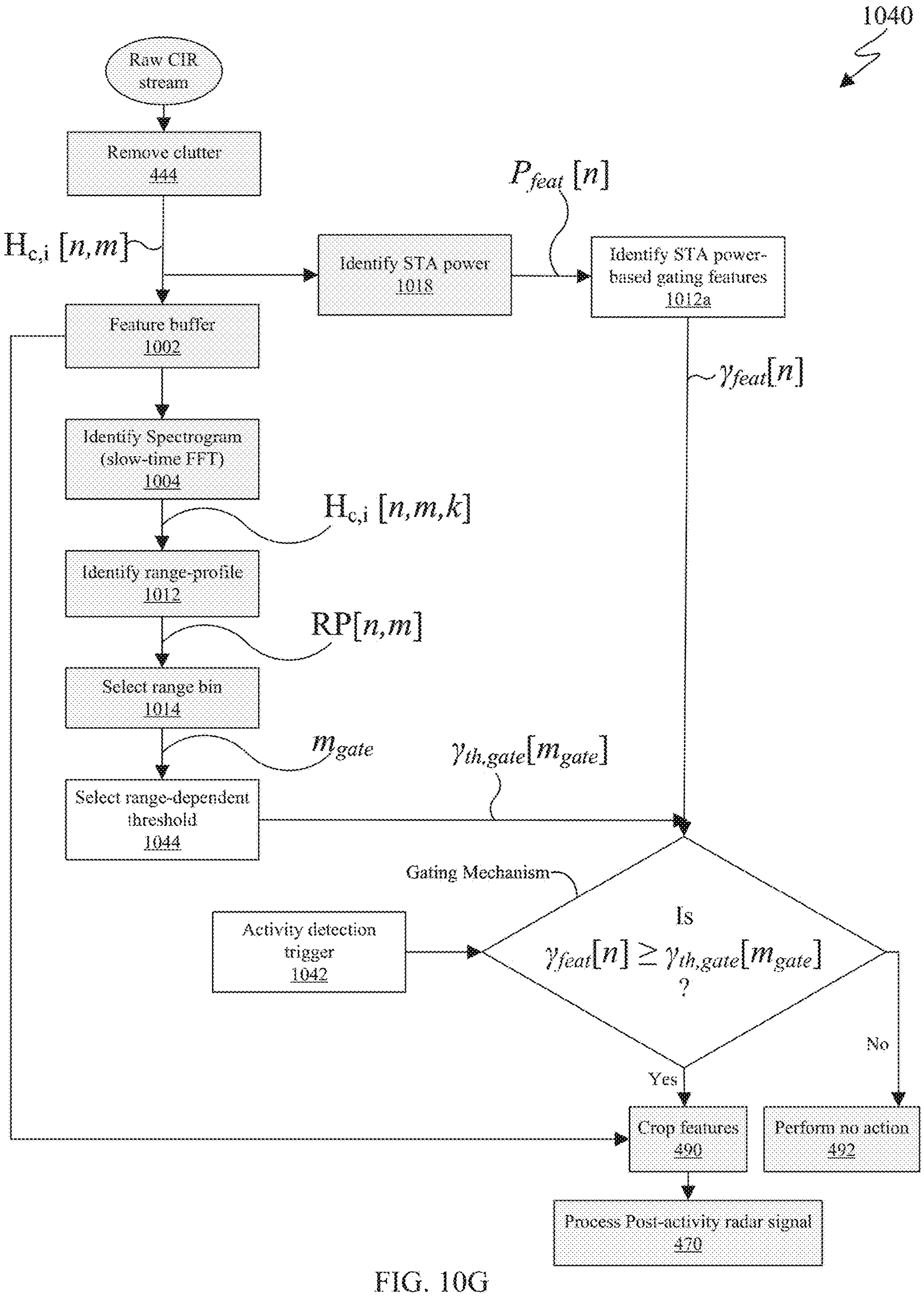
FIGS. 10G, 10H, and 10I illustrate example methods for gating according to embodiments of this disclosure.
Figure 10H:
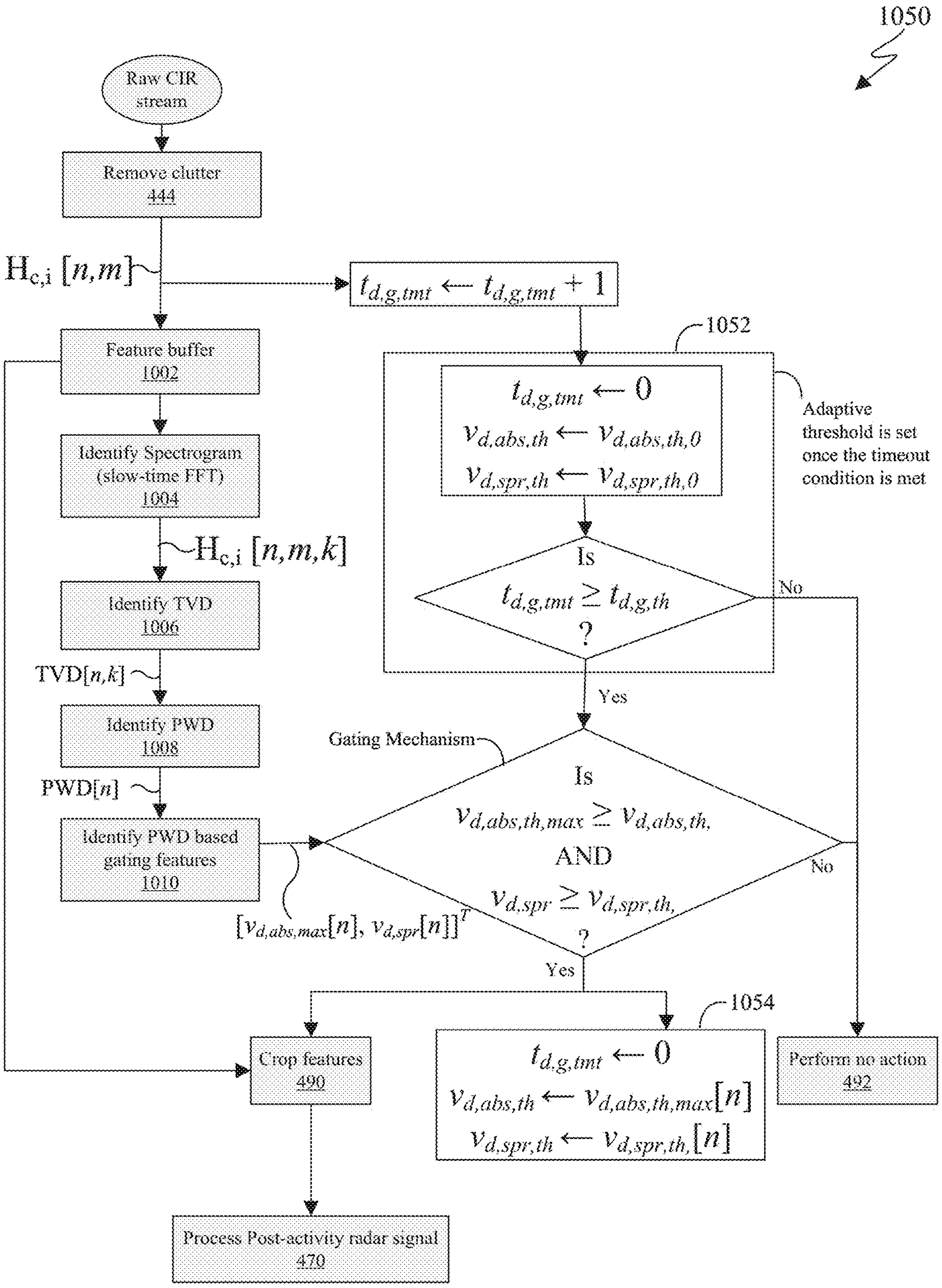
Figure 10I:
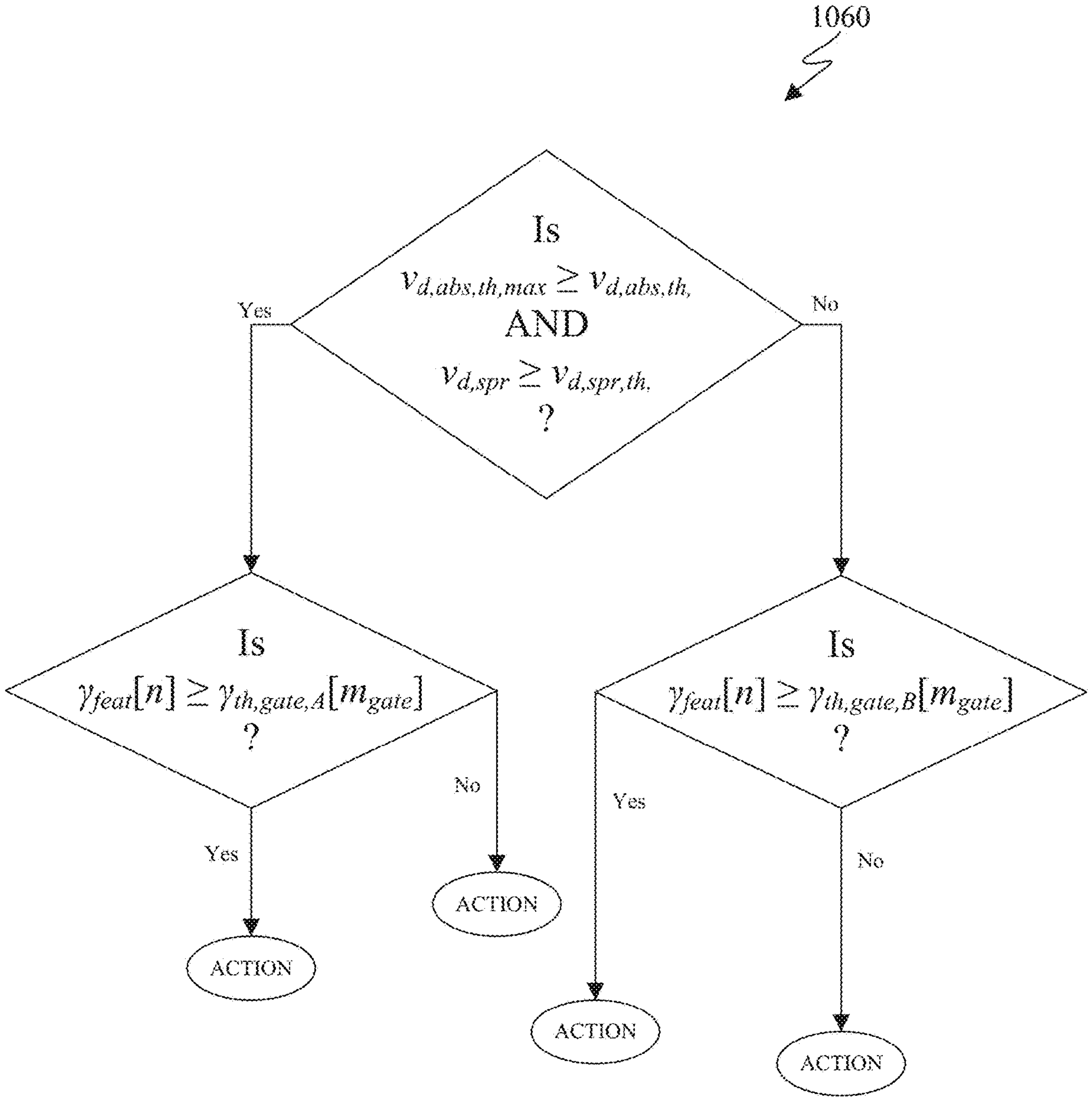

The diagram 1100 as illustrated in FIG. 11A describes the step 470 of FIG. 4A in greater detail. In step 1102, the electronic device 200 identifies features for the ML classification. For example, the Range-Doppler map (RDM) for each RX antenna is identified from the segmented CIR (e.g., that is provided by the activity detection operation (of step 450) by applying the FFT on CIR blocks of size $N_{FFT}$ (eg. 16 or 32) across the slow-time index n as described in Equation (49), below. By accumulating these Range-Doppler maps for all such CIR blocks, the electronic device 200 obtains a 3D matrix of Range-Doppler maps, denoted as an RDF. An example is illustrated in FIG. 10F. For example, an original input (a 3D graph as illustrated on the left of FIG. 5C), can be processed as described in FIG. 10B which is used to generate the RDF of FIG. 10F. That is, the RDF is identified from the cropped CIR.

$$H_{c,i}[n, m, k] = \sum_{p=0}^{N_{FFT}-1} h_{c,i}[n-p, m] e^{-\frac{j2\pi pk}{N_{FFT}}} \tag{49}$$

for $$k \in \mathcal{K} = \left\{-\frac{N_{FFT}}{2}, \frac{N_{FFT}}{2}-1, \ldots, \frac{N_{FFT}}{2}-2, \frac{N_{FFT}}{2}-1\right\}$$

In certain embodiments, features for a single RX antenna are generated by using the RDF directly. In other embodiments, features for a single RX antenna are generated by quantizing it either (i) along the Doppler domain, by selecting a subset of the Range-Doppler map for each slow-time index of the segmented CIR, or (ii) along the range domain, by tap/range bin selection.

In certain embodiments, spatial information can also be obtained in a multi-RX radar system by using digital beamforming on the CIRs $h_{c,i}[n, m]$ as $$\sum_i h_{c,i}[n, m] \cdot e^{j\frac{2\pi}{\lambda} \cdot d_i \cdot sin(\theta)},$$

or on the Range-Doppler map $H_{c,i}[n, m, k]$ as $$\sum_i H_{c,i}[n, m] \cdot e^{j\frac{2\pi}{\lambda} \cdot d_i \cdot sin(\theta)},$$

where θ is the beamforming angle and $d_i$ is the distance to the $1^{st}$ antenna. An example for generating the Range-Doppler Angle map (RDAM) is described in the diagram 1110 of FIG. 11B.

FIG. 11B illustrates a spatial signal processing of the Range-Doppler map to generate the 4D Range-Doppler-Angle frame (RDAF) feature, where $$k \in \mathcal{K} = \left\{-\frac{N_{FFT}}{2}, \frac{N_{FFT}}{2}-1, \ldots, \frac{N_{FFT}}{2}-2, \frac{N_{FFT}}{2}-1\right\}.$$

The cube-like element shown in FIG. 11B is the RDAM at a particular slow time index. A time-series of RDAMs along the slow-time axis (denoted by slow time index n) provides the 4D RDAF. This 4D RDAF can be quantized along the Doppler or spatial domains (shown in FIG. 11B as "velocity" and "range" respectively) to yield composite quantities such as (i) the multi-RX Range-Angle frame (multiRAF), by quantizing along the Doppler domain), or (ii) the multi-RX Range-Doppler frame (multiRDF) by quantizing along the spatial domain.

In step 1104 (of FIG. 11A), the electronic device 200 performs a ML based inference. For example, one or more of the identified features of step 1102 are forwarded to a ML-based activity classifier, whose output triggers the appropriate functionality in the higher layer. The features form a multi-dimensional tensor and are passed to the step 1104, which uses ML-based inference that includes a deep neuron network (DNN) architecture contain multiple layers of 2D/3D convolutional layer, normalization layer, pooling layer. The ML-based inference of step 1104 could also integrate recurrent neuron network (RNN) for utilizing the history information. Step 1104 is similar to the step 472 of FIG. 4B. After the ML based inference is performed, the electronic device 200 performs a task corresponding to the identified activity (step 1106). The step 1106 is similar to the step 474 in FIG. 4B.

With regards to ML-based inference (of step 1104), a ML-based gesture recognition classifier can be used. Classification of the gesture is performed using deep learning classifiers or classical machine learning classifiers. In the first embodiment, a convolutional neural network (CNN) with long short-term memory (LSTM) is used for gesture recognition. In an alternate embodiment, the classifiers can include but are not limited to support vector machine (SVM), K-Nearest Neighbors (KNN), and combined classifiers of CNN with others CNN+Recurrent Neural Network (RNN), CNN+KNN, CNN+SVM, CNN+Auto-Encoder, and CNN+RNN with Self-attention module. Classifiers receive processed UWB Radar signals and then recognize gestures.

Diversity of training data can improve the robustness of classifiers. Since one gesture can have different patterns performed by subjects, training data can be collected by multiple subjects. Signals of UWB Radars vary with distance and environment. Data can be collected at numerous distances between devices and gestures and in different environments such as open spaces or cluttered rooms to increase data variance.

Classification can use features extracted from CIR: (i) RDF, (ii) RDAF, (iii) time-velocity-diagram, and (iv) time-range-map. These features include spatiotemporal information of gestures.

In certain embodiments, a CNN+LSTM network is employed to classify gestures using feature RDF. CNN is used to extract spatial features. A convolutional layer is often followed by a batch normalization layer and a max-pooling layer. Batch normalization can reduce training time by standardizing input. The Max-pooling layer can select out features with the maximum values in one area to reduce the number of features and the training parameters in one network. Long short-term memory (LSTM) is one type of RNN and can process sequential temporal information. The architecture 1120 of FIG. 11C shows the architecture of LSTM. The architecture 1120 of the LSTM includes forget gate, new memory gate, and output gate. The cell of LSTM can be formulated as illustrated in FIG. 11C. FIG. 11D illustrates an example architecture 1130 of CNN+LSTM network. As illustrated, multiple CNN blocks can be employed to extract features from RDF. A flatten layer and fully connected layer are used to connect LSTM with extracted features. Then LSTM layer classifies gestures. Other architectures of CNN+LSTM can also be used.

In certain embodiments, 3D CNN can be employed to classify gestures using RDF. FIG. 11E illustrates an example architecture 1140 of a 3D CNN. 3D CNN is one type of CNN which used 3D kernels. Its input is a 3D volume of a sequence of 2D frames. It has the capability to handle volumetric information.

In certain embodiments, other architectures of a 2D CNN, a CNN+LSTM, or 3D LSTM can be used to perform gesture recognition.

Sometimes a random gesture performed by the subject might have features similar to the gestures in the class of gestures that are being detected. These random gestures, not falling in the class of gestures to be detected, are referred to as NoGestures. One way of handling with NoGestures is to collect training data for NoGestures and adding it as a class in gesture detection. If gesture recognition is associated with some application, that is if there is some action or outcome associated with each gesture, then NoGesture detection can have no action or outcome.

In certain embodiments, NoGestures detection is performed using a two-step classifier. The first classifier is trained to distinguish between gesture and NoGesture, while the second classifier is trained to classify the gestures into the correct class. During inference, if the first classifier detects a NoGesture, the final output is NoGesture. But if the first classifier detects a gesture, second classifier is used to classify that gesture. The method 1150 as illustrated in FIG. 11F describes this two-step classification.

In certain embodiments, a multi-label classification approach is used to detect NoGestures. In this approach, each gesture may belong to no class, one class or more than one class. This is done based on the output probability for each class. The classes for classification are the actual gesture classes. When the probability of one of the class lies above a certain threshold, the input gesture gets classified to that class. When the probability of more than one class is above a certain threshold, the input gesture gets classified to the class with maximum probability. And when the probability of none of the class is above that threshold, the gesture is classified as a NoGesture.

In certain embodiments, a multi-branch classification network is used for gesture classification. In multi-branch classification, each branch of network can input a different feature. Also, each branch of network can have a different architecture depending on the input of that branch. The signal diagram 1160 as illustrated in FIG. 11G describes the two-branch network for gesture classification. It is noted that each branch can use radar features (such as RDF, RAM, TVD, and the like) as inputs.

In certain embodiments, an optimizer can be used during the machine learning to find the best parameters for the learning functions in order to reduce cost-function and improve the accuracy of one classifier. Example, Optimizer methods include, but not limited to, Adam, RMSprop, SGD, Adagrad, Nadam and meta-learning algorithm such as MAML, FOMAML and Reptile learning. For example, Reptile, which is a first-order gradient-based meta-learning algorithm can be deployed. For instance, a Reptile method can be deployed with base learners such as 3D CNN or CNN+LSTM. Results show that the classifiers trained with Reptile have a better average performance on the test set to compare with these classifiers trained with only Adam or SGD.

Syntax (1)

Algorithm: Reptile
  Initialize $\varphi$, the vector of initial parameters
  For iteration = 1, 2, ... do
    Sample task t, corresponding to loss $L_\tau$ weight vectors $\tilde{\varphi}$
  Compute $\tilde{\varphi} = U_\tau^k(\varphi)$, denoting $k$ steps of $SGD$ or Adam
  Update $\varphi \leftarrow \varphi + \varepsilon(\tilde{\varphi} - \varphi)$
End for Although FIGS. 11A-11G illustrate examples for classifying a gesture, various changes may be made to FIGS. 11A-11G. For example, while shown as a series of steps, various steps in FIGS. 11F and 11G could overlap, occur in parallel, or occur any number of times.

Figure 12:
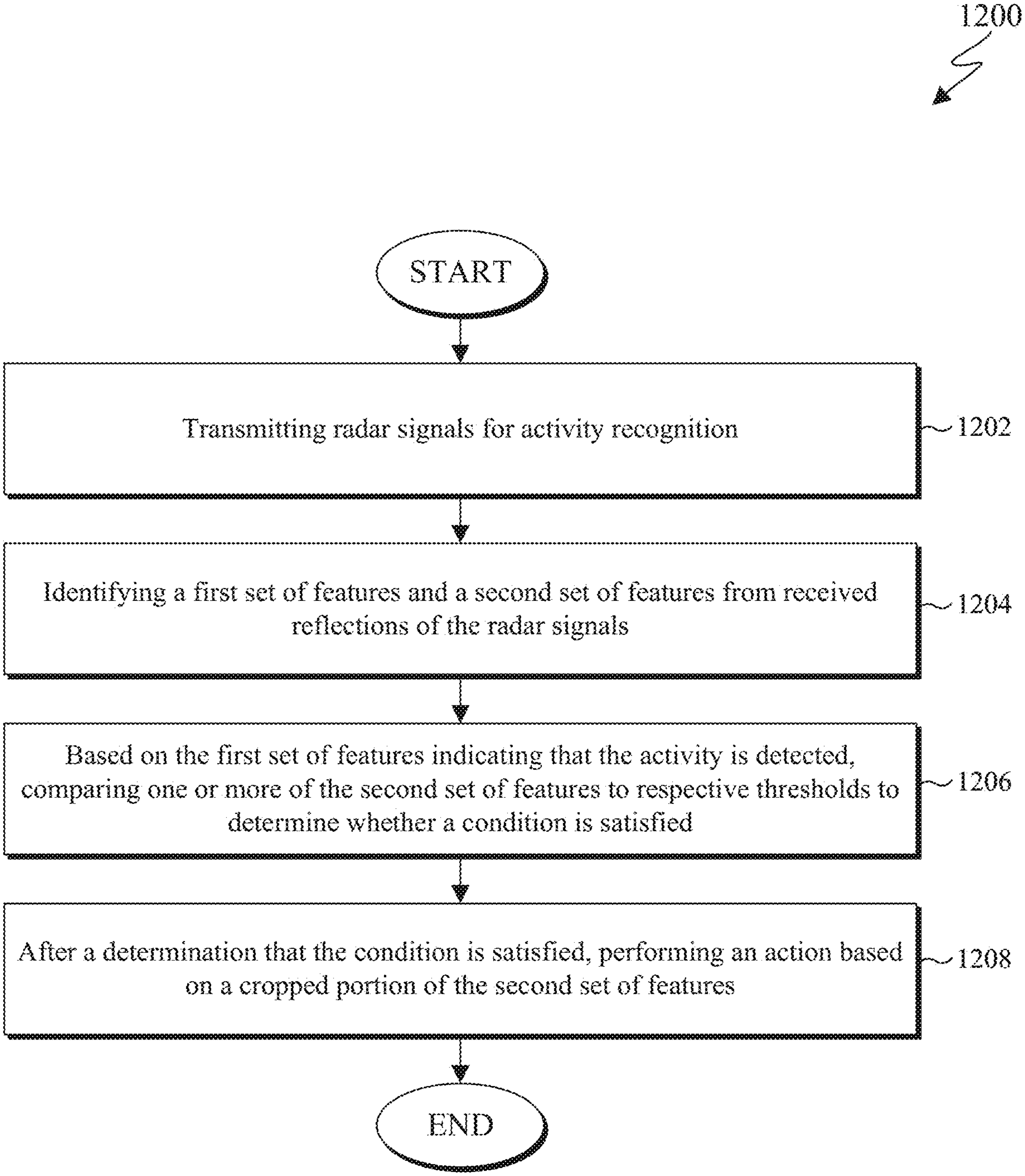
FIG. 12 illustrates an example method for activity detection and recognition based on radar measurements.

FIG. 12 illustrates an example method 1200 for activity detection and recognition based on radar measurements.

The method 1200 is described as implemented by any one of the client device 106-114 of FIG. 1, the electronic device 300 of FIG. 3, and can include internal components similar to that of electronic device 200 of FIG. 2. However, the method 1200 as shown in FIG. 12 could be used with any other suitable electronic device and in any suitable system, such as when performed by the electronic device 200. The embodiments of the method 1200 of FIG. 12 is for illustration only. Other embodiments can be used without departing from the scope of the present disclosure.

In step 1202, an electronic device (such as the electric device 200) transmits signals for activity detection and identification. The electronic device 200 can also receive the transmitted signals that reflected off of an object via a radar transceiver, such as the radar transceiver 270 of FIG. 2. In certain embodiments, the signals are UWB radar signals.

In step 1204, the electronic device 200 identifies a first set of features and a second set of features from received reflections of the radar signals. The first set of features indicate whether an activity is detected based on power of the received reflections. The second set of features include one or more features such as a time velocity diagram, a range profile, a power-weighted Doppler, and/or a first average power over a first time period. In certain embodiments, the first set of features can be identified via the activity detection branch 450*a* of FIG. 4B, while the second set of features can be identified via the feature generation branch 460 of FIG. 4B.

In certain embodiments, to identify the first set of features, the electronic device 200 removes clutter from the radar signals based on a first predefined parameter using a high pass filter. Similarly, to identify the second set of features, the electronic device 200 removes clutter from the radar signals based on a second predefined parameter using a high-pass filter. It is noted that the second predefined parameter can be larger than the first predefined parameter for removing different frequencies.

While identifying the first set of features, the electronic device 200 can also identify the start and end time of the activity. To identify the start and end times, the electronic device 200 identifies a first average power over a first time period and a second average power over a second time period. The second time period includes the first time period and is longer than the first time period. The activity start time is based at least on the first average power and the based at least in part on an expiration of a predefined period of time after the activity start time.

In some embodiments, to identify the start time and end time, the electronic device 200 uses a ratio of a short-term power average and a long-term power average. For example, to identify the activity start time, the electronic device 200 compares the second average power to a ratio of the first average power and a first predefined threshold, to generate a first result. The electronic device 200 also compares the first average power to a product of the second average power and the first predefined threshold, to generate a second result. Based on the first result and the second result, the electronic device 200 identifies the activity start time. To identify the activity end time, the electronic device 200 compares the second average power to a ratio of the first average power and a second predefined threshold, to generate a third result. The electronic device 200 also compared the first average power to a product of the second average power and the second predefined threshold, to generate a fourth result. Based on (i) the expiration of the predefined period of time, (ii) the third result, and (iii) the fourth result, the electronic device 200 identifies the activity end time.

In some embodiments, to identify the start time and end time, the electronic device 200 uses a ratio of a min CIR power to a max. For example, to identify the activity start time, the electronic device 200 compares a ratio of a maximum power to a minimum power to a first threshold to identify a first result. The electronic device 200 also determines that the maximum power occurred at a time that is after identification of the minimum power to identify a second result. Based on the first result and the second result, the electronic device 200 identify the activity start time. To identify the activity end time, the electronic device 200 compares a ratio of a maximum power to a minimum power to a second threshold to identify a third result. The electronic device 200 also determines that the maximum power occurred at a time that is before identification of the minimum power to identify a fourth result. Based on (i) the expiration of the predefined period of time, (ii) the third result and (iii) the fourth result, the electronic device 200 identifies the activity end time.

In certain embodiments, the electronic device 200 crops a portion of the second set of features based on the activity start time and the activity end time.

In certain embodiments, after the first set of features are identified the electronic device 200 determines whether another activity is detected after a time out condition expired. For example, the electronic device 200 can identify a first power value from the first set of features. The first power value represents a maximum power value over a predefined time duration. After an expiration of the predefined time duration, the electronic device 200 determines whether a second power value is larger than the first power value. It is noted that the second power value represents a maximum power value at a time instance between a start time of the predefined time duration and a current time. When the second power value is larger than the first power value, the electronic device 200 identifies that the first set of features using the received reflections between the start time of the predefined time duration and the current time, and therefore the activity is part of the original activity and not considered a new activity. Alternatively, when second power value is not larger than the first power value, the electronic device 200 identifies the first set of features using the received reflections between the start time of the predefined time duration and the expiration of the predefined time duration.

Based on the first set of features indicating that the activity is detected, the electronic device 200 in step 1206 compares one or more of the second set of features to respective thresholds to determine whether a gating condition is satisfied.

For example, after an activity end time is identified, the electronic device 200 compares a first average power associated with the activity to a predefined threshold for determining whether the gating condition is satisfied. The electronic device 200 can determine that the condition is satisfied based on a result of the comparison.

For another example, after an activity end time is identified, the electronic device 200 compare compares a maximum Doppler to a first threshold and doppler spread to a second threshold. The electronic device 200 can determine that the gating condition is satisfied based on a result of the comparison.

After determining that the condition is satisfied, the electronic device 200 can crop the portion of the second set of features based on an identified activity start time and the activity end time.

After determining that the condition is satisfied, the electronic device 200 identifies, using a machine learning classifier, a response from the cropped portion of the second set of features. The electronic device 200 can then select the action based on the response. Thereafter, the electronic device 200 performs an action corresponding to the selected action (step 1208).

Although FIG. 12 illustrates an example method 1200, various changes may be made to FIG. 12. For example, while the method 800 is shown as a series of steps, various steps could overlap, occur in parallel, occur in a different order, or occur multiple times. In another example, steps may be omitted or replaced by other steps.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system. None of the description in this application should be read as implying that any particular element, step, or function is an essential element that must be included in the claims scope.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a transceiver; and
a processor operably connected to the transceiver, the processor configured to:
transmit, via the transceiver, a set of radar signals for activity recognition;
identify a first set of features and a second set of features from received reflections of the set of radar signals, the first set of features indicating whether an activity is detected based on power of the received reflections, wherein to identify that the first set of features indicate that the activity is detected, the processor is configured to detect the activity and identify an activity end time of the activity based on the power of the received reflections;
crop the first set of features based on the activity end time identified;
based on the cropped first set of features indicating the activity end time and that the activity is detected, compare one or more of the second set of features to respective thresholds to determine whether a condition is satisfied,
after a determination that the condition is satisfied:
crop the second set of features based on the activity end time of the activity to thereby generate a cropped portion of the second set of features; and
perform an action based on the cropped portion of the second set of features, wherein to perform the action, the processor is configured to input the cropped portion of the second set of features into a machine learning classifier.

2. The electronic device of claim 1, wherein the processor is further configured to:
identify, using the machine learning classifier, a response from the cropped portion of the second set of features; and
select the action based on the response.

3. The electronic device of claim 1, wherein:
to identify the first set of features, the processor is configured to remove clutter from the set of radar signals based on a first predefined parameter to attenuate low-Doppler information using a high pass filter; and
to identify the second set of features, the processor is configured to remove clutter from the set of radar signals based on a second predefined parameter to preserve the low-Doppler information using a high-pass filter, wherein the second predefined parameter is larger than the first predefined parameter.

4. The electronic device of claim 1, wherein:
to identify the first set of features indicating whether the activity is detected from the received reflections, the processor is configured to:
identify a first average power over a first time period and a second average power over a second time period, the second time period includes the first time period and is longer than the first time period,
identify an activity start time based at least on the first average power; and
identify the activity end time based at least in part on an expiration of a predefined period of time after the activity start time; and
the processor is further configured to crop a portion of the second set of features based on the activity start time and the activity end time to thereby generate the cropped portion of the second set of features.

5. The electronic device of claim 4, wherein:
to identify the activity start time, the processor is configured to:
compare the second average power to a ratio of the first average power and a first predefined threshold, to generate a first result,
compare the first average power to a product of the second average power and the first predefined threshold, to generate a second result, and
identify the activity start time based on the first result and the second result; and
to identify the activity end time, the processor is further configured to:
compare the second average power to a ratio of the first average power and a second predefined threshold, to generate a third result,
compare the first average power to a product of the second average power and the second predefined threshold, to generate a fourth result, and
identify the activity end time based on (i) the expiration of the predefined period of time, (ii) the third result, and (iii) the fourth result.

6. The electronic device of claim 4, wherein:
to identify the activity start time, the processor is configured to:
compare a ratio of a maximum power to a minimum power to a first threshold to identify a first result, and
determine that the maximum power occurred at a time that is after identification of the minimum power to identify a second result, and
identify the activity start time based on the first result and the second result; and
to identify the activity end time, the processor is further configured to:
compare a ratio of a maximum power to a minimum power to a second threshold to identify a third result, and
determine that the maximum power occurred at a time that is before identification of the minimum power to identify a fourth result, and
identify the activity end time based on (i) the expiration of the predefined period of time, (ii) the third result and (iii) the fourth result.

7. The electronic device of claim 1, wherein the processor is further configured to:
identify a first power value from the first set of features, wherein the first power value represents a maximum power value over a predefined time duration;
after an expiration of the predefined time duration, determine whether a second power value is larger than the first power value, the second power value representing a maximum power value at a time instance between a start time of the predefined time duration and a current time;
when the second power value is larger than the first power value, identify the first set of features using the received reflections between the start time of the predefined time duration and the current time; and
when second power value is not larger than the first power value, identify the first set of features using the received reflections between the start time of the predefined time duration and the expiration of the predefined time duration.

8. The electronic device of claim 1, wherein to determine whether the condition is satisfied, the processor is further configured to:

after the activity end time is identified, compare a first average power associated with the activity to a predefined threshold; and determine that the condition is satisfied based on a result of the comparison; and wherein the processor is further configured to crop the portion of the second set of features based on an identified activity start time and the activity end time.

9. The electronic device of claim 1, wherein to determine whether the condition is satisfied, the processor is further configured to:

after the activity end time is identified, compare (i) a maximum Doppler to a first threshold and (ii) doppler spread to a second threshold; and determine that the condition is satisfied based on a result of the comparison; and wherein the processor is further configured to crop the portion of the second set of features based on an identified activity start time and the activity end time.

10. The electronic device of claim 1, wherein the second set of features include at least one of:

a time velocity diagram, a range profile, a power-weighted Doppler, and a first average power over a first time period; and wherein the processor is further configured to after a determination that the condition is not satisfied, ignore the activity detected such that no machine learning (ML) classification is performed to identify the activity detected.

11. A method comprising:

transmitting, via a transceiver, a set of radar signals for activity recognition;

identifying a first set of features and a second set of features from received reflections of the set of radar signals, the first set of features indicating whether an activity is detected based on power of the received reflections, wherein identifying that the first set of features indicate that the activity is detected includes detecting the activity and identifying an activity end time of the activity based on the power of the received reflections;

cropping the first set of features based on the activity end time identified;

based on the cropped first set of features indicating the activity end time and that the activity is detected, comparing one or more of the second set of features to respective thresholds to determine whether a condition is satisfied;

after a determination that the condition is satisfied:

cropping the second set of features based on the activity end time of the activity to thereby generate a cropped portion of the second set of features; and performing an action based on the cropped portion of the second set of features, wherein performing the action includes inputting the cropped portion of the second set of features into a machine learning classifier.

12. The method of claim 11, further comprising:

identifying, using the machine learning classifier, a response from the cropped portion of the second set of features; and selecting the action based on the response.

13. The method of claim 11, wherein:

identifying the first set of features, comprises removing clutter from the set of radar signals based on a first predefined parameter to attenuate low-Doppler information using a high pass filter; and identifying the second set of features, comprises removing clutter from the set of radar signals based on a second predefined parameter to preserve the low-Doppler information using a high-pass filter, wherein the second predefined parameter is larger than the first predefined parameter.

14. The method of claim 11, wherein:

identifying the first set of features indicating whether the activity is detected from the received reflections, comprises:

identifying a first average power over a first time period and a second average power over a second time period, the second time period includes the first time period and is longer than the first time period, identifying an activity start time based at least on the first average power; and identifying the activity end time based at least in part on an expiration of a predefined period of time after the activity start time; and the method further comprises cropping the portion of the second set of features based on the activity start time and the activity end time.

15. The method of claim 14, wherein:

identifying the activity start time comprises:

comparing the second average power to a ratio of the first average power and a first predefined threshold, to generate a first result, comparing the first average power to a product of the second average power and the first predefined threshold, to generate a second result, and identifying the activity start time based on the first result and the second result; and identifying the activity end time comprises:

comparing the second average power to a ratio of the first average power and a second predefined threshold, to generate a third result, comparing the first average power to a product of the second average power and the second predefined threshold, to generate a fourth result, and identifying the activity end time based on (i) the expiration of the predefined period of time, (ii) the third result, and (iii) the fourth result.

16. The method of claim 14, wherein:

identifying the activity start time comprises:

comparing a ratio of a maximum power to a minimum power to a first threshold to identify a first result, and determining that the maximum power occurred at a time that is after identification of the minimum power to identify a second result, and identifying the activity start time based on the first result and the second result; and identifying the activity end time comprises:

comparing a ratio of a maximum power to a minimum power to a second threshold to identify a third result, and determining that the maximum power occurred at a time that is before identification of the minimum power to identify a fourth result, and identifying the activity end time based on (i) the expiration of the predefined period of time, (ii) the third result and (iii) the fourth result.

17. The method of claim 11, further comprising:

identifying a first power value from the first set of features, wherein the first power value represents a maximum power value over a predefined time duration;

after an expiration of the predefined time duration, determining whether a second power value is larger than the first power value, the second power value representing a maximum power value at a time instance between a start time of the predefined time duration and a current time;

when the second power value is larger than the first power value, identifying the first set of features using the received reflections between the start time of the predefined time duration and the current time; and when second power value is not larger than the first power value, identifying the first set of features using the received reflections between the start time of the predefined time duration and the expiration of the predefined time duration.

18. The method of claim 11, wherein determining whether the condition is satisfied, comprises:

after the activity end time is identified, comparing a first average power associated with the activity to a predefined threshold; and determining that the condition is satisfied based on a result of the comparison; and wherein cropping the portion of the second set of features is based on an identified activity start time and the activity end time.

19. The method of claim 11, wherein determining whether the condition is satisfied, comprises:

after an activity end time is identified, comparing (i) a maximum Doppler to a first threshold and (ii) doppler spread to a second threshold; and determining that the condition is satisfied based on a result of the comparison; and wherein cropping the portion of the second set of features is based on an identified activity start time and the activity end time.

20. A non-transitory computer-readable medium embodying a computer program, the computer program comprising computer readable program code that, when executed by a processor of an electronic device, causes the processor to:

transmit, via a transceiver, a set of radar signals for activity recognition;

identify a first set of features and a second set of features from received reflections of the set of radar signals, the first set of features indicating whether an activity is detected based on power of the received reflections, wherein to identify that the first set of features indicate that the activity is detected, the program code further causes the processor to detect the activity and identify an activity end time of the activity based on the power of the received reflections;

crop the first set of features based on the activity end time identified;

based on the cropped first set of features indicating the activity end time and that the activity is detected, compare one or more of the second set of features to respective thresholds to determine whether a condition is satisfied;

after a determination that the condition is satisfied:

crop the second set of features based on the activity end time of the activity to thereby generate a cropped portion of the second set of features; and perform an action based on the cropped portion of the second set of features, wherein the program code that causes the processor to perform the action further causes the processor to input the cropped portion of the second set of features into a machine learning classifier.

* * * * *